United States Patent
Ishida et al.

(10) Patent No.: US 9,423,531 B2
(45) Date of Patent: Aug. 23, 2016

(54) ANTIREFLECTION MEMBER AND MANUFACTURE METHOD FOR THE SAME

(75) Inventors: Yasuyuki Ishida, Otsu (JP); Yu Abe, Otsu (JP); Michiko Kai, Otsu (JP); Takashi Mimura, Otsu (JP)

(73) Assignee: Toray Industries, Inc. (JP)

( * ) Notice: Subject to any disclaimer, the term of this patent is extended or adjusted under 35 U.S.C. 154(b) by 1082 days.

(21) Appl. No.: 13/394,359

(22) PCT Filed: Sep. 8, 2010

(86) PCT No.: PCT/JP2010/065411
§ 371 (c)(1),
(2), (4) Date: Mar. 6, 2012

(87) PCT Pub. No.: WO2011/033976
PCT Pub. Date: Mar. 24, 2011

(65) Prior Publication Data
US 2012/0162774 A1    Jun. 28, 2012

(30) Foreign Application Priority Data

Sep. 18, 2009 (JP) ................................. 2009-217096
Sep. 18, 2009 (JP) ................................. 2009-217097
Sep. 18, 2009 (JP) ................................. 2009-217098

(51) Int. Cl.
*G02B 1/11*    (2015.01)
*G02B 1/111*    (2015.01)
*B32B 5/30*    (2006.01)

(52) U.S. Cl.
CPC ............... *G02B 1/111* (2013.01); *B32B 5/30* (2013.01); *B32B 2260/025* (2013.01); *G02B 2207/107* (2013.01); *G02B 2207/109* (2013.01)

(58) Field of Classification Search
CPC ........... B05D 5/06; G02B 1/11; G02B 1/111; G02B 2207/107; G02B 2207/109; B32B 5/30; B32B 2260/025

USPC ................................ 359/599, 601; 427/162
See application file for complete search history.

(56) References Cited

U.S. PATENT DOCUMENTS

2004/0114248 A1*    6/2004    Hokazono et al. ............ 359/603

FOREIGN PATENT DOCUMENTS

| JP | 59-050401 A | 3/1984 |
|---|---|---|
| JP | 11-130715 A | 5/1999 |

(Continued)

OTHER PUBLICATIONS

Kindaichi, "Method for Manufacturing Antireflective Film, and Image Display", JP2009-198748A, machine-translation.*

*Primary Examiner* — Bumsuk Won
*Assistant Examiner* — Wen Huang
(74) *Attorney, Agent, or Firm* — DLA Piper LLP (US)

(57) ABSTRACT

An antireflection member comprising an antireflection layer includes two adjacent layers with different refractive indices, the antireflection layer formed at least on a first surface of a support substrate, and one of the two adjacent layers with different refractive indices located farther from the support substrate is a first layer, and another of the two adjacent layers is a second layer, wherein the antireflection layer contains two or more kinds of particles of different constituent elements and one or more kinds of binders, and a ratio b/a is more than 1.10 and less than 1.45, where "a" denotes a length of the line segment A1A2 connecting two arbitrarily-selected points A1 and A2 located on an interface between said first layer and said second layer and apart from each other by a linear distance of 500 nm or more, and "b" denotes a length of a line formed by projecting the line segment A1A2 in a direction perpendicular to the first surface of the support substrate onto the interface between the first layer and the second layer.

17 Claims, 2 Drawing Sheets

(56) References Cited

FOREIGN PATENT DOCUMENTS

| | | |
|---|---|---|
| JP | 2002-055205 A | 2/2002 |
| JP | 2002-311204 A | 10/2002 |
| JP | 2003-215339 A | 7/2003 |
| JP | 2003-270405 A | 9/2003 |
| JP | 2004-069954 A | 3/2004 |
| JP | 2004-258209 A | 9/2004 |
| JP | 2005-037739 A | 2/2005 |
| JP | 2005-107005 A | 4/2005 |
| JP | 2006-030544 A | 2/2006 |
| JP | 2007-216610 A | 8/2007 |
| JP | 2007-271954 A | 10/2007 |
| JP | 2007-272132 A | 10/2007 |
| JP | 2008-070414 A | 3/2008 |
| JP | 2008-070415 A | 3/2008 |
| JP | 2008-122603 A | 5/2008 |
| JP | 2009-058954 A | 3/2009 |
| JP | 2009-075576 A | 4/2009 |
| JP | 2009-198748 A | 9/2009 |
| JP | 2009198748 A * | 9/2009 |

* cited by examiner

ANTIREFLECTION MEMBER AND MANUFACTURE METHOD FOR THE SAME

RELATED APPLICATIONS

This is a §371 of International Application No. PCT/JP2010/065411, with an international filing date of Sep. 8, 2010 (WO 2011/033976 A1, published Mar. 24, 2011), which is based on Japanese Patent Application Nos. 2009-217096, filed Sep. 18, 2009, 2009-217097, filed Sep. 18, 2009, and 2009-217098, filed Sep. 18, 2009, the subject matter of which is incorporated by reference.

TECHNICAL FIELD

This disclosure relates to an antireflection member, and an antireflection member production method.

BACKGROUND

Antireflection members such as antireflection film are provided at the outermost surface of image display apparatuses including cathode ray tube (CRT), plasma display panel (PDP), and liquid crystal display (LCD). In an antireflection film, the reflectance is reduced according to the principle of optical interference to prevent contrast reduction and reflected images from resulting from the reflection of outside light.

Some antireflection members with improved scratch resistance and abrasion resistance have been proposed as follows.

In a proposal, a coating layer consisting of a multifunctional (meth)acrylic compound and a fluorochemical surfactant mixed at a ratio of 99.9:0.1 to 90:10 (by mass) is cured to produce an antireflection film having the cured layer as the outermost layer (JP 2008-122603 A).

Another proposal offers an antireflection material consisting of a hard coat layer produced by curing a resin composition comprising electrically conductive ultrafine inorganic particles and a radiation curing type resin and a layer with a low refractive index containing fine hollow silica particles, which are stacked on a substrate. The resin composition for this hard coat layer contains at least one resin component that has a mass average molecular weight of 8,000 or more and 150,000 or less (JP 2007-271954 A).

Production methods as described below have been proposed to provide a simplified antireflection member production processes.

A proposal offers an antireflection layer production method that comprises the step of forming one coat of a coating composition consisting of fine particles with a low refractive index and fine particles with a medium to high refractive index dispersed in a binder resin. In this method, fine silica particles treated with a fluorine-based compound are used as the fine particles with a low refractive index. Due to a difference in specific gravity, fine particles with a lower refractive index are more abundant in the top to central portions of the antireflection layer while fine particles with a higher refractive index are more abundant in the central to bottom portions (JP 2007-272132 A).

In another proposal, a coat of a paint composition is spread over at least one face of a support substrate and dried to produce an antireflection film comprising two layers that have different refractive indices. This paint composition is characterized by containing two or more kinds of inorganic particles and a metal chelate compound, with at least one kind of inorganic particles surface-treated with a fluorine-based compound (JP 2009-058954 A).

Described below are proposals of antireflection members that focus on the function of the interlayer interface between layers that constitute an antireflection member.

A proposed optical film consists of a first transparent layer and a second transparent layer adjacent to each other, wherein the first transparent layer and the second transparent layer have different refractive indices and the contact interface between the first transparent layer and the second transparent layer scatters light. As light is scattered at the contact interface between the first transparent layer and the second transparent layer, the formation of interference fringes is depressed to allow the film to act as an optical film (JP 2005-107005 A).

An antireflection film having an electrically conductive transparent layer, hard coat layer with a high refractive index, and hard coat layer with a low refractive index formed in this order on its surface has been proposed. In this antireflection film, the roughness of the interface between the hard coat layer with a high refractive index and the hard coat layer with a low refractive index is lower than that of the interface between the electrically conductive transparent layer and the hard coat layer with a high refractive index, and the hard coat layer with a high refractive index and/or the hard coat layer with a low refractive index are formed of an organic and/or inorganic hybrid hard coat (JP 2004-258209 A).

It could therefore be helpful to provide an antireflection member that has the characteristics of high adhesiveness, scratch resistance, abrasion resistance and low interference irregularity, as well as the characteristics of low reflectance and high transparency.

The antireflection members proposed in JP '603 and JP 2007-271954 A require a hard coat layer of 2.5 μm or more and 5 μm or less to have high scratch resistance. In addition, coating operation is performed twice or three times to form two or more layers, including the hard coat layer, on a substrate. Thus, it will be difficult to produce these antireflection members in a simplified production process that requires both less material cost and a less number of steps.

In JP '603, a fluorochemical surfactant is added to reduce the surface free energy and a multifunctional acrylate is added to increase the crosslink density with the aim of ensuring that good adhesion properties, high scratch resistance, and high abrasion resistance are achieved together with low reflectance and high transparency. However, they fail to have sufficient effects. In addition, the fluorochemical surfactant is not fixed on the antireflection layer through chemical bonds, often causing the problem of transfer of the fluorochemical surfactant to other layers in the antireflection film. In JP '603, furthermore, no means are shown to depress interference irregularity.

The antireflection material proposed in JP 2007-271954 A has a wear resistant only enough to allow the layer with a lower refractive index in the antireflection material to slide to and fro 100 times under a load of 1 Kg. This level of abrasion resistance is lower than required for several times of cleaning operations that are considered necessary at present.

For the antireflection layer proposed in JP '132, coating operation is performed only once to produce a low refractive index layer and a high refractive index layer to constitute the antireflection layer. In JP '132, it is described that the low refractive index layer and the high refractive index layer do not form a distinct interface but merge with each other, thereby solving the problem of separation between these layers with different refractive indices more effectively than an antireflection layer with a distinct interface. It is expected, however, that the distinct interface between merged layers leads to a lower reflectance and transparency.

In JP 2009-058954 A, it is described that the two layers with different refractive indices have a distinct interface. However, the structure of the interface is not described in detail.

JP '005 and JP '209 focus on the function of the interface between layers that constitute an antireflection member, but its aim is to reduce interference pattern formation and prevent whitening. Furthermore, the layers that correspond to the low refractive index layer and high refractive index layer have a rough interface. This roughness serves to depress interference irregularity, but the interface scatters light, thereby decreasing the transparency.

SUMMARY

We provide an antireflection member comprising an antireflection layer containing two adjacent layers with different refractive indices, the antireflection layer being formed at least on a first surface of a support substrate, and the one of the two adjacent layers with different refractive indices farther from the support substrate being referred to as the first layer, and the other being referred to as the second layer, wherein the antireflection layer contains two or more kinds of particles of different component substances and one or more kinds of binders, and the ratio b/a is more than 1.10 and less than 1.45, where "a" denotes the length of the line segment A1A2 connecting two arbitrarily-selected points A1 and A2 located on the interface between the first layer and the second layer with a distance of 500 nm or more and "b" denotes the length of the line segment A1A2 projected in the direction perpendicular to the first surface of the support substrate onto the interface between the first layer and the second layer.

Our antireflection member has the characteristics of high adhesiveness, scratch resistance, abrasion resistance and low interference irregularity, as well as the characteristics of low reflectance and high transparency.

Figure 1:
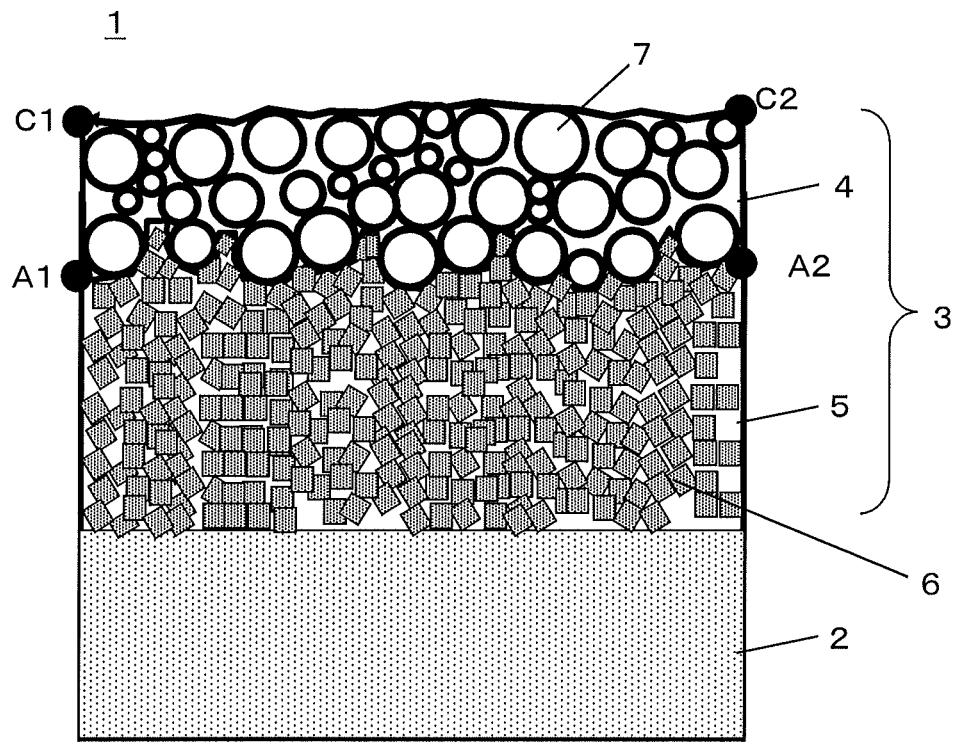
FIG. 1 illustrates a schematic cross section view of an example of the antireflection member.

EXPLANATION OF NUMERALS 1. antireflection member
2. support substrate
3. antireflection layer
4. low refractive index layer
5. high refractive index hard coat layer
6. particles contained in the second layer
7. particles contained in the first layer
8. first surface of the support substrate

DETAILED DESCRIPTION

Adhesiveness, scratch resistance, and abrasion resistance are addressed first. For coated products composed of two or more layers, the adhesiveness between the layers at their interface is one of the major factors that affect the adhesiveness, scratch resistance and abrasion resistance of the products. In the antireflection members proposed in JP '603 and JP 2007-271954 A, the antireflection layer is produced by two or more repetitions of coating operation. Accordingly, the surface tension caused in the liquid film during the coating operation acts to make the liquid film surface smooth and in turn make the interfaces between the layers smooth, leading to a decreased adhesiveness from a physical point of view. Furthermore, no chemical bonds, such as covalent bond, exist between the layers and, therefore, the adhesiveness is small also from a chemical point of view. As a result, destruction of the interlayer interfaces is likely to take place when a stress is applied to the surface of the antireflection member.

In the antireflection member proposed in JP 2009-058954 A, coating operation is performed only once to produce two layers, resulting in the formation of chemical bonds, such as covalent bond, at the interlayer interface. Therefore, the adhesiveness is expected to improve from a chemical point of view, compared to the antireflection members proposed in JP '603 and JP 2007-271954 A. According to replication of Examples of JP 2009-058954 A, however, the structure of the interface produced by this technique is smoother than that of the interface produced, suggesting an insufficient adhesiveness from a physical point of view. In addition, this technique includes the formation of a hard coat layer between the antireflection layer and the support substance to increase abrasion resistance. Thus, an additional interlayer interface containing no chemical bonds exists between the antireflection layer and the hard coat layer, leading to interlayer interface destruction in this portion.

Simultaneous existence of interference irregularity and transparency is discussed next. It is considered that there are visible long-period changes in the thickness of the antireflection layer to cause shifted interference effects, leading to interference irregularity in the form of visible changes of reflected colors. Such thickness variations in the antireflection layer can be attributed to variations in film thickness resulting from fluctuating of the liquid film during the coating step, variations in film thickness resulting from fluctuations in drying rate during the drying step, and variations in the thickness of the substrate. In the antireflection member proposed in JP '005, the interface can scatter light to eliminate shifts of interference effects. However, such a light-scattering interface reduces the transparency to a large degree.

We focused on the interface within the antireflection member in developing a method for achieving the characteristics of high adhesiveness, scratch resistance, abrasion resistance and low interference irregularity as well as the characteristics of low reflectance and high transparency. Then, we found that both the characteristics of high adhesiveness, scratch resistance, abrasion resistance and low interference irregularity and the characteristics of low reflectance and high transparency can be achieved by forming an interface with a specific structure.

Specifically, physical interlayer adhesiveness is developed by allowing the two adjacent layers with different refractive indices in the antireflection layer to have an interface that is finely intricate but has no influence on the antireflection performance and transparency.

The first layer and the second layer in the antireflection layer has a finely intricate interface, resulting in fluctuations in thickness of the first layer in the plane direction. These fluctuations serve to reduce the shifts of interference effects, thereby reducing the interference irregularity. The degree of fine intricateness of the interface (heights from the bottoms of recessed portions to the tops of the protruded portions) is small enough, as compared with the wavelength of light, to prevent scattering of light and, therefore, has no influence on the transparency.

Antireflection Member

Our antireflection member comprises a layer containing two adjacent layers with different refractive indices and having the function of preventing reflection, referred to as antireflection layer, formed at least on either surface of a support substrate. If the support substance is in the form of a plastic film, such an antireflection member is commonly referred to as antireflection film. Its necessity, required performance, and the like are described in JP S59-50401 A. Specifically, it is preferable that two or more adjacent layers with a difference in refractive index of 0.03 or more are stacked on the support substance. The difference in refractive index is more preferably 0.05 or more. Furthermore, the difference in refractive index is more preferably 5.0 or less. The difference in refractive index is determined by comparing the refractive index of each adjacent layer. The layer with the lower refractive index is referred to as the low refractive index layer, while the layer with the higher refractive index is referred to as the high refractive index layer. It is preferable that the layer located farther from the support substance is the low refractive index layer, while the layer located nearer to the support substance is the high refractive index layer.

If the high refractive index layer has resistance to scratching in addition to high refractive index, it is commonly referred to as high refractive index hard coat layer instead of high refractive index layer. It is preferable that a high refractive index hard coat layer also has the function of enhancing the adhesiveness between the support substance and the low refractive index layer. It is preferable that a high refractive index hard coat layer has a pencil hardness of H or higher under a load of 1 kg. The pencil hardness is more preferably 2H or higher and still more preferably 3H or higher. No problems will arise if it has an extremely high pencil hardness, but the practical upper limit is 9H or so.

It is preferable that the antireflection member has a minimum reflectance of 0% or more and 1.0% or less as determined by spectroscopy. The minimum reflectance is more preferably 0% or more and 0.7% or less, particularly preferably 0% or more and 0.6% or less, and most preferably 0% or more and 0.5% or less.

It is preferable that the antireflection member has high transparency. Low transparency is not preferable because when used in image displaying equipment, image quality will take place due to a decrease in chromaticness of images. The haze value can be used for evaluation of the transparency of an antireflection member. The haze value is a measure of turbidity of transparent material specified in JIS K 7136 (2000). A smaller haze value indicates a higher transparency. It is preferable that an antireflection member has a haze value of 2.0% or less. The haze value is more preferably 1.8% or less and particularly preferably 1.5% or less. Although the haze value should be as small as possible to increase the transparency, it is difficult to reduce it to 0%, and the practical lower limit is considered to be 0.01% or so. As the haze value exceeds 2.0%, image degradation will be more likely to occur.

The antireflection member may contain an adhesion improving layer, moisture resistant layer, antistatic layer, shield layer, basecoat layer, hard coat layer, and protective layer, in addition to the antireflection layer. The shield layer serves to shield electromagnetic waves and infrared ray.

If provided on the surface on the viewer's side of an image displaying apparatus such as PDP, the antireflection member allows the image displaying apparatus to have high antireflection performance. It is important for the antireflection member to be installed so that the support substance side of the antireflection member faces the image displaying apparatus.

FIG. 1 shows the constitution of our antireflection member. The antireflection member 1 comprises an antireflection layer 3 containing two adjacent layers with different refractive indices and formed on at least first surface of a support substance 2. Of the two adjacent layers, the one farther from the support substance 2 is referred to as the first layer 4, while the other one is referred to as the second layer 5. For the antireflection layer, it is preferable that the first layer is lower in refractive index than the second layer. Thus, it is preferable that the first layer is the low refractive index layer while the second layer is the high refractive index layer.

Antireflection Layer

There are two major examples, the first and the second, for the antireflection layer. The features of the second examples are also the preferable features of the first example. The features of the first example are also the preferable features of the second example.

First Example of Antireflection Layer

The first example of the antireflection layer comprises two or more kinds of particles of different constituent elements and one or more binders.

Figure 2:
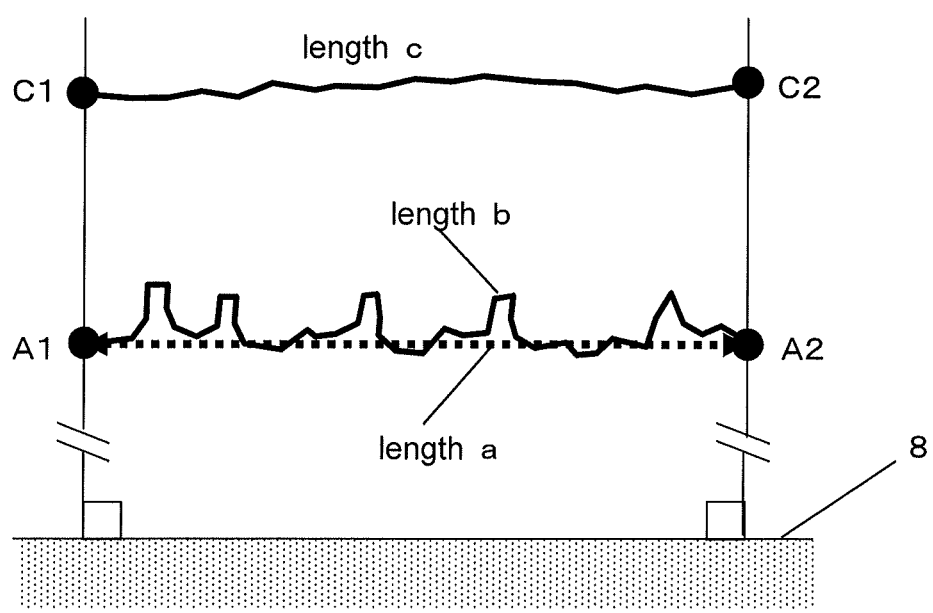
FIG. 2 is a schematic view illustrating the shape of the interface between the first layer and the second layer and the shape of the surface of the antireflection member.

The interface between the first layer and the second layer has a characteristic shape. To illustrate this characteristic shape, length a and length b are defined as shown in FIGS. 1 and 2.

Definition of Length a and Length b:
(1) Two points A1 and A2 located on the interface between the first layer and the second layer with a linear distance of 500 nm or more are assumed.
(2) The length of the line segment between A1 and A2 is referred to as length a.
(3) The length of the line produced by projecting the line segment A1A2 in the direction perpendicular to the first surface 8 of the support substrate onto the interface between the first layer and the second layer is referred to as length b.

This antireflection layer serves to provide an antireflection member that has the characteristics of high adhesiveness, scratch resistance, abrasion resistance and low interference irregularity, as well as the characteristics of low reflectance and high transparency.

Figure 3:
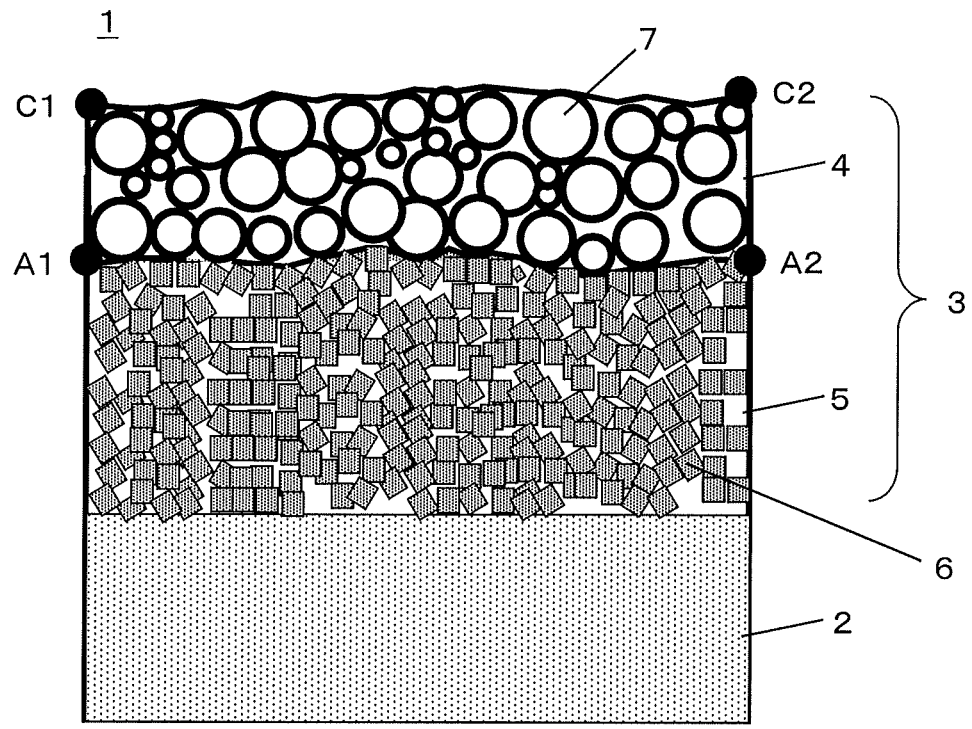
FIG. 3 illustrates a schematic cross section view of an antireflection member that is different from ours.
Figure 4:
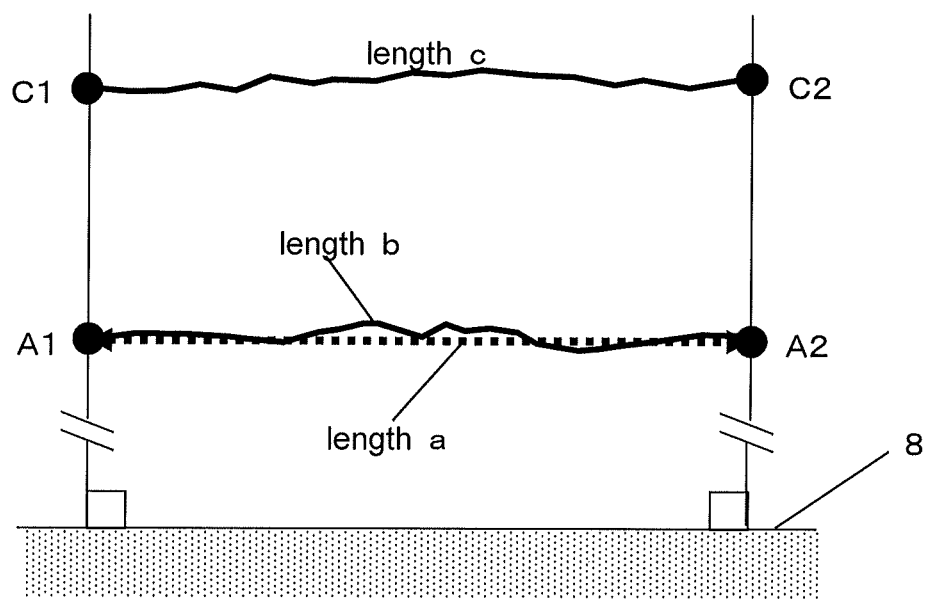
FIG. 4 is a schematic view illustrating the shape of the interface between the first layer and the second layer and the shape of the surface of the antireflection member in FIG. 3.

For the antireflection layer, the ratio b/a between length a and length b is more than 1.10 and less than 1.45. The lower limit of b/a is preferably 1.15 or more. The upper limit of b/a is preferably 1.35 or less. An combination of an upper and a lower limit of b/a may be adopted as appropriate. If b/a is 1.10 or less, the interface between the first layer and the second layer will be in a state as illustrated in FIGS. 3 and 4 and will not work effectively to increase the physical adhesiveness of the interface between the first layer and the second layer, failing to develop scratch resistance. If b/a is 1.45 or more, the interface will scatter light, leading to a decreased transparency and an increased reflectance.

It is preferable that the particles 6 existing in the second layer has a number average particle diameter of 25 nm or less. It is more preferably 20 nm or less. If the particles existing in the second layer have a number average particle diameter of 25 nm or less, it will be easy for the interface between the first layer and the second layer to have a shape with a b/a ratio of more than 1.10 and less than 1.45. No problems will occur if the particles existing in the second layer have an extremely small number average particle diameter, but practically the lower limit may be 1 nm because it is limited by the size of the crystal nuclei formed during particle production.

It is preferable that the particles 7 existing in the first layer have a number average particle diameter of 30 nm or more and 200 nm or less. The lower limit of the number average particle diameter is more preferably 40 nm or more. The upper limit of the number average particle diameter is more preferably 150 nm or less. A combination of an upper and a lower limit of number average particle diameter may be adopted as appropriate. If the number average particle diameter is 30 nm or more, it will be easy to control b/a in the range of more than 1.10 and less than 1.45. If the number average particle diameter is 200 nm or less, it will be easy to maintain transparency.

Thus, it is preferable that the antireflection layer contains two or more kinds of particles of different constituent elements, and the particles contained in the first layer has a larger number average particle diameter than the number average particle diameter of the particles contained in the second layer. It is more preferable that the particles contained in the first layer and the particles contained in the second layer are of different constituent elements, and that the particles contained in the first layer is larger than the number average particle diameter of the particles contained in the second layer.

It is preferable that the first layer has a thickness of 50 nm or more and 200 nm or less. The lower limit of the thickness is more preferably 70 nm or more, and particularly preferably 90 nm or more. The upper limit of the thickness is more preferably 150 nm or less, and particularly preferably 130 nm or less. A combination of an upper and a lower thickness limit of the second layer may be adopted as appropriate. If the first layer has a thickness of less than 50 nm, a light interference effect will not be achieved and the antireflection effect will decline, possibly leading to increased background reflections of images. Also in cases where the thickness is more than 200 nm, a light interference effect will not be achieved, possibly leading to increased background reflections of images.

It is preferable that the thickness of the second layer is 500 nm or more and 4,000 nm or less. The lower limit of the thickness is more preferably 550 nm or more, and particularly preferably 600 nm or more. The upper limit of the thickness is more preferably 3,000 nm or less, and particularly preferably 2,000 nm or less. An combination of an upper and a lower thickness limit of the second layer may be adopted as appropriate. If the second layer has a thickness of 500 nm or more and 4,000 nm or less, it will be possible to further improve the curl properties, reflectance, and transparency while maintaining scratch resistance and abrasion resistance. Furthermore, the antireflection layer itself acts as a hard coat and, therefore, high scratch resistance and abrasion resistance can be achieved even if the antireflection layer is formed directly on the support substrate without providing a hard coat layer on the support substrate.

Next, length c is defined as shown in FIG. 1 to illustrate the features of the shape of the opposite surface of the antireflection layer to the support substrate (hereinafter, assumed to be the surface of the antireflection layer).

Definition of Length c:

The length of the line produced by projecting the line segment A1A2 in the direction perpendicular to the first surface of the support substrate onto the surface of the antireflection layer is referred to as length c.

FIG. 2 shows the relation among length a, length b, and length c. It is preferable that the ratio b/c between length c and length b is more than 1.05 and less than 1.40. The ratio b/c is more preferably more than 1.10 and less than 1.40. If the ratio b/c is more than 1.05 and less than 1.40, physical adhesiveness of the interface is secured, making it possible to improve the transparency and antireflection performance while maintaining the scratch resistance, abrasion resistance, and the like.

There are no specific limitations on the method to produce an antireflection material with a b/a ratio of more than 1.10 and less than 1.45 and a b/c ratio of more than 1.05 and less than 1.40. The following processes (i) and (ii), for instance, may be used:

(i) A support substrate is supplied to a coating step, and then using specific curing conditions and materials, the support substrate is coated with one liquid film layer and dried, followed by taking the support substrate out of the coating step. This operation is carried out once more so that two layers with different refractive indices are formed on the support substrate.

(ii) A support substrate is supplied to a coating step, and then using specific curing conditions and materials, the support substrate is coated with only one coating composition for forming an antireflection layer and dried, followed by taking the support substrate out of the coating step. Thus, two layers with different refractive indices are formed simultaneously on the support substrate.

Of these two processes, process (ii) is preferable. Application of a coating composition is performed only once and two layers are formed through spontaneous layer structure development, thus allowing the interface between the first layer and the second layer and the surface of the antireflection layer to have an intended roughness. As a result, the b/a ratio can be controlled in the range of more than 1.05 and less than 1.45 and the b/c ratio in the range of more than 1.05 and less than 1.40.

To form two layers with different refractive indices on a support substrate, the following processes (iii) to (v) are also available, but it is difficult for these processes to produce an antireflection material with a b/a ratio of more than 1.10 and less than 1.45 and a b/c ratio of more than 1.05 and less than 1.40:

(iii) A support substrate is supplied to a coating step, and then the support substrate is coated with a coating liquid consisting of two separated layers and dried, followed by taking the support substrate out of the coating step. Thus, two layers with different refractive indices are formed simultaneously on the support substrate (simultaneous multilayer coating).

(iv) After supplying a support substrate to a coating step, the support substrate is coated with a coating film to form a layer and dried, and then it is coated with another coating film to form a second layer and dried, followed by taking the support substrate out of the coating step. Thus, two layers with different refractive indices are formed simultaneously on the support substrate (continuous sequential coating).

(v) After supplying a support substrate to a coating step, the support substrate is coated with a coating liquid to form a layer, and then coated with another coating liquid to form a second layer, and subsequently the two layers are dried together, followed by taking the support substrate out of the coating step. Thus, two layers with different refractive indices are formed simultaneously on the support substrate (wet-on-wet coating).

To produce a second layer with a thickness in the preferable range by performing production process (ii), it is preferable that the first layer and the second layer in the antireflection layer comprise a component derived from at least one compound selected from the group of the compounds having a fluoroalkyl group and reactive portion with a carbon number of 4 or more, compounds having a hydrocarbon group and reactive portion with a carbon number of 8 or more, and compounds having a siloxane group and reactive portion. Hereinafter, a compound having a fluoroalkyl group and reactive portion with a carbon number of 4 or more is referred to as a fluorine compound B, a compound having a hydrocarbon group and reactive portion with a carbon number of 8 or more referred to as a long chain hydrocarbon compound B, and a compound having a siloxane group and reactive portion referred to as silicone compound B. Furthermore, a compound selected from the group of a fluorine compound B, long chain hydrocarbon compound B, and silicone compound B is referred to as a hydrophobic compound B. If the coating composition to form the antireflection layer contains a hydrophobic compound B, it promotes spontaneous form of a layered structure. Even when the thickness of the second layer is in our preferable range, two layers may be formed in one coating/drying step.

It is preferable that the coating composition contains two or more kinds of particles of different constituent elements, a binder material, and a solvent, and that at least one of the two or more kinds of particles are treated with a fluorine compound. Hereinafter, the fluorine compound used for surface treatment of the particles is referred to as fluorine compound A. The use of such a coating composition serves to further promote the spontaneous formation of a layered structure. The reasons are inferred as follows. The two or more kinds of inorganic particles of different constituent elements contained in the coating composition exhibit Brownian movement in the coating composition. When these particles reach the gas-liquid or solid-liquid interface, the low surface energy particles are fixed on the atmosphere side while the high surface energy particles are fixed on the support substrate side as a result of a difference in surface free energy. This leads to spontaneous formation of a layered structure.

In the antireflection layer, it is preferable there is a definite interface in terms of particle arrangement between the first layer and the second layer, i.e., the two layers with different refractive indices. A definite interface clearly separates a layer from another layer. A separable interface as referred to herein is one that can be identified by observing a cross section transmission electron microscopy (TEM) and can be identified by the method described below.

To allow spontaneous formation of a layered structure to proceed uniformly within the coating surface, it is preferable that the surface of the support substrate where the coating composition is spread has a surface roughness of 40 nm or less. The surface roughness is more preferably 35 nm or less and particularly preferably 30 nm or less.

Particles

The antireflection layer contains two or more kinds of particles of different constituent elements. These particles are preferably inorganic particles. Inorganic particles as referred to herein are particles formed of an inorganic compound.

The particles of different constituent elements preferably comprise two or more and 20 or less kinds of particles. The number of kinds of the particles is more preferably two or more and 10 or less, particularly preferably two or more and 3 or less, and most preferably two.

The kinds of particles are determined in terms of the kinds of elements that constitute the particles. For instance, particles of titanium oxide ($TiO_2$) and those of nitrogen-doped titanium oxide ($TiO_{2-x}N_x$) produced by replacing part of the oxygen atoms in titanium oxide with nitrogen atoms, which are anions, are different kinds of particles because these particles are constituted of different elements. In the case of particles of the same elements such as ZnO particles composed only of Zn and O, all of them are considered to be of the same kind even when they contain particles with different diameters or they differ in composition ratios between Zn and O. In the case where there are two or more Zn particles with different oxidation numbers, these particles are considered to be of the same kind if they are constituted of the same kinds of elements. In the case of surface-treated particles, their kinds are determined in terms of the elements that constitute the untreated particles.

There are no specific limitations on the particles in the antireflection layer as long as they consist of two or more kinds of particles of different constituent elements, but it is preferable that the particles mainly contained in the first layer are of different constituent elements from those mainly contained in the second layer. The expression "the particles mainly contained" refers to the particles that account for the largest proportion in the layer. In the case where the antireflection layer contains titanium oxide and inorganic particles surface-treated with fluorine compound A, for instance, both the first layer and the second layer may contain the two kinds of particles, but it is preferable that the first layer mainly contains inorganic particles surface-treated with fluorine compound A while the second layer mainly contains titanium oxide. In this case, furthermore, it is particularly preferable that the first layer contains only inorganic particles surface-treated with fluorine compound A while the second layer contains only titanium oxide.

Second Example of the Antireflection Layer

The second example of the antireflection layer is such that the ionic strength ratio $F_L/F_H$ of the fluorine atom is 2 or more and 150 or less, where $F_L$ denotes the ion strength of the fluorine atom determined by SIMS at the through-thickness center of the first layer while $F_H$ denotes the ion strength of the fluorine atom determined by SIMS at the through-thickness center of the second layer. This antireflection layer serves to provide an antireflection member that has good characteristics including high adhesiveness, chemical resistance, weather resistance, and low reflectance. The ion strength ratio ($F_L/F_H$) is more preferably 2.5 or more and 130 or less, and still more preferably 3 or more and 100 or less. If the ion strength ratio ($F_L/F_H$) is maintained at 2 or more and 150 or less, the second layer will contain fluorine atoms with a similar surface energy to that in the first layer, serving to depress coating irregularity when the first layer is formed on the second layer. In addition, the second layer and the first layer will have improved interlayer adhesiveness and chemical resistance as well as improved weather resistance and antireflectiveness.

If the ion strength ratio ($F_L/F_H$) is less than 2, the second layer will contain fluorine atoms excessively to reduce the bond strength at the interface, possibly leading to a decreased interlayer adhesiveness between the first layer and the second layer and, in turn, deterioration in interlayer adhesiveness, chemical resistance, and weather resistance. If the ion strength ratio ($F_L/F_H$) is more than 150, although antireflectiveness can be achieved, the second layer will contain a less number of fluorine atoms and suffer from a reduction in the adhesiveness with the first layer, which contains a large number of fluorine atoms, possibly leading to deterioration in interlayer adhesiveness, chemical resistance, and weather resistance. When assuming that all the components constituting the first layer and the second layer together account for 100 mass %, the ion strength ratio ($F_L/F_H$) can be controlled at 2 or more and 150 or less by using fluorine compound B as hydrophobic compound B and adding components derived from it up to 5 mass % or more and 50 mass % or less.

Furthermore, it is preferable that the equation $F_H \geq O_H$ holds where $O_H$ denotes the ion strength of the oxygen atom determined by SIMS at the through-thickness center of the second layer. The state of $F_H \geq O_H$ can be maintained by adding particles of metal oxide or metalloid oxide in the antireflection layer. As a more preferable control method, inorganic particles surface-treated with fluorine and other inorganic particles that are free from surface treatment with fluorine and contain oxygen atoms in the form of metal oxide, metalloid oxide, or the like are added to the antireflection layer, and the ratio between the contents of these two kinds of inorganic particles (i.e., the content of the inorganic particles surface-treated with fluorine/the content of the other inorganic particles) is maintained in the range of 1/30 or more and 1/1 or less as a mass ratio.

Coating Composition

Described below is the coating composition used to form the antireflection layer, but production of the antireflection member is not limited to production methods using this coating composition, and may be achieved by, for instance, forming a high refractive index layer and then coating a coating composition to constitute a low refractive index layer followed by curing.

A preferable coating composition to be used to form an antireflection layer contains constitute components for the first layer mixed with those for the second layer. An antireflection layer consisting of a first layer and a second layer with different refractive indices can be formed on a support substrate by applying this coating composition on the support substrate in only one coating step. This results in an antireflection member with high antireflectiveness.

It is preferable that the coating composition contains two or more kinds of inorganic particles of different constituent elements. It is preferable that at least one of the two or more kinds of inorganic particles are inorganic particles surface-treated with fluorine compound A. Hereinafter, inorganic particles surface-treated with fluorine compound A are referred to as fluorine-treated inorganic particles.

Viscosity of the Coating Composition

It is preferable that the viscosity change ($\Delta\eta$) of the coating composition is 0.1 mPa·s or more and 10 mPa·s or less. If the viscosity change ($\Delta\eta$) is in this range, it will be easy for an antireflection layer constituted of two layers with a large difference in refractive index to be produced by applying the coating composition on a support substrate in one coating step. If the viscosity change ($\Delta\eta$) is more than 10 mPa·s, the solid content increases to cause evaporation of the organic solvent and a decrease in flowability as the coating composition is applied and dried, which is simultaneously accompanied by an increased interparticle interaction among the fluorine-treated inorganic particles and form aggregates of the fluorine-treated inorganic particles, making it difficult for the fluorine-treated inorganic particles to move toward the boundary with air (i.e., toward the outermost surface layer). This can lead to failure in producing two layers with a large difference in refractive index, resulting in decreased antireflectiveness. If the viscosity change ($\Delta\eta$) is less than 0.1 mPa·s, it will be possible to depress interparticle interaction among the fluorine-treated inorganic particles and formation of aggregates of the fluorine-treated inorganic particles in the above mentioned steps, but on the other hand, flowability will be increased excessively, making it difficult for the fluorine-treated inorganic particles to separate from each other. This can lead to mixed existence of two layers and, in turn, failure in producing two layers with a large difference in refractive index, possibly resulting in decreased antireflectiveness.

The viscosity change ($\Delta\eta$) is more preferably 0.1 mPa·s or more and 9 mPa·s or less, still more preferably 0.1 mPa·s or more and 8 mPa·s or less, and most preferably 0.1 mPa·s or more and 7 mPa·s or less.

The viscosity change ($\Delta\eta$) of the coating composition referred to herein is the difference in viscosity ($\eta_1 - \eta_2$) between the viscosity $\eta_1$ at a shear rate of 0.1 s$^{-1}$, and viscosity $\eta_2$ at a shear rate of 10 s$^{-1}$. The viscosity $\eta_1$ at a shear rate of 0.1 s$^{-1}$, and viscosity $\eta_2$ at a shear rate of 10 s$^{-1}$, can be determined by using a common rotary rheometer.

The shear rate is the rate of change in the strain $\gamma$ caused in a fluid and expressed by the following equation:

$$\gamma' = d\gamma/dt_0.$$

There are three types of rotary rheometers available for the measurement of viscosity, namely, cone-and-plate type, plate-and-plate type, and coaxial cylinder type. To measure the viscosities of $\eta_1$ and $\eta_2$ of the coating composition, the use of a cone-and-plate type or coaxial cylindrical type apparatus is suitable because correction of measurements is not necessary. In particular, the use of a cone-and-plate one is the most suitable because of necessity of only a small quantity of liquid and high convenience. Measurements with a cone-and-plate type apparatus are used herein.

A cone-and-plate apparatus consists of a combination of a circular cone type body of revolution (cone) and a stationary disk (plate), with a gap angle $\delta$ between the disk and the circular cone. A specimen is twisted between the circular cone shaped body of revolution and the stationary disk for making measurements, that is, the circular cone shaped body of revolution is rotated at an angular velocity of $\Omega$ while measuring the torque M acting on the stationary disk. The shear rate is calculated from the measured angular velocity $\Omega$ and the shear stress $\sigma$ is calculated from the measured torque M by the following equations:

$$\gamma' = (1/\delta)\Omega$$

$$\sigma = \{3/(2\pi R^3)\}M.$$

The viscosity $\eta$, furthermore, is represented by the following equation:

$$\eta(\gamma') = \sigma/\gamma'_0.$$

To maintain the viscosity change ($\Delta\eta$) of the coating composition in the range of 0.1 mPa·s or more and 10 mPa·s or less, it is important that at least one of the two or more kinds of inorganic particles of different constituent elements in the coating composition is fluorine-treated inorganic particles. Furthermore, it is preferable that the coating composition contains hydrophobic compound B in addition to fluorine compound A used as the fluorine-treated inorganic particles. This allows the viscosity change (Δη) of the coating composition to be controlled in the range of 0.1 mPa·s or more and 10 mPa·s or less.

To control the viscosity change (Δη) of the coating composition in the range of 0.1 mPa·s or more and 10 mPa·s, it is also preferable that a multifunctional acrylate having three or more acryloyl oxy group in one molecule is contained as a binder component in the coating composition, along with hydrophobic compound B.

Inorganic Particles Contained in the Coating Composition

It is preferable that the coating composition contains two or more kinds of inorganic particles of different constituent elements. With respect to the number of kinds, it is preferable that two or more and 20 or less kinds of inorganic particles are contained. The number of kinds of the inorganic particles is more preferably two or more and 10 or less, particularly preferably two or more and three or less, and most preferably two. The kinds of particles are determined in terms of the kinds of elements that constitute the particles as described above.

It is preferable that at least one of the two or more kinds of inorganic particles of different constituent elements contained in the coating composition are inorganic particles surface-treated with fluorine compound A, i.e., fluorine-treated inorganic particles. Such fluorine-treated inorganic particles are suitable as a constituent of the first layer. The fluorine-treated inorganic particles can move toward the boundary with air (outermost surface layer) to form the first layer (low refractive index layer). It is preferable from the viewpoint of antireflectiveness that the coating composition to be used contain both fluorine-treated inorganic particles and inorganic particles free from surface treatment with fluorine compound A, rather than that all of the two or more kinds of inorganic particles of different constituent elements are fluorine-treated inorganic particles, because it will be possible to produce two layers with a large difference in refractive index. Thus, it is more preferable that the coating composition contains both one or more kinds of fluorine-treated inorganic particles and one or more kinds of inorganic particles free from surface treatment with fluorine compound A.

First, the fluorine-treated inorganic particles are described below. It is preferable that the inorganic particles that constitute the fluorine-treated inorganic particles contain at least one element selected from the group of Si, Na, K, Ca, and Mg. It is more preferable that the inorganic particles contain at least one compound selected from the group of silica ($SiO_2$), alkali metal fluorides (NaF, KF and the like) and alkaline earth metal fluorides ($CaF_2$, $MgF_2$ and the like). Silica particles are particularly preferable in terms of durability, refractive index, and the like. Hereinafter, silica particles surface-treated with fluorine compound A are referred to as fluorine-treated silica particles.

The term "silica particles" generically refers to particles of silicon compounds or polymerization (condensation) products of organic silicon compounds, such as particles derived from $SiO_2$ or other silicon compounds as common examples.

For the fluorine-treated inorganic particles, there are no specific limitations on the shape of their constituent inorganic particles before surface treatment, but sphere is preferable from the viewpoint of the refractive index of antireflection layers to be produced from the coating composition. Furthermore, it is more preferable that the constituent inorganic particles of the fluorine-treated inorganic particles are silica particles and that the silica particles are hollow or porous. The hollow silica particles are silica particles containing hollows in their interior. The porous silica particles are silica particles containing pores in their surface or interior. If the inorganic particles including silica particles have a polyhedral structure and an antireflection layer is produced from a coating composition containing these particles, such inorganic particles can align without spaces among them in the layer, possibly failing to have transparency required for producing image displaying equipment. The use of inorganic particles such as hollow silica particles and porous silica particles serves to decrease the density of the low refractive index layer that constitutes part of the antireflection layer. In particular, it is preferable that hollow silica particles or porous silica particles are used as the constituent inorganic particles of the fluorine-treated inorganic particles, because those fluorine-treated silica particles will tend to be contained in the low refractive index layer in the antireflection layer.

It is preferable that the inorganic particles before surface treatment with fluorine have a number average particle diameter of 1 nm or more and 200 nm or less. The number average particle diameter is more preferably 20 nm or more and 200 nm or less and particularly preferably 40 nm or more and 150 nm or less. If the number average particle diameter of the inorganic particles is less than 1 nm, the void density in the first layer will decrease, possibly leading to an increase in refractive index or a decrease in transparency. If the number average particle diameter of the inorganic particles is more than 200 nm, the low refractive index layer will be too thick, possibly leading to a decrease in antireflection performance.

The surface treatment of inorganic particles with fluorine compound A may be carried out either in one step or in multiple steps. Furthermore, fluorine compound A may be used in two or more steps or fluorine compound A may be used in only one step.

Fluorine compound A used in the surface treatment step for inorganic particles may be of a single compound or of two or more different compounds.

The surface treatment with fluorine compound A is one designed to modify the inorganic particles chemically to introduce fluorine compound A to the inorganic particles.

To introduce a fluorine compound directly to inorganic particles, they may be stirred with one or more fluoroalkoxysilane compounds having both a fluorine segment and a silyl ether group (which may be a silanol group resulting from hydrolysis of a silyl ether group) in one molecule and an initiator. If a fluorine compound is directly introduced to inorganic particles, however, reactivity control will be difficult, or uneven coating and the like tends to take place when they are used for coating after being processed into a coating liquid.

To chemically modify inorganic particles to introduce fluoroalkyl groups to the inorganic particles, the inorganic particles may be processed with a crosslinking component for linking with fluorine compound A. Examples of the fluorine compound A with a functional group include fluoroalkyl alcohol, fluoroalkyl epoxide, fluoroalkyl halide, fluoroalkyl acrylate, fluoroalkyl methacrylate, and fluoroalkyl carboxylate (which may be in the form of anhydride or ester).

A crosslinking component is a compound that has no fluorine atom in its molecule but contains at least one portion that can react with fluorine compound A and at least one portion that can react with inorganic particles. To contain a portion that can react with inorganic particles, the compound is preferably a silyl ether or a hydrolysate of a silyl ether from the viewpoint of reactivity. Such compounds are generally referred to as silane coupling agents and include, for instance, glycidoxy alkoxysilanes, aminoalkoxysilanes, acryloylsilanes, methacryloylsilanes, vinylsilanes, and mercaptosilanes.

More preferable fluorine-treated inorganic particles are those produced by treating inorganic particles with a compound as represented by the following Formula (1) and further treating them with fluorine compound A as represented by the following Formula (2):

$$B\text{-}R^4\text{—}SiR^5{}_n(OR^6)_{3-n} \quad (1)$$

$$D\text{-}R^7\text{—}R^{f2} \quad (2).$$

In the above general formulae, B and D denote a reactive double bond group, $R^4$ and $R^7$ denoting an alkylene group with a carbon number of 1 to 3 or an ester structure derived from it, $R^5$ and $R^6$ denoting hydrogen or an alkyl group with a carbon number of 1 to 4, $R^{f2}$ denoting a fluoroalkyl group, and n denoting an integer of 0 to 2, and they may contain a side chain in their structure.

A reactive double bond group is a functional group that can undergo chemical reaction involving radicals generated by energy of light, heat, or the like, and its specific examples include vinyl group, allyl group, acryloyl group, and methacryloyl group.

Specific examples of compounds as represented by Formula (1) include acryloxyethyl trimethoxysilane, acryloxypropyl trimethoxysilane, acryloxybutyl trimethoxysilane, acryloxy-pentyl trimethoxysilane, acryloxyhexyl trimethoxysilane, acryloxyheptyl trimethoxysilane, methacryloxyethyl trimethoxysilane, methacryloxypropyl trimethoxysilane, methacryloxybutyl trimethoxysilane, methacryloxyhexyl trimethoxysilane, methacryloxyheptyl trimethoxysilane, methacryloxypropylmethyl dimethoxysilane, methacryloxypropylmethyl dimethoxysilane and compounds produced by replacing the methoxy group in the former compounds with other alkoxyl groups or hydroxyl groups.

Specific examples of compounds as represented by Formula (2) include 2,2,2-trifluoroethyl acrylate, 2,2,3,3,3-pentafluoropropyl acrylate, 2-perfluorobutylethyl acrylate, 3-perfluorobutyl-2-hydroxypropyl acrylate, 2-perfluorohexylethyl acrylate, 3-perfluorohexyl-2-hydroxypropyl acrylate, 2-perfluorooctylethyl acrylate, 3-perfluorooctyl-2-hydroxypropyl acrylate, 2-perfluorodecylethyl acrylate, 2-perfluoro-3-methylbutylethyl acrylate, 3-perfluoro-3-methoxy butyl-2-hydroxypropyl acrylate, 2-perfluoro-5-methylhexylethyl acrylate, 3-perfluoro-5-methylhexyl-2-hydroxypropyl acrylate, 2-perfluoro-7-methyloctyl-2-hydroxypropyl acrylate, tetrafluoropropyl acrylate, octafluoropentyl acrylate, dodecafluoroheptyl acrylate, hexadecafluorononyl acrylate, hexafluorobutyl acrylate, 2,2,2-trifluoroethyl methacrylate, 2,2,3,3,3-pentafluoropropyl methacrylate, 2-perfluorobutylethyl methacrylate, 3-perfluorobutyl-2-hydroxypropyl methacrylate, 2-perfluorooctylethyl methacrylate, 3-perfluorooctyl-2-hydroxypropyl methacrylate, 2-perfluorodecylethyl methacrylate, 2-perfluoro-3-methylbutylethyl methacrylate, 3-perfluoro-3-methylbutyl-2-hydroxypropyl methacrylate, 2-perfluoro-5-methylhexylethyl methacrylate, 3-perfluoro-5-methylhexyl-2-hydroxypropyl methacrylate, 2-perfluoro-7-methyloctylethyl methacrylate, 3-perfluoro-7-methyloctylethyl methacrylate, tetrafluoropropyl methacrylate, octafluoropentyl methacrylate, octafluoropentyl methacrylate, dodecafluoroheptyl methacrylate, hexacafluorononyl methacrylate, 1-trifluoromethyltrifluoroethyl methacrylate, and hexafluorobutyl methacrylate.

The use of a compound as represented by Formula (1) and free from fluoroalkyl group $R^{f2}$ in its molecule serves not only for modification of the surface of inorganic particles under simplified reaction conditions but also for introduction of a functional group with easily controllable reactivity to the surface of inorganic particles. As a result, it will be possible to allow fluorine compound A having a reactive double bond and fluoroalkyl group $R^{f2}$ (Formula (2)) to react at the surface of inorganic particles via a compound as represented by Formula (1).

Described below are the inorganic particles that are free of surface treatment with fluorine compound A and contained in the coating composition together with the fluorine-treated inorganic particles. The inorganic particles free of surface treatment with fluorine compound A are preferred as a suitable constituent of the second layer (high refractive index layer). These inorganic particles free of surface treatment with fluorine compound A are hereinafter referred to as the other inorganic particles.

There are no specific limitations on the other inorganic particles, but they are preferably of a metal oxide or a metalloid oxide. It is more preferable that the other inorganic particles are of an oxide of at least one metal or metalloid selected from the group of Zr, Ti, Al, In, Zn, Sb, Sn, and Ce. The other inorganic particles are used preferably as a constituent of the second layer (high refractive index layer) and, therefore, it is preferable that they are higher in refractive index than silica particles in the case where the inorganic particles surface-treated with fluorine compound A are silica particles. Specifically, they are at least of a metal oxide or a metalloid oxide selected from the group of zirconium oxide ($ZrO_2$), titanium oxide ($TiO_2$), aluminum oxide ($Al_2O_3$), indium oxide ($In_2O_3$), zinc oxide (ZnO), tin oxide ($SnO_2$), antimony oxide ($Sb_2O_3$) and indium tin oxide ($In_2O_3$). Antimony-containing tin oxide (ATO) and titanium oxide ($TiO_2$) are particularly preferable. Titanium oxide, which is high in refractive index, is the most preferable from the viewpoint of antireflectiveness.

It is preferable that the coating composition contains one or more kinds of inorganic particles as the other inorganic particles. It is more preferable that the coating composition contains one or more and five or less kinds of inorganic particles as the other inorganic particles. It is particularly preferable that the coating composition contains one kind of inorganic particles as the other inorganic particles.

It is preferable that the other inorganic particles have a number average particle diameter of 1 nm or more and 150 nm or less. The number average particle diameter is more preferably 2 nm or more and 100 nm or less, particularly preferably 2 nm or more and 25 nm or less, and most preferably 2 nm or more and 20 nm or less. If the number average particle diameter of the other inorganic particles is less than 1 nm, the void density in the layer that is designed to primarily contain the other inorganic particles will be low, possibly leading to a decrease in transparency. If the number average particle diameter of the other inorganic particles is more than 150 nm, the high refractive index layer will be too thick, making it difficult to achieve high antireflection performance.

The refractive index of the other inorganic particles is preferably 1.58 or more and 2.80 or less. The refractive index is more preferably 1.60 or more and 2.50 or less. If the refractive index of the inorganic particles is less than 1.58, the second layer will possibly have a low refractive index. If the refractive index of the inorganic particles is more than 2.80, the second layer and the support substrate will have a large difference in refractive index, possibly making it impossible to achieve high antireflection performance and causing interference patterns to degrade the appearance.

If the fluorine-treated inorganic particles contained in the coating composition are fluorine-treated silica particles while the other inorganic particles are higher in refractive index than the silica particles, an antireflection layer consisting of a first layer containing fluorine-treated silica particles located farther from the support substrate and a second layer containing inorganic particles higher in refractive index than the silica particles located nearer to the support substrate can be formed easily by applying this coating composition on the support substrate in only one step followed by drying.

Hydrophobic Compound B

As described above, it is preferable that the antireflection layer contains a component derived from hydrophobic compound B, in addition to the two or more inorganic particles of different constituent elements. The hydrophobic compound B is a compound having a hydrophobic group and, specifically, it is at least one compound selected from the group of fluorine compound B, long chain hydrocarbon compound B and silicone compound B. It is preferable that hydrophobic compound B is fluorine compound B because it will be easy to produce a coating composition with a viscosity change ($\Delta\eta$) controlled in the range of 0.1 mPa or more and 10 mPa·s or less by depressing the coagulation of the inorganic particles.

Since the coating composition contains hydrophobic compound B such as fluorine compound B, coagulation of the fluorine-treated inorganic particles can be depressed and the thickness of the two layers with a large difference in refractive index can be controlled easily, leading to an antireflection member with high antireflectiveness.

It is preferable that hydrophobic compound B contains one or more reactive portions in its molecule. The reactive portion is one that reacts with other components, such as binder, in the coating composition when receiving external energy such as heat and light. From the viewpoint of reactivity, examples of the reactive portions include silanol groups having a hydrolyzed alkoxy silyl group or alkoxy silyl group, as well as carboxyl group, hydroxyl group, epoxy group, vinyl group, allyl group, acryloyl group, and methacryloyl group. The reactive portions in hydrophobic compound B correspond to the acrylic group ($H_2C=C(R^1)-$) in general formula (4) and A in general formula (5) which will be described later. Hydrophobic compound B may contain two or more reactive portions, instead of only one reactive portion. In particular, it is preferably an alkoxy silyl group, silanol group, or acryloyl (methacryloyl) group from the viewpoint of reactivity and handleability.

In the case where hydrophobic compound B with a reactive portion is used as the hydrophobic compound B, the hydrophobic compound B may be the same as fluorine compound A which is used for surface treatment to produce fluorine-treated inorganic particles. However, if the coating composition contains, in addition to fluorine compound A, hydrophobic compound B that is not bonded to particle surfaces, it will be easy for the fluorine-treated inorganic particles to move toward the boundary with air (outermost surface layer), allowing a low refractive index layer to be formed easily and, therefore, it is preferable that hydrophobic compound B that is not bonded to particle surfaces is contained.

Whether hydrophobic compound B is bonded to the surfaces of particles in the coating composition can be determined by the following analysis method. The coating composition is subjected to centrifugal separation in a desktop type ultracentrifuge (CS150NX, supplied by Hitachi Koki Co., Ltd.) (rotating speed 30,000 rpm, separation time 30 min) to precipitate inorganic particles (fluorine-treated inorganic particles and other inorganic particles). The resulting supernatant liquid is condensed, dried into a solid state, and then re-dissolved in a DMSO-d6 solvent (dimethyl sulfoxide-d6, supplied by Taiyo Nippon Sanso Corporation). The re-dissolved material is subjected to $C^{13}$-NMR measurement (JNM-GX270 magnetic nuclear resonance equipment, supplied by JEOL Ltd.), and if the existence of hydrophobic compound B is confirmed, it proves that hydrophobic compound B is not bonded to the surfaces of the inorganic particles.

Long Chain Hydrocarbon Compound B

Long chain hydrocarbon compound B is a compound having, as a hydrophobic group, a hydrocarbon group with a carbon number of 8 or more and a reactive portion. It is preferable that long chain hydrocarbon compound B has a reactive portion. It is preferable that long chain hydrocarbon compound B is a long chain hydrocarbon compound having a hydrocarbon group with a carbon number of 10 or more and 30 or less. Long chain hydrocarbon compound B is more preferably a long chain hydrocarbon compound having a hydrocarbon group with a carbon number of 12 or more and 30 or less, and it is particularly preferably a long chain hydrocarbon compound having a hydrocarbon group with a carbon number of 14 or more and 30 or less. As the carbon number increases, the hydrophobicity increases, causing easy separation from the binder material.

Silicone Compound B

Silicone compound B is a compound having, as a hydrophobic group, a siloxane group and a reactive portion. It is preferable that silicone compound B has a reactive portion. It is preferable that silicone compound B has a polysiloxane group as represented by Formula (3) ($-(Si(R^8)(R^9)-O)_m-$) and that $R^8$ and $R^9$ have a carbon number of 3 or more and 6 or less. It is more preferable that $R^8$ and $R^9$ have a carbon number of 4 or more and 6 or less, particularly preferably 5 or more and 6 or less.

Fluorine Compound B

Fluorine compound B is a compound having, as a hydrophobic group, a fluoroalkyl group with a carbon number of 4 or more and a reactive portion. There is no need for fluorine compound B to have only one fluoroalkyl group, but fluorine compound B may have two or more fluoroalkyl groups. As in the case of the fluoroalkyl group in fluorine compound A, the fluoroalkyl group is a substituent group in which all hydrogen atoms in an alkyl group are replaced with fluorine atoms, and thus it is a substituent group composed only fluorine atoms and carbon atoms to serve as the hydrophobic group in fluorine compound B.

Fluorine compound B can work sufficiently if fluoroalkyl group $R^{f1}$ has a carbon number of 4 or more. It is preferable that fluoroalkyl group $R^{f1}$ has a carbon number of 4 or more and 8 or less, and fluoroalkyl group $R^{f1}$ is more preferably a linear or branched one with a carbon number of 4 or more and 7 or less. From the viewpoint of depressing interparticle interaction among fluorine-treated particles during drying of the resulting coating composition, it is particularly preferable that fluoroalkyl group $R^{f1}$ has a carbon number of 5 or more and 7 or less, and most preferably a carbon number of 6 or more and 7 or less. In addition, it is preferably of a linear form because steric hindrance is smaller in linear ones than in branched ones, allowing linear ones to be adsorbed more easily on fluorine-treated inorganic particles. When fluoroalkyl group $R^{f1}$ is a linear or branched fluoroalkyl group with a carbon number of 4 or more and 7 or less, particles are separated more largely and spontaneous formation of two layers with different refractive indices takes place more easily, leading to improved antireflection.

It is preferable that fluorine compound B has a reactive portion. The reactive portions in fluorine compound B correspond to the acrylic group ($H_2C=C(R^1)$—) in Formula (4) and A in Formula (5) which will be described later. Fluorine compound B may have two or more reactive portions, instead of only one reactive portion. In particular, the reactive portions are preferably an alkoxy silyl group, silanol group, or acryloyl (methacryloyl) group from the viewpoint of reactivity and handleability.

Fluorine compound B preferably has a number average molecular weight of 300 or more and 4,000 or less. When the coating composition has fluorine compound B with a number average molecular weight of 300 or more and 4,000 or less, the affinity of fluorine compound B work to allow fluorine compound B to be adsorbed on the surface of the fluorine-treated inorganic particles to depress interparticle interaction of the fluorine-treated inorganic particles and formation of aggregates. As a result, this serves to prevent a decrease in flowability of the coating composition during the drying step and promote spontaneous formation of two layers with different refractive indices, leading to increased antireflectiveness. The number average molecular weight is determined by gel permeation chromatography (GPC) using tetrahydrofuran as solvent and a monodisperse polystyrene with a known molecular weight as standard substance.

It is preferable that fluorine compound B has a viscosity $\eta_F$ of 1 mPa·s or more and 100 mPa·s or less as measured with a vibration type viscometer and a surface tension $\gamma_F$ of 6 mN/m or more and 26 mN/m or less. The viscosity $\eta_F$ is more preferably 1 mPa·s or more and 90 mPa·s or less and particularly preferably 1 mPa·s or more and 80 mPa·s or less. The viscosity $\eta_F$ measured with a vibration type viscometer is the viscosity of fluorine compound B determined at 25° C., and a model SV-10A tuning fork vibration type viscometer can be used for the measurement.

It is preferable that fluorine compound B has a surface tension $\gamma_F$ of 6 mN/m or more and 24 mN/m or less, particularly preferably 6 mN/m or more and 22 mN/m or less. The surface tension $\gamma_F$ is the surface tension of fluorine compound B measured at 25° C., and can be determined according to the hanging-drop method (pendant-drop method) using a fully automatic surface tensiometer.

The viscosity $\eta_F$ measured with a vibration type viscometer and the surface tension $\gamma_F$ of fluorine compound B have relations with the affinity of fluorine compound B to the surface of the fluorine-treated inorganic particles. When fluorine compound B has a viscosity $\eta_F$ of 1 mPa·s or more and 100 mPa·s or less and a surface tension of 6 mN/m or more and 26 mN/m or less, fluorine compound B has an affinity large enough to allow fluorine compound B to be adsorbed to the surface of the fluorine-treated inorganic particles to depress the formed of aggregates of the fluorine-treated inorganic particles. As a result, this serves to prevent a decrease in flowability of the coating composition during the drying step and promote spontaneous formation of two layers with different refractive indices, leading to increased antireflectiveness.

Fluorine compound B in the coating composition may be either a single substance or a mixture of two or more substances. Fluorine compound B may be the same compound as fluorine compound A. If fluorine compound B contained in the coating composition is an ultraviolet curable compound, the oxygen concentration in the ultraviolet curing step should be as low as possible to prevent oxygen inhibition, and it is preferable to perform the curing step in a nitrogen atmosphere (nitrogen purge).

It is preferable that fluorine compound B has a molar volume $V_F$ of 200 cm$^3$/mol or more and 1,000 cm$^3$/mol or less. When the molar volume $V_F$ is 200 cm$^3$/mol or more and 1,000 cm$^3$/mol or less, fluorine compound B can be adsorbed on the surface of the fluorine-treated inorganic particles to depress interparticle interaction of the fluorine-treated inorganic particles and formation of aggregates. As a result, this serves to prevent a decrease in flowability of the coating composition during the drying step and promote spontaneous formation of two layers with different refractive indices, leading to increased antireflectiveness.

Molar volume $V_F$ is calculated by dividing the molecular weight M by the density ρ and represent the volume per mole (cm$^3$/mol). In particular, additivity holds for the molar volume of fluorine compound B and, therefore, the molar volume of the compound can be calculated if the molar volumes of the groups contained in the compound are determined. The molar volumes of groups are listed in "Fluorine Reagent" 2008 Catalog (supplied by Daikin Chemical Sales, Ltd.), and the molar volumes of various fluorine compounds B can be calculated based on this.

Fluorine compound B is preferably at least one compound selected from the group of monomers as represented by Formula (4), monomers as represented by Formula (5), oligomers derived from monomers as represented by Formula (4), and oligomers derived from monomers as represented by Formula (5):

$$H_2C=C(R^1)-COO-R^2-R^{f1} \quad (4)$$

$$A-R^3-R^{f1} \quad (5).$$

In the formulae, R$^1$ denotes a hydrogen atom or methyl group, R$^{f1}$ denoting a linear or branched fluoroalkyl group with a carbon number of 4 to 7, R$^2$ denoting an alkyl group with a carbon number of 1 to 10, R$^3$ denoting an alkyl group with a carbon number of 1 to 10, and A denoting a reactive portion.

Furthermore, it is preferable that fluorine compound B has a specific fluoroalkyl group as well as a reactive portion. In monomers as represented by Formula (4) and oligomers derived from monomers as represented by Formula (4) that constitute fluorine compound B having a fluoroalkyl group and a reactive portion, R$^{f1}$ is the fluoroalkyl group and H$_2$C=C(R$^1$)— is the reactive portion. In monomers as represented by Formula (5) and oligomers derived from monomers as represented by Formula (5), R$^{f1}$ is the fluoroalkyl group and A is the reactive portion.

Specific examples of the monomer compounds as represented by Formula (4) include 2,2,2-trifluoroethyl acrylate, 2,2,3,3,3-pentafluoropropyl acrylate, 2-perfluorobutylethyl acrylate, 3-perfluorobutyl-2-hydroxypropyl acrylate, 2-perfluorohexylethyl acrylate, 3-perfluorohexyl-2-hydroxypropyl acrylate, 2-perfluorooctylethyl acrylate, 3-perfluorooctyl-2-hydroxypropyl acrylate, 2-perfluorodecylethyl acrylate, 2-perfluoro-3-methylbutylethyl acrylate, 3-perfluoro-3-methoxy butyl-2-hydroxypropyl acrylate, 2-perfluoro-5-methylhexylethyl acrylate, 3-perfluoro-5-methyl-hexyl-2-hydroxypropyl acrylate, 2-perfluoro-7-methyloctyl-2-hydroxypropyl acrylate, tetrafluoropropyl acrylate, octafluoropentyl acrylate, dodecafluoroheptyl acrylate, hexadecafluorononyl acrylate, hexafluorobutyl acrylate, 2,2,2-trifluoroethyl methacrylate, 2,2,3,3,3-pentafluoropropyl methacrylate, 2-perfluorobutylethyl methacrylate, 3-perfluorobutyl-2-hydroxypropyl methacrylate, 2-perfluorooctylethyl methacrylate, 3-perfluorooctyl-2-hydroxypropyl methacrylate, 2-perfluorodecylethyl methacrylate, 2-perfluoro-3-methylbutylethyl methacrylate, 3-perfluoro-3-methylbutyl-2-hydroxypropyl methacrylate, 2-perfluoro-5-methylhexylethyl methacrylate, 3-perfluoro-5-methylhexyl-2-hydroxypropyl methacrylate, 2-perfluoro-7-methyloctylethyl methacrylate, 3-perfluoro-7-methyloctylethyl methacrylate, tetrafluoropropyl methacrylate, octafluoropentyl methacrylate, octafluoropentyl methacrylate, dodecafluoroheptyl methacrylate, hexadecafluorononyl methacrylate, 1-trifluoromethyltrifluoroethyl methacrylate, and hexafluorobutyl methacrylate.

Specific examples of the oligomer compounds derived from monomers as represented by Formula (4) include compounds with an average polymerization degree of 2 to 10 or so produced through radical polymerization from monomers as represented by Formula (4).

Specific examples of the monomer compounds as represented by Formula (5) include fluoroalkyl silanes with a fluoroalkyl group such as heptadecafluorodecyl trimethoxysilane (TSL8233, supplied by Momentive Performance Materials Inc.) and tridecafluorooctyl trimethoxysilane (TSL8257, supplied by Momentive Performance Materials Inc. supplied by Momentive Performance Materials Inc.).

The oligomer compounds derived from monomers as represented by Formula (5) may be produced by adding a predetermined quantity water to fluoroalkyl silane and evaporating the by-product alcohol to allow the reaction to proceed in the presence of an acid catalyst. In this reaction, part of the fluoroalkyl silane is hydrolyzed to cause condensation reaction to produce oligomers. The degree of hydrolysis can be adjusted by controlling the quantity of water to be added. The quantity of water to be used for the hydrolysis is commonly 1.5 times by mole or more that of the silane coupling agent. Furthermore, it is preferable that the resulting oligomers are compounds with an average polymerization degree of 2 to 10.

For fluorine compound B to have a viscosity $\eta_F$ of 1 mPa·s or more and 100 mPa·s or less as measured with a vibration type viscometer, a surface tension $\gamma_F$ of 6 mN/m or more and 26 mN/m or less, and a molar volume $V_F$ of 200 cm$^3$/mol or more and 1,000 cm$^3$/mol or less, it preferably has a linear or branched fluoroalkyl chain with a carbon number of 4 or more and 7 or less. Furthermore, it is preferably at least one compound selected from the group of monomers as represented by Formula (4), monomers as represented by Formula (5), oligomers derived from monomers as represented by Formula (4), and oligomers derived from monomers as represented by Formula (5). Examples of the preferable fluorine compound B include 2-perfluorohexylethyl (meth)acrylate, 2-perfluorooctylethyl (meth)acrylate, and heptadecafluorodecyl trimethoxysilane.

Organic Solvent

It is preferable that the coating composition contains an organic solvent, in addition to the two or more inorganic particles of different constituent elements and hydrophobic compound B. If an organic solvent is contained, it works to depress interparticle interaction of the fluorine-treated inorganic particles and formation of aggregates of the fluorine-treated inorganic particles. Furthermore, this serves to prevent a decrease in flowability of the coating composition during the drying step and, therefore, spontaneous formation of layers is promoted after the application of the coating composition, leading to increased antireflectiveness.

There are no specific limitations on the organic solvent, but commonly, it is preferable to use an organic solvent with a boiling point of 200° C. or less at atmospheric pressure. Specifically, useful ones include water, alcohols, ketones, ethers, esters, hydrocarbons amides, and fluorine solvents. These may be used singly or as a combination of two or more of them. Specifically, preferable examples include, for instance, propylene glycol monomethyl ether (PGME), cyclohexanone, methyl ethyl ketone, methyl isobutyl ketone, methanol, and isopropyl alcohol, of which isopropyl alcohol and propylene glycol are particularly preferable from the viewpoint of stability of the inorganic particles.

Useful alcohols include, for instance, methanol, ethanol, isopropyl alcohol, isobutanol, n-butanol, tert-butanol, ethoxy ethanol, butoxy ethanol, diethylene glycol monoethyl ether, benzyl alcohol, phenyl alcohol. Useful ketones include, for instance, acetone, methyl ethyl ketone, methyl isobutyl ketone, and cyclohexanone. Useful ethers include, for instance, dibutyl ether and propylene glycol monoethyl ether acetate. Useful esters include, for instance, ethyl acetate, butyl acetate, ethyl lactate, acetomethyl acetate, and acetoethyl acetate. Useful aromatic include, for instance, toluene and xylene. Useful amides include, for instance, N,N-dimethyl formamide, N,N-dimethyl acetamide, and N-methylpyrolidone.

It is preferable that when assuming that all the components constituting the coating composition account for 100 mass %, hydrophobic compound B contained the coating composition accounts for 1 mass % or more and 30 mass % or less. It is more preferable that hydrophobic compound B accounts for 2 mass % or more and 25 mass % or less, particularly preferably 3 mass % or more and 20 mass % or less. The components constituting the coating composition include organic solvents, binder components, and other various additives.

When the coating composition contains 1 mass % or more and 30 mass % or less hydrophobic compound B, hydrophobic compound B are adsorbed on the surface of the fluorine-treated inorganic particles to depress the formation of aggregates of the fluorine-treated inorganic particles. As a result, a decrease in flowability of the coating composition during the drying step is prevented and the thicknesses of the two layers with a large difference in refractive index can be controlled easily, leading to increased antireflectiveness. Furthermore, since hydrophobic compound B contributes to stabilization of dispersed inorganic particles during the coating and drying of the coating composition, it is important to properly adjust its content relative to the quantity of all the components including solvents. Therefore, it is preferable that the quantity of hydrophobic compound B is in the above range relative to the quantity of all the components instead of the quantity of only the inorganic particles.

Binder Material for the Coating Composition

It is important for the antireflection layer to contain one or more binders. Accordingly, it is preferable that the coating composition used in the preferred antireflection member production method contains one or more binder materials. Thus, it is important that the first layer and the second layer in the antireflection layer produced from the coating composition contain binders originating from the binder materials contained in the coating composition. Hereinafter, the binders contained in the coating composition are referred to as binder materials while the binders contained in the antireflection layer are referred to as binders. In some cases, however, binder materials contained in the coating composition may be left in the antireflection layer as binders in the original form.

There are no specific limitations on the binder materials, but from the viewpoint of productivity, it is preferable that the binder materials can be cured by heat and/or active energy ray. One binder material may be used singly, or two or more may be used in combination. Furthermore, from the viewpoint of the fluorine-treated inorganic particles and the inorganic particles other than the fluorine-treated inorganic particles being held in the film, it is preferable that these binder materials contain alkoxysilane, a hydrolysate of alkoxysilane, and a reactive double bond in their molecule. If they are cured by UV ray, it is preferable that the oxygen concentration is maintained as low as possible and the curing step is performed in a nitrogen atmosphere to prevent oxygen inhibition. A preferable binder material is multifunctional acrylate. Specific examples include pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, trimethylolpropane tri(meth)acrylate, pentaerythritol triacrylate hexane methylene diisocyanate urethane polymer, other multifunctional acrylates containing 3 or more (meth)acryloyloxy groups in one molecule, and modified polymers thereof. More preferable are multifunctional acrylates containing 4 or 5 or more (meth)acryloyloxy groups, and modified polymers thereof. These monomers may be used singly or as combination of two or more thereof. Commercial multifunctional acrylic composition products include Diabeam (trade name) series supplied by Mitsubishi Rayon Co., Ltd., Denacol (trade name) series supplied by Nagase & Co., Ltd., NK Ester (trade name) series supplied by Shin-Nakamura Chemical Co., Ltd., Unidic (trade name) supplied by DIC Corporation, Aronix series supplied by Toagosei Co., Ltd., Blemmer series supplied by NOF Corporation, Kayarad (trade name) series supplied by Nippon Kayaku Co., Ltd., and Light Ester (trade name) series supplied by Kyoeisha Chemical Co., Ltd.

Other Components of the Coating Composition

It is preferable that the coating composition further contains a catalyst, initiator, curing agent, and the like. The use of an initiator and a catalyst is aimed to promote the reaction between fluorine-treated silica particles that are used as the fluorine-treated inorganic particles and binder materials and to promote the reaction between binders. It is preferable that the initiator used can initiate or promote polymerization, condensation or crosslinking of the coating composition through anionic, cationic, and radical reactions.

Various useful initiators, curing agents, and catalysts are available. The initiators, curing agents, and catalysts may be used singly, or two or more of these initiators, curing agents, and catalysts may be used together. In addition, acidic catalysts, thermal polymerization initiators, and photopolymerization initiators may also be used in combination. Examples of the acidic catalysts include aqueous hydrochloric acid solution, formic acid, and acetic acid. Examples of the thermal polymerization initiators include peroxides and azo compounds. Examples of the photopolymerization initiators include alkyl phenon compounds, sulfur-containing compounds, acylphosphine oxide compounds, and amine compounds. As the photopolymerization initiator, the use of an alkyl phenon compound is preferable because of its high curing performance. Specific examples of the alkyl phenon compounds include 2,2-dimethoxy-1,2-diphenyl ethane-1-one, 2-methyl-1-(4-methylthiophenyl)-2-morpholinopropane-1-one, 2-benzyl-2-dimethylamino-1-(4-phenyl)-1-butane, 2-(dimethylamino)-2-[(4-methylphenyl)methyl]-1-(4-phenyl)-1-butane, 2-benzyl-2-dimethylamino-1-(4-morpholinophenyl)-1-butane, 2-(dimethylamino)-2-[(4-methyl phenyl)methyl]-1-[4-(4-morpholinyl)phenyl]-1-butane, 1-cyclohexyl-phenyl ketone, 2-methyl-1-phenylpropane-1-one, and 1-[4-(2-ethoxy)-phenyl]-2-hydroxy-2-methyl-1-propane-1-one.

With respect to the component composition of the initiators and curing agents, it is preferable that they account for 0.001 part by mass to 30 parts by mass per 100 parts by mass of the binder components in the coating composition. It is more preferably 0.05 part by mass to 20 parts by mass and still more preferably 0.1 part by mass to 10 parts by mass.

In addition, the coating composition may further contain other additives such as surfactants, viscosity improvers, and leveling agent, as needed.

Contents of Different Components in the Coating Composition

It is preferable that the component composition of the fluorine-treated inorganic particles and the other inorganic particles in the coating, i.e., the content of the fluorine-treated inorganic particles/the content of the other inorganic particles, is 1/30 or more and 1/1 or less by mass.

If the mass ratio of (the content of the fluorine-treated inorganic particles/the content of the other inorganic particles) is controlled at 1/30 or more and 1/1 or less, it will be possible for the ratio between the thickness of the low refractive index layer and that of the high refractive index layer antireflection layer to be maintained constant. Accordingly, it will be possible for the combined thickness of the low refractive index layer and the high refractive index layer formed in one coating step to be the antireflective function thickness. When a thick high refractive index layer having a hard coat function is to be produced, a required thickness can be achieved in one coating step without impairing the antireflection function. The mass ratio of (the content of the fluorine-treated inorganic particles/the content of the other inorganic particles) is more preferably 1/29 or more and 1/2 or less, particularly preferably 1/26 or more and 1/3 or less, and most preferably 1/23 or more and 1/4 or less.

With respect to the contents of the various components of the coating composition, it is preferable that the inorganic particles (including inorganic particles surface-treated with fluorine compound A) all together account for 0.2 mass % or more and 40 mass % or less, the organic solvents for 40 mass % or more and 98 mass % or less, hydrophobic compound B for 0.5 mass % or more and 30 mass % or less, and the other components including binders, initiators, curing agents and catalysts for 0.1 mass % or more and 20 mass % or less per 100 mass % of the coating composition. With respect to the contents of these components, it is more preferable that the inorganic particles all together account for 1 mass % or more and 35 mass % or less, the organic solvents for 50 mass % or more and 97 mass % or less, hydrophobic compound B for 1 mass % or more and 25 mass % or less, and the other components for 1 mass % or more and 15 mass % or less.

It is particularly preferable that the two or more kinds of inorganic particles of different constituent elements are actually metal oxide particles and fluorine-treated silica particles and that they together account for 2 mass % or more and 30 mass % or less, the organic solvent for 60 mass % or more and 95 mass % or less, hydrophobic compound B for 2 mass % or more and 20 mass % or less, and the other components for 2 mass % or more and 10 mass % or less.

Support Substrate

Except where an antireflection member is provided in direct contact with the surface of a CRT image display device or the surface of a lens, it is important for an antireflection member to have a support substrate. A support substrate is a member to which the coating composition is directly applied. The support substrate may be a glass plate, plastic film, or the like used singly; a glass plate, plastic film, or the like combined with other functional layers other than an antireflection layer; or a glass plate, plastic film, or the like that are surface-treated appropriately. With respect to its material, the support substrate preferably comprises a plastic film instead of a glass plate. Useful materials for the plastic film include cellulose ester (such as triacetyl cellulose, diacetyl cellulose, propionyl cellulose, butyryl cellulose, acetyl propionyl cellulose, and nitrocellulose), polyamide, polycarbonate, polyester (such as polyethylene terephthalate, polyethylene naphthalate, poly-1,4-cyclohexane dimethylene terephthalate, polyethylene-1,2-diphenoxy ethane-4,4'-dicarboxylate, and polybutylene terephthalate), polystyrene (such as syndiotactic polystyrene), polyolefin (such as polypropylene, polyethylene, and polymethylpentene), polysulfone, polyethersulfone, polyallylate, polyetherimide, polymethyl methacrylate, and polyether ketone. Of these, triacetyl cellulose, polycarbonate, polyethylene terephthalate, and polyethylene naphthalate are preferable.

Various functional layers refer to those functional layers such as adhesion improving layer, hard coat layer, and antistatic layer, other than the antireflection layer. The various treatments refer to, for instance, chemical treatment, mechanical treatment, corona discharge treatment, flame treatment, ultraviolet ray irradiated treatment, high frequency treatment, glow discharge treatment, active plasma treatment, laser treatment, mixed acid treatment, and ozone oxidation treatment.

More preferably, application of the coating composition in one step to a plastic film with poor scratch resistance may be included in the process to make the support substrate resistant to abrasion as well as antireflective. Unlike the conventional processes, it is not necessary to form a hard coat layer on the support substrate or use a film containing a hard coat layer as the support substrate, and a material with inferior scratch resistance can be used for the antireflection member of a support substrate.

It is preferable that the surface of the support substrate to be coated with the coating composition has a roughness of 40 nm or less. The surface roughness is more preferably 35 nm or less and particularly preferably 30 nm or less. In the case where the support substrate is a glass plate or a plastic film having a functional layer other than an antireflection layer and the coating composition is to be applied to the functional layer, the roughness of the surface of the support substrate to be coated with the coating composition does not refer to the surface roughness of the functional layer but that of the surface of the glass plate or plastic film on which the functional layer is provided. In the case where the support substrate is a glass plate or a plastic film treated in one of the various ways and the coating composition is to be applied to the treated surface, the roughness of the surface of the support substrate to be coated with the coating composition refers to the roughness of treated surface of the glass plate or plastic film.

When a glass plate or a plastic film having a functional layer is used as the support substrate, the surface of the support substrate to be coated with the coating composition may be either the surface of the glass plate or plastic film or the surface of the functional layer, and there are no specific limitations. However, in the case where a glass plate or a plastic film having a hard coat layer is used as the support substrate to provide an antireflection member with hard coat properties, the coating composition is applied on the surface of the hard coat layer. In the case where a glass plate or a plastic film having an adhesion improving layer is used as the support substrate to maintain good adhesiveness between the antireflection layer and the support substrate, the coating composition is applied on the surface of the adhesion improving layer.

It is preferable that that the support substrate has a light transmittance of 80% or more and 100% or less. The light transmittance is more preferably 86% or more and 100% or less. The light transmittance of a specimen refers to the proportion of the incident light that permeate it and is determined according to JIS K 7361-1 (1997). The antireflection member should have as high a light transmittance as possible, and a small transmittance will cause an increase in the haze value, possibly leading to image degradation. The haze value is a measure of turbidity in transparent material, which is determined according to JIS K 7136 (2000). A smaller haze value indicates a higher transparency. In the case where the support substrate is one that consists of a glass plate or a plastic film provided with a functional layer, the light transmittance is measured for the entire member including the functional layer. In the case where the support substrate is a glass plate or a plastic film treated in one of the various ways, furthermore, the light transmittance is measured for the member with the treated.

It is preferable that the support substrate has a haze value of 0.01% or more and 2.0% or less. The haze value is more preferably 0.05% or more and 1.0% or less. If the support substrate is a glass plate or a plastic film that is provided with a functional layer, the haze value is determined for the combination of the support substrate and the functional layer. In the case where the support substrate is a glass plate or a plastic film treated in one of the various ways, furthermore, the haze value is measured for the member in the treated state.

It is preferable that that the support substrate has a refractive index of 1.4 to 1.7. When light propagating in air enters a material, the refractive index is defined as the percent change in the angular propagation direction at the boundary determined according to JIS K 7142 (1996). In the case where the support substrate is one consisting of a glass plate or a plastic film provided with a functional layer, the refractive index is the refractive index of the entire substrate rather than the particular value for the glass plate portion, plastic film portion or functional layer portion. In the case where the support substrate is a glass plate or a plastic film treated in one of the various ways, furthermore, the refractive index is measured for the entire support substrate that has undergone the treatment.

The support substrate may contain an infrared ray absorbent or an ultraviolet absorber. It is preferable that the infrared ray absorbent accounts for 0.01 mass % or more and 20 mass % or less per 100 mass % of the all components of the support substrate. It is more preferably 0.05 mass % or more and 10 mass % or less. To serve as slippage agent, particles of an inactive inorganic compound may be contained a transparent support material. Examples of the inactive inorganic compound include $SiO_2$, $TiO_2$, $BaSO_4$, $CaCO_3$, talc, and kaolin. Furthermore, the support substrate may have a treated surface. In the case where the support substrate is one consisting of a glass plate or a plastic film provided with a functional layer, the infrared ray absorbent or ultraviolet absorber may be contained in the plastic film or contained in the functional layer.

Production Method for the Antireflection Member

The antireflection member can be produced by either of the following processes, (i) and (ii), using specific cure conditions and materials. Of these, the process (ii) is pref erable from the viewpoint of the shape of the interfaces and the continuity of the matrix.

(i) A support substrate is supplied to a coating step, and then using specific curing conditions and materials, the support substrate is coated with one liquid film layer and dried, followed by taking the support substrate out of the coating step. This operation is carried out once more so that two layers with different refractive indices are formed on the support substrate.

(ii) A support substrate is supplied to a coating step, and then using specific curing conditions and materials, the support substrate is coated with only one coating composition for forming an antireflection layer and dried, followed by taking the support substrate out of the coating step. Thus, two layers with different refractive indices are formed simultaneously on the support substrate.

The specific cure conditions and materials used for the process (i) are intended to allow the previously applied layer (the second layer) to be swollen by the subsequently applied (first) layer to produce a desired rough structure.

It is important for the process (ii) to include a step for applying a coat on the support substrate (coating step) with an appropriate coating technique such as dip coating, air knife coating, curtain coating, roller coating, wire bar coating, and gravure coating. Subsequently, a step for drying the coating composition applied above by heating or other appropriate techniques (drying step) to provide an antireflection member.

In the production process (ii), two layers with different refractive indices can be produced simultaneously on the support substrate by carrying out only one step of applying a coating composition on the support substrate.

Described below is a presumed mechanism of the simultaneous formation of two layers with different refractive indices to provide an antireflection layer in the case where a coating composition consisting of fluorine-treated inorganic particles, other inorganic particles, and hydrophobic compound B is used.

First, in the coating composition, hydrophobic compound B which has a strong affinity with the fluorine-treated inorganic particles is adsorbed selectively on the surfaces of the fluorine-treated inorganic particles while the fluorine-treated inorganic particles and the other inorganic particles are dispersed uniformly. Even after the application of the coating composition on the support substrate, the applied coating composition maintains the fluorine-treated inorganic particles and the other inorganic particles in a uniformly dispersed state. In the subsequent drying step, the fluorine-treated inorganic particles move toward the boundary with air (outermost surface) where they are in a stable energy state to form the first layer (low refractive index layer) consisting mainly of the fluorine-treated inorganic particles. In this state, however, where the drying step has not been completed, a large part of the solvent still remains unvolatilized and its volatilization is progressing simultaneously. In the course of this volatilization, the low refractive index layer once formed is destroyed. However, the coexistence of hydrophobic compound B, which is low in volatility, allows the fluorine-treated inorganic particles to move easy without coagulation in the solvent-poor state. Subsequently, the low refractive index layer destroyed previously gathers again to form a uniform, low refractive index layer. Accordingly, the second layer (high refractive index layer) consisting mainly of the other inorganic particles is formed near the support substrate.

Even in the case where hydrophobic compound B is not contained, it is expected that the coagulation of the fluorine-treated inorganic particles is depressed to allow the same phenomenon as in the case where hydrophobic compound B is contained to take place if the viscosity change ($\Delta\eta$) in the coating composition is maintained in the range of 0.1 mPa·s or more and 10 mPa·s or less.

To produce an antireflection layer as described above, it is preferable that heating is performed in the drying step to produce two defect-free separate layers as well as to remove the solvent completely from the resulting antireflection layer. The drying step consists of a material preheating period (A) to heat up the material to a temperature where the entire material can be dried, a constant rate drying period (B) where the material is heated until the coating liquid moves no more, and a falling rate drying period (C). Two layers with different refractive indices are formed as the solvent is evaporated through the material preheating period (A) and the constant rate drying period (B). To ensure an adequate time required for the inorganic particles to move for the formation of two layers, it is preferable that the air flow speed is low and the drying temperature is as low as possible.

In the earlier part of the drying step, i.e., the material preheating period (A) and the constant rate drying period (B), it is preferable that the air flow speed is 0.1 m/s or more and 10 m/s or less. The air flow speed is more preferably 0.5 m/s or more and 5 m/s or less. In the latter part of the drying step, i.e. the falling rate drying period (C), the air flow speed is preferably 1 m/s or more and 15 m/s or less and the temperature is preferably 100° C. or more and 200° C. or less from the viewpoint of decreasing the residual solvent. There are no specific limitations on the heating temperature, depending on the boiling point of the solvent used and the glass transition temperature of the polymer. Useful heating methods for the drying step include hot air injection, infrared ray heating, microwave heating, and induction heating. Of these, hot air heating for providing a hot air stream parallel to the coated surface is preferable for the earlier part of the drying step, i.e., the material preheating period (A) and the constant rate drying period (B), from the viewpoint of the air flow speed and the temperature. For the latter part of the drying step, i.e., the falling rate drying period (C), hot air heating for providing a hot air stream perpendicular to the coated surface is preferable from the viewpoint of versatility and the drying speed.

After the drying step, furthermore, the two layers formed on the support substrate may be cured by applying heat or energy beam (curing step). When heat-curing is performed in the curing step, it is preferable that the atmosphere temperature is in the range of room temperature to 200° C. To promote the evaporation of solvents and the curing of resins containing silanol and the like, the atmosphere temperature is more preferably 100° C. or more and 200° C. or less, and particularly preferably 130° C. or more and 200° C. or less. When it is maintained at 100° C. or more, the quantity of the residual solvent decreases and resins containing silanol and the like can be cured in a very short period of time.

If energy beam is used for curing, it is preferably electron beam (EB) or ultraviolet ray (UV) from the viewpoint of versatility. If they are to be cured by ultraviolet ray, it is preferable that the oxygen concentration is maintained as low as possible and the curing step is performed in a nitrogen atmosphere (nitrogen gas purge) to prevent oxygen inhibition. If the oxygen concentration is high, the curing of the outermost surface is impeded, possibly leading to insufficient curing as well as insufficient scratch resistance and alkaline resistance. The useful types of ultraviolet ray lamps that can be used for applying ultraviolet ray include, for instance, electric discharge lamp, flash lamp, laser, and electrodeless lamp. If an electric-discharge type high pressure mercury lamp is used for ultraviolet curing, the ultraviolet ray should have an illuminance of 100 mW/cm$^2$ or more and 3,000 mW/cm$^2$ or less. The illuminance of the ultraviolet ray to be used is preferably 200 mW/cm$^2$ or more and 2,000 mW/cm$^2$ or less, and more preferably 300 mW/cm$^2$ or more and 1,500 mW/cm$^2$ or less. The accumulated quantity the ultraviolet ray used should be 100 mJ/cm$^2$ or more and 3,000 mJ/cm$^2$ or less. The accumulated light quantity is preferably 200 mJ/cm$^2$ or more and 2,000 mJ/cm$^2$ or less, and more preferably 300 mJ/cm$^2$ or more and 1,500 mJ/cm$^2$ or less. The illuminance of ultraviolet ray refers to the irradiation intensity per unit area and depends on the output of the lamp, emission spectrum efficiency, diameter of the lamp bulb, design of the reflecting mirror, and the distance between the irradiated object and the light source. The illuminance, however, does not depend on the optical carrier speed. The accumulated quantity of ultraviolet ray refers to the optical energy received per unit area and it is equal to the total quantity of photons reaching the surface. The accumulated light quantity is inversely proportional to the dose rate under the light source and proportional to the number of irradiation runs and the number of lamps used. In the case where curing is performed by heating, the drying step and the curing step may be carried out simultaneously.

EXAMPLES

Our antireflection members and methods will now be illustrated with reference to Examples, but it should be understood that this disclosure is not construed as being limited thereto. The high refractive index layer component is the second layer component as described above while the low refractive index layer component is the first layer component as described above.

Production Example 1

Coating Composition 1-1 for Adhesion Improving Layer
Coating composition 1-1 for adhesion improving layer was prepared by mixing the following materials:

| | |
|---|---|
| aqueous acrylic resin | 30.0 parts by mass |
| (Nikasol A08 supplied by | |
| Nippon Carbide Industries Co., Inc. 20 mass %) | |
| dispersed colloidal silica particles | 6.0 parts by mass |
| (Snowtex OL supplied by Nissan Chemical Industries, Ltd. 20 mass %, number average particle diameter 40 nm) | |
| surfactant | 0.1 parts by mass |
| (Olfin EXP4051F supplied by Nissin Chemical Industry Co., Ltd.) | |
| Water | 100 parts by mass |

Coating Composition 1-2 for Adhesion Improving Layer
Coating composition 1-2 for adhesion improving layer was prepared by mixing the following materials:

| | |
|---|---|
| aqueous acrylic resin | 30.0 parts by mass |
| (Nikasol A08 supplied by Nippon Carbide Industries Co., Inc. 20 mass %) | |
| dispersed colloidal silica particles | 1.5 parts by mass |
| (Sfelica 140 supplied by JGC Catalysts & Chemicals Co., Ltd. 40 mass %, number average particle diameter 140 nm) | |
| Surfactant | 0.1 parts by mass |
| (Olfin EXP4051F supplied by Nissin Chemical Industry Co., Ltd.) | |
| Water | 100 parts by mass |

Coating Composition 1-3 for Adhesion Improving Layer
Coating composition 1-3 for adhesion improving layer was prepared by mixing the following materials:

| | |
|---|---|
| aqueous acrylic resin | 30.0 parts by mass |
| (Nikasol A08 supplied by Nippon Carbide Industries Co., Inc. 20 mass %) | |
| dispersed colloidal silica particles | 3.0 parts by mass |
| (Sfelica 140 supplied by JGC Catalysts & Chemicals Co., Ltd. 40 mass %, number average particle diameter 140 nm) | |
| Surfactant | 0.1 parts by mass |
| (Olfin EXP4051F supplied by Nissin Chemical Industry Co., Ltd.) | |
| Water | 100 parts by mass |

Coating Composition 1-4 for Adhesion Improving Layer
Coating composition 1-4 for adhesion improving layer was prepared by mixing the following materials:

| | |
|---|---|
| aqueous acrylic resin | 30.0 parts by mass |
| (Nikasol A08 supplied by Nippon Carbide Industries Co., Inc. 20 mass %) | |
| dispersed colloidal silica particles | 3.0 parts by mass |
| (Seahostar KEP30W supplied by Nippon Shokubai Co., Ltd. 20 mass %, number average particle diameter 300 nm) | |
| Surfactant | 0.1 parts by mass |
| (Olfin EXP4051F supplied by Nissin Chemical Industry Co., Ltd.) | |
| Water | 100 parts by mass |

Coating Composition 1-5 for Adhesion Improving Layer
Coating composition 1-5 for adhesion improving layer was prepared by mixing the following materials:

| | |
|---|---|
| aqueous acrylic resin | 30.0 parts by mass |
| (Nikasol A08 supplied by Nippon Carbide Industries Co., Inc. 20 mass %) | |
| dispersed colloidal silica particles | 10.0 parts by mass |
| (Seahostar KEP30W supplied by Nippon Shokubai Co., Ltd. 20 mass %, number average particle diameter 300 nm) | |
| Surfactant | 0.1 parts by mass |
| (Olfin EXP4051F supplied by Nissin Chemical Industry Co., Ltd.) | |
| Water | 100 parts by mass |

Coating Composition 1-1 for Hard Coat Layer
Coating composition 1-1 for hard coat layer was prepared by mixing the following materials:

| | |
|---|---|
| pentaerythritol triacrylate (PETA) | 30.0 parts by mass |
| Irgacure 907 (trade name, supplied by Ciba Specialty Chemicals Inc.) | 1.5 parts by mass |
| methyl isobutyl ketone | 73.5 parts by mass. |

Coating Composition 1-2 for Hard Coat Layer

Coating composition 1-2 for hard coat layer was prepared by mixing the following materials:

| | |
|---|---|
| pentaerythritol triacrylate (PETA) | 30.0 parts by mass |
| dispersed colloidal silica particles (ELCOM TO-1025SIV supplied by JGC Catalysts & Chemicals Co., Ltd. 30 mass %, number average particle diameter 120 nm) | 20 parts by mass |
| Irgacure 907 (trade name, supplied by Ciba Specialty Chemicals Inc.) | 1.5 parts by mass |
| methyl isobutyl ketone | 73.5 parts by mass. |

High Refractive Index Layer Component (A-8)

High refractive index layer component (A-8) was prepared by mixing the following materials:

| | |
|---|---|
| dispersed titanium dioxide particles dispersed (ELCOM supplied by JGC Catalysts & Chemicals Co., Ltd. solid content 30 mass %, number average particle diameter 8 nm) | 72 parts by mass |
| binder materials A (EBCRYL8210 supplied by Daicel-Cytec Co., Ltd. solid content 100 mass %) | 18 parts by mass |
| 2-propanol | 1 part by mass |
| ethylene glycol monobutyl ether | 9 parts by mass. |

High Refractive Index Layer Component (A-15)

Except that dispersed zirconium dioxide particles as described below were used instead of dispersed titanium dioxide, the same materials as used for high refractive index layer component (A-8) were mixed to prepare high refractive index layer component (A-15):
  dispersed zirconium dioxide particles
    (ELCOM supplied by JGC Catalysts & Chemicals Co., Ltd. solid content 30 mass %, number average particle diameter 15 nm)

High Refractive Index Layer Component (A-25)

Except that dispersed ATO particles as described below were used instead of dispersed titanium dioxide, the same materials as used for high refractive index layer component (A-8) were mixed to prepare high refractive index layer component (A-15):
  dispersed ATO particles
    (Lioduras supplied by Toyo Ink Co., Ltd. solid content 30 mass %, number average particle diameter 25 nm).

High Refractive Index Layer Component (B-8)

Except that the material described below was used instead of binder material A, the same materials as used for high refractive index layer component (A-8) were mixed to prepare high refractive index layer component (B-8):
  binder materials B
    (EBCRYL4858 supplied by Daicel-Cytec Co., Ltd. solid content 100 mass %)

High Refractive Index Layer Component (B-15)

Except that the material described below was used instead of binder material A, the same materials as used for high refractive index layer component (A-15) were mixed to prepare high refractive index layer component (B-15):
  binder materials B
    (EBCRYL4858 supplied by Daicel-Cytec Co., Ltd. solid content 100 mass %)

High Refractive Index Layer Component (X)

High refractive index layer component (X) was prepared by mixing the following materials:

| | |
|---|---|
| Opstar TU4005 (supplied by supplied by JSR Corporation) | 1.0 part by mass |
| 2-propanol | 1.0 part by mass |
| ethylene glycol monobutyl ether | 0.11 parts by mass. |

Low Refractive Index Layer Component (1-a)

First, 15 g of Thrulya (hollow silica supplied by JGC Catalysts & Chemicals Co., Ltd. with solid content 20 mass % and number average particle diameter 60 nm) was mixed with 1.37 g of methacryloyloxypropyl trimethoxysilane and 0.17 g of a 10 mass % aqueous solution of formic acid and stirred at 70° C. for 1 hour. Then, 1.38 g of $H_2C=CH-COO-CH_2-(CF_2)_8F$ and 0.057 g of 2,2-azobis-isobutyronitrile were added and stirred while being heated at 90° C. for 60 minutes. Subsequently, it was diluted by adding isopropyl alcohol to provide a low refractive index layer component (1-a) with a solid content of 14 mass %.

Low Refractive Index Layer Component (1-b)

Except that Thrulya (hollow silica supplied by JGC Catalysts & Chemicals Co., Ltd., solid content 20 mass %, number average particle diameter 40 nm) was used as the hollow silica component, the same materials as used for low refractive index layer component (1-a) were mixed to prepare low refractive index layer component (1-b).

Preparation of Low Refractive Index Layer Component (1-c)

Except that Oscal (colloidal silica supplied by JGC Catalysts & Chemicals Co., Ltd., solid content 20 mass %, number average particle diameter 120 nm) was used as the hollow silica component, the same materials as used for low refractive index layer component (1-a) were mixed to prepare low refractive index layer component (1-c).

Preparation of Low Refractive Index Layer Component (1-d)

First, 15 g of Thrulya (hollow silica supplied by JGC Catalysts & Chemicals Co., Ltd. with solid content 20 mass % and number average particle diameter 60 nm) was mixed with 1.37 g of methacryloyloxypropyl trimethoxysilane and 0.17 g of a 10 mass % aqueous solution of formic acid and stirred at 70° C. for 1 hour. Subsequently, it was diluted by adding isopropyl alcohol to provide a low refractive index layer component (1-d) with a solid content of 14 mass %.

Coating Composition 1-1 for Antireflection Layer

Coating composition 1-1 for antireflection layer was prepared by mixing the following materials:

| | |
|---|---|
| low refractive index layer component (1-a) | 13 parts by mass |
| high refractive index layer component (A-8) | 38 parts by mass |
| 2-hydroxy-2-methyl-1-phenyl-propane-1-one | 0.7 part by mass |
| hydrophobic compound B-1 ($H_2C=CH-COO-CH_2-(CF_2)_8F$ number average molecular weight 518) | 5.1 parts by mass |
| 2-propanol | 43.2 parts by mass. |

Coating Composition 1-2 for Antireflection Layer

Except that high refractive index layer component (A-15) was used instead of high refractive index layer component (A-8), the same materials as used for the coating composition 1-1 for antireflection layer were mixed to prepare coating composition 1-2 for antireflection layer.

Coating Composition 1-3 for Antireflection Layer

Except that low refractive index layer component (1-b) was used instead of low refractive index layer component (1-a) and high refractive index layer component (B-15) instead of high refractive index layer component (A-8), the same materials as used for coating composition 1-1 for antireflection layer were mixed to prepare coating composition 1-3 for antireflection layer.

Coating Composition 1-4 for Antireflection Layer

Except that low refractive index layer component (1-b) was used instead of low refractive index layer component (1-a) and high refractive index layer component (B-8) instead of high refractive index layer component (A-8), the same materials as used for coating composition 1-1 for antireflection layer were mixed to prepare coating composition 1-4 for antireflection layer.

Coating Composition 1-5 for Antireflection Layer

Coating composition 1-5 for hard coat layer was prepared by mixing the following materials:

| | |
|---|---|
| low refractive index layer component (1-a) | 13 parts by mass |
| high refractive index layer component (B-8) | 29 parts by mass |
| 2-hydroxy-2-methyl-1-phenyl-propane-1-one | 0.55 part by mass |
| hydrophobic compound B-1 ($H_2C=CH-COO-CH_2-(CF_2)_8F$ number average molecular weight 518) | 3.8 parts by mass |
| 2-propanol | 53.6 parts by mass. |

Coating Composition 1-6 for Antireflection Layer

Coating composition 1-6 for antireflection layer was prepared by mixing the following materials:

| | |
|---|---|
| low refractive index layer component (1-a) | 13 parts by mass |
| high refractive index layer component (A-8) | 21 parts by mass |
| 2-hydroxy-2-methyl-1-phenyl-propane-1-one | 0.40 part by mass |
| hydrophobic compound B-1 ($H_2C=CH-COO-CH_2-(CF_2)_8F$ number average molecular weight 518) | 2.7 parts by mass |
| 2-propanol | 62.9 parts by mass. |

Coating Composition 1-7 for Antireflection Layer

Coating composition 1-7 for antireflection layer was prepared by mixing the following materials:

| | |
|---|---|
| low refractive index layer component (1-a) | 6 parts by mass |
| high refractive index layer component (A-8) | 65 parts by mass |
| 2-hydroxy-2-methyl-1-phenyl-propane-1-one | 1.2 parts by mass |
| hydrophobic compound B-1 ($H_2C=CH-COO-CH_2-(CF_2)_8F$ number average molecular weight 518) | 20 parts by mass |
| 2-propanol | 7.8 parts by mass. |

Coating Composition 1-8 for Antireflection Layer

Coating composition 1-8 for antireflection layer was prepared by mixing the following materials:

| | |
|---|---|
| low refractive index layer component (1-a) | 5.5 parts by mass |
| high refractive index layer component (B-8) | 85 parts by mass |
| 2-hydroxy-2-methyl-1-phenyl-propane-1-one | 1.65 parts by mass |
| hydrophobic compound B-1 ($H_2C=CH-COO-CH_2-(CF_2)_8F$ number average molecular weight 518) | 30 parts by mass |

Coating Composition 1-9 for Antireflection Layer

Coating composition 1-9 for antireflection layer was prepared by mixing the following materials:

| | |
|---|---|
| low refractive index layer component (1-a) | 13 parts by mass |
| 2-hydroxy-2-methyl-1-phenyl-propane-1-one | 0.10 part by mass |
| binder material A (EBCRYL8210 supplied by Daicel-Cytec Co., Ltd. solid content 100 mass %) | 1 part by mass |
| 2-propanol | 85.9 parts by mass. |

Coating Composition 1-10 for Antireflection Layer

Coating composition 1-10 for antireflection layer was prepared by mixing the following materials:

| | |
|---|---|
| high refractive index layer component (A-25) | 50 parts by mass |
| 2-hydroxy-2-methyl-1-phenyl-propane-1-one | 0.9 part by mass |
| 2-propanol | 49 parts by mass |

Coating Composition 1-11 for Antireflection Layer

Coating composition 1-11 for antireflection layer was prepared by mixing the following materials:

| | |
|---|---|
| high refractive index layer component (A-8) | 38 parts by mass |
| 2-hydroxy-2-methyl-1-phenyl-propane-1-one | 0.36 part by mass |
| 2-propanol | 61.6 parts by mass. |

Coating Composition 1-13 for Antireflection Layer

Coating composition 1-13 for antireflection layer was prepared by mixing the following materials:

| | |
|---|---|
| low refractive index layer component (1-b) | 13 parts by mass |
| high refractive index layer component (x) | 9 parts by mass |
| 2-hydroxy-2-methyl-1-phenyl-propane-1-one | 0.90 part by mass |
| 2-propanol | 77.9 parts by mass. |

Coating Composition 1-14 for Antireflection Layer

Except that low refractive index layer component (1-c) was used instead of low refractive index layer component (1-b) and high refractive index layer component (B-8) instead of high refractive index layer component (B-15), the same materials as used for coating composition 1-3 for antireflection layer were mixed to prepare coating composition 1-14 for antireflection layer.

Coating Composition 1-15 for Antireflection Layer

Except that low refractive index layer component (1-d) was used instead of low refractive index layer component (1-a), the same materials as used for the coating composition 1-1 for antireflection layer were mixed to prepare coating composition 1-15 for antireflection layer.

Coating Composition 1-16 for Antireflection Layer

Except that high refractive index layer component (A-25) was used instead of high refractive index layer component (A-8) and low refractive index layer component (1-b) instead of low refractive index layer component (1-a), the same materials as used for coating composition 1-1 for antireflection layer were mixed to prepare coating composition 1-16 for antireflection layer.

Coating Composition 1-17 for Antireflection Layer

Coating composition 1-17 for antireflection layer was prepared by mixing the following materials:

| | |
|---|---|
| low refractive index layer component (1-a) | 13 parts by mass |
| 2-hydroxy-2-methyl-1-phenyl-propane-1-one | 0.1 part by mass |
| binder material A (EBCRYL8210 supplied by Daicel-Cytec Co., Ltd. solid content 100 mass %) | 0.5 part by mass |
| binder material C (Light Acrylate THF-A supplied by Kyoeisha Chemical Co., Ltd., solids content 100 mass %) | 0.5 part by mass |
| 2-propanol | 85.9 parts by mass. |

Antireflection Member Production Method

Described below is the antireflection member production method. The constitution of each sample is listed in Table 1-3.

Support Substrate 1-1

A PET resin film product (Lumirror U46 supplied by Toray Industries, Inc.) composed of a PET resin film coated with an adhesion improving paint was used as support substrate 1-1.

Support Substrate 1-1U

A PET resin film product (Lumirror T60 supplied by Toray Industries, Inc.) was subjected to corona treatment. Coating composition 1-1 for adhesion improving layer was applied on the corona-treated surface with a bar coater (#2). After the coating, the substrate was subjected to the first stage drying and the second stage drying as described below:
]First stage
hot air temperature: 100° C.
hot air flow speed: 2 m/sec
air flow direction: perpendicular to the coated surface
drying period: 1.5 minutes
Second stage
hot air temperature: 150° C.
hot air flow speed: 5 m/sec
air flow direction: parallel to the coated surface
drying period: 1.5 minutes The support substrate thus prepared is referred to as support substrate 1-1U provided with an adhesion improving layer.

Support Substrates 1-2U to 1-5U

Except that a coating composition for adhesion improving layer different from the coating composition 1-1 adhesion improving layer was used instead, the same procedures as used for support substrate 1-1U was carried out to provide a support substrate. The coating compositions for adhesion improving layer and the support substrates prepared were as described below:

support substrate 1-2U: coating composition 1-2 for adhesion improving layer
support substrate 1-3U: coating composition 1-3 for adhesion improving layer
support substrate 1-4U: coating composition 1-4 for adhesion improving layer
support substrate 1-5U: coating composition 1-5 for adhesion improving layer Support Substrate 1-1H A PET resin film product (Lumirror T60 supplied by Toray Industries, Inc.) was subjected to corona treatment. Coating composition 1-1 for hard coat layer was applied on the corona-treated surface with a bar coater (#16). After the coating, the substrate was subjected to the first stage drying and the second stage drying.
First stage
hot air temperature: 70° C.
hot air flow speed: 2 m/sec
air flow direction: parallel to the coated surface
drying period: 1.5 minutes
Second stage
hot air temperature: 130° C.
hot air flow speed: 5 m/sec
air flow direction: perpendicular to the coated surface
drying period: 1.5 minutes After drying, a high pressure mercury lamp of 160 W/cm (supplied by Eye Graphics Co., Ltd.) was used to apply ultraviolet ray under the conditions of an illuminance of 600 W/cm$^2$, accumulated light quantity of 500 mJ/cm$^2$, and oxygen concentration of 0.1 vol % to cure the coat. The support substrate thus prepared is referred to as support substrate 1-1H provided with a hard coat layer.

Support Substrate 1-2H

Except that coating composition 1-2 for hard coat layer was used instead of coating composition 1-1 for hard coat layer, the same procedure as used for support substrate 1-1H was carried out to provide a support substrate. The support substrate thus prepared is referred to as support substrate 1-2H.

Example 1-1

Antireflection Member

Coating composition 1-1 for antireflection layer was applied on the surface of support substrate 1-1 that is coated with a coating composition for adhesion improving layer using a bar coater (#10). After the coating, the substrate was subjected to the first stage drying and the second stage drying as described below:
First stage
hot air temperature: 35° C.
hot air flow speed: 1.5 m/sec
air flow direction: parallel to the coated surface
drying period: 1.5 minutes
Second stage
hot air temperature: 130° C.
hot air flow speed: 7 m/sec
air flow direction: perpendicular to the coated surface
drying period: 2 minutes The flow speed of hot air was determined from measurements made with a dynamic-static pressure tube.

After drying, a high pressure mercury lamp of 160 W/cm (supplied by Eye Graphics Co., Ltd.) was used to apply ultraviolet ray under the conditions of an illuminance of 600 W/cm$^2$, accumulated light quantity of 800 mJ/cm$^2$, and oxygen concentration of 0.1 vol % to cure the coat. This production method is referred to as production method 1-1. The antireflection member produced is referred to as Example 1-1.

Examples 1-2 to 1-6, 1-9, 1-11 to 1-14, and Comparative Examples 1-3 to 1-7

Antireflection Member

Except that a support substrate different from support substrate 1-1 and a coating composition for antireflection layer different from coating composition 1-1 for antireflection layer were used instead, the same procedure as used for Example 1-1 was carried out to provide an antireflection member. In cases where a support substrate coated with a coating composition for hard coat layer rather than a coating composition for adhesion improving layer was used, a coating composition for antireflection layer was applied on the surface coated with the coating composition for hard coat layer. The support substrates and coating compositions for antireflection layer used, and the antireflection members prepared were as described below:

Example 1-2: support substrate 1-1, coating composition for antireflection layer 1-2
Example 1-3: support substrate 1-1, coating composition for antireflection layer 1-3
Example 1-4: support substrate 1-1, coating composition for antireflection layer 1-4
Example 1-5: support substrate 1-1, coating composition for antireflection layer 1-5
Example 1-6: support substrate 1-1, coating composition for antireflection layer 1-6
Example 1-9: support substrate 1-1, coating composition for antireflection layer 1-16

Example 1-11: support substrate 1-1U, coating composition for antireflection layer 1-1
Example 1-12: support substrate 1-2U, coating composition for antireflection layer 1-1
Example 1-13: support substrate 1-3U, coating composition for antireflection layer 1-1
Example 1-14: support substrate 1-4U, coating composition for antireflection layer 1-1
Comparative Example 1-3: support substrate 1-1H, coating composition for antireflection layer 1-13
Comparative Example 1-4: support substrate 1-1, coating composition for antireflection layer 1-14
Comparative Example 1-5: support substrate 1-1, coating composition for antireflection layer 1-15
Comparative Example 1-6: support substrate 1-5U, coating composition for antireflection layer 1-1
Comparative Example 1-7: support substrate 1-2H, coating composition for antireflection layer 1-1

Examples 1-7 and 1-8

Antireflection Member

Except that a coating composition for antireflection layer different from coating composition 1-1 for antireflection layer and a bar coater different from a bar coater (#10) were used instead, the same procedure as used for Example 1-1 was carried out to provide an antireflection member. The coating compositions for antireflection layer and bar coaters used, and the antireflection members prepared were as described below:
Example 1-7: coating composition for antireflection layer 1-7, bar coater (#18)
Example 1-8: coating composition for antireflection layer 1-8, bar coater (#24)

Comparative Example 1-1

Antireflection Member

Coating composition for antireflection layer 1-10 was applied on the surface of support substrate 1-1 coated with an adhesion improving paint using a bar coater (#18). After the coating, the substrate was subjected to the first stage drying and the second stage drying as described below:
First stage
hot air temperature: 70° C.
hot air flow speed: 3 m/sec
air flow direction: parallel to the coated surface
drying period: 1.5 minutes
Second stage
hot air temperature: 130° C.
hot air flow speed: 7 m/sec
air flow direction: perpendicular to the coated surface
drying period: 1.5 minutes
After drying, a high pressure mercury lamp of 160 W/cm (supplied by Eye Graphics Co., Ltd.) was used to apply ultraviolet ray under the conditions of an illuminance of 600 W/cm$^2$, accumulated light quantity of 800 mJ/cm$^2$, and oxygen concentration of 0.1 vol % to cure the coat.
Subsequently, coating composition for antireflection layer 1-9 was applied on the surface coated with cured coating composition for antireflection layer 1-10 using a bar coater (#10). After coating, the same drying apparatus was used for drying under the following conditions:
First stage
hot air temperature: 35° C.
hot air flow speed: 1.5 m/sec
air flow direction: parallel to the coated surface
drying period: 1.5 minutes
Second stage
hot air temperature: 130° C.
hot air flow speed: 7 m/sec
air flow direction: perpendicular to the coated surface
drying period: 2 minutes
After drying, a high pressure mercury lamp of 160 W/cm (supplied by Eye Graphics Co., Ltd.) was used to apply ultraviolet ray under the conditions of an illuminance of 600 W/cm$^2$, accumulated light quantity of 800 mJ/cm$^2$, and oxygen concentration of 0.1 vol % to cure the coat. This production method is referred to as production method 1-2. The antireflection member produced is referred to as Comparative Example 1-1.

Comparative Example 1-2

Antireflection Member

Except that coating composition for antireflection layer 1-11, instead of composition for antireflection layer 1-10, was used as the coating composition for antireflection layer for the first coating step, along with a bar coater (#10) instead of the bar coater (#18), the same procedure as used for Comparative Example 1-1 was carried out to prepare an antireflection member. The antireflection member produced is referred to as Comparative Example 1-2.

Example 1-10

Antireflection Member

Coating composition for antireflection layer 1-10 was applied on the surface of support substrate 1-1 coated with an adhesion improving paint using a bar coater (#18). After the coating, the substrate was subjected to the first stage drying and the second stage drying as described below:
First stage
hot air temperature: 70° C.
hot air flow speed: 3 m/sec
air flow direction: parallel to the coated surface
drying period: 1.5 minutes
Second stage
hot air temperature: 130° C.
hot air flow speed: 7 m/sec
air flow direction: perpendicular to the coated surface
drying period: 1.5 minutes
After drying, a high pressure mercury lamp of 160 W/cm (supplied by Eye Graphics Co., Ltd.) was used to apply ultraviolet ray under the conditions of an illuminance of 300 W/cm$^2$, accumulated light quantity of 400 mJ/cm$^2$, and presence of oxygen to cure the coat.
Subsequently, coating composition for antireflection layer 1-17 was applied on the surface coated with cured coating composition for antireflection layer 1-10 using a bar coater (#10). After coating, the same drying apparatus was used for drying under the following conditions:
First stage
hot air temperature: 35° C.
hot air flow speed: 1 m/sec
air flow direction: parallel to the coated surface
drying period: 1 minute
Second stage
hot air temperature: 150° C.
hot air flow speed: 7 m/sec
air flow direction: perpendicular to the coated surface
drying period: 3 minutes After drying, a high pressure mercury lamp of 160 W/cm (supplied by Eye Graphics Co., Ltd.) was used to apply ultraviolet ray under the conditions of an illuminance of 600 W/cm², accumulated light quantity of 800 mJ/cm², and oxygen concentration of 0.1 vol % to cure the coat. This production method is referred to as production method 1-3. The antireflection member produced is referred to as Example 1-10.

Evaluation of Antireflection Members

The antireflection members prepared were subjected to performance evaluation as described below. Results obtained are listed in Tables 1-4 to 1-6. For each Example and Comparative Example, measurements were made at three points in each sample and their averages were adopted unless otherwise specified.

Surface Roughness Ra (nm) of Support Substrate

Surface roughness Ra was determined according to JIS-B-0601 (2001) using a surface roughness gauge (Surfcorder ET4000A supplied by Kosaka Laboratory Ltd.) under the following measurement conditions. The surface roughness tester used was Surfcorder ET4000A supplied by Kosaka Laboratory Ltd. Measurements were made on the surface of each support substrate to be coated with a coating composition for antireflection layer.

Measurement Conditions
  measuring speed: 0.1 mm/s
  evaluation length: 10 mm
  cutoff value λc: 0.1 mm
  filter: Gaussian filter (low frequency cutoff)

Thickness of First and Second Layers in Antireflection Layer

The thickness of the first and second layers in an antireflection layer was measured by transmission electron microscopy (TEM). An ultrathin section of each antireflection layer specimen was photographed by TEM at a magnification of 200,000. The thickness of the layer was determined from the photographs taken using image processing program EasyAccess. A total of 30 thickness measurements were made and their average was taken as the thickness of the layer.

Refractive Index of First and Second Layers in Antireflection Layer

The refractive index of the first and second layers in an antireflection layer was measured with a reflection spectroscopy film thickness meter. The reflection spectroscopy film thickness meter was FE-3000 supplied by Otsuka Electronics Co., Ltd. The reflection spectroscopy film thickness meter was used to measure the reflectance in the range of 300 to 800 nm. The refractive index at 550 nm was determined using the software FE-Analysis attached to this equipment according to the General Catalog P6 for film thickness meter (nonlinear least square method) supplied by Otsuka Electronics Co., Ltd.

Specifically, Cauchy's dispersion equation described below was used to approximate the wavelength dispersion of refractive index and the optical constants ($C_1$, $C_2$, and $C_3$) were calculated by the least square method (curve fitting) to give the value of refractive index at 550 nm:

$$n=(C_3/\lambda^4)+(C_2/\lambda^2)+C_1$$

where n denotes the refractive index, λ the wavelength, and $C_1$, $C_2$, and $C_3$ the optical constants.

Interface Formed Between the First and the Second Layer

Transmission electron microscopy (TEM) was used to check for an interface formed between the first and the second layer. An ultrathin section of each antireflection layer specimen was photographed by TEM at a magnification of 200,000. The image taken was processed using image processing software EasyAccess so adjust the white balance so that the brightest parts and the darkest parts are included in an 8-bit tone curve. Furthermore, contrast was adjusted so that the two types of particles can be distinguished clearly.

If a definite boundary was seen between one layer and the other it was decided that an interface existed.
A definite boundary was seen: A
A definite boundary was not seen: C Length of a, b, and c Following the observation to check for an interface formed between the first and the second layer, the procedure described below was carried out by transmission electron microscopy (TEM) to measure the lengths a, b, and c.

On the interface formed between the first and the second layer, two points A1 and A2 500 nm or more linearly away from each other were assumed, and the length a of the straight line connecting the two points was determined.

Then, in the object detection mode, the threshold was adjusted so that the interface between the first and the second layer was detected, and the length b between the two points A1 and A2 measured along the interface was measured.

Then, an additional line passing through point A1 and extending perpendicularly to the first surface of the support substrate was drawn. Point $C_1$ was defined as the intersection of this additional line and the interface between atmosphere and the first layer. Similarly, an additional line passing through point A2 and extending perpendicularly to the first surface of the support substrate was drawn. Point $C_2$ was defined as the intersection of this additional line and the interface between atmosphere and the first layer. Similarly, the length c of the line between points $C_1$ and $C_2$ along the interface formed between the first layer and atmosphere was measured.

The values of b/a, b/c were calculated from the measurements of lengths a, b, and c.

Number Average Particle Diameter of the Particles Contained in the Second Layer

The number average particle diameter of the particles contained in the second layer was determined by transmission electron microscopy (TEM). The second layer portion defined by the interface formed between the first and the second layer was observed by TEM at a magnification of 500,000. Using image processing software EasyAccess, the diameters dp of 100 particles seen in the field of view were measured. In the case where the field of view contained only less than 100 particles, another portion was observed under the same conditions and the diameters dp of a total of 100 particles were measured. The particle diameter dp refers to the maximum size across the particle, or the longitudinal diameter of the particle. Even if the particle has a hollow structure, the maximum size across the particle is measured. The particle diameter dp averaged over the 100 particles was taken as the number average particle diameter of the particles contained in the second layer.

Surface Tension $\gamma_F$ (mN/m)

The surface tension $\gamma_F$ of hydrophobic compound B was measured with an automatic contact angle gauge. The automatic contact angle gauge used was DM-501 supplied by Kyowa Interface Science Co., Ltd. In an environment of 25° C., a liquid compound was extruded from a syringe of Teflon (registered trademark) and the shape of the droplet formed at the end of the syringe was analyzed with multifunctional integrated analysis software FAMAS, which was attached to the equipment, followed by calculating the surface tension. The analysis was carried out according to the procedure described in FAMAS Instruction Manual. The density of the compound to be used for the calculation was measured in an environment of 25° C. with a density gravimeter. The density gravimeter used was DA-130N supplied by Kyoto Electronics Manufacturing Co., Ltd.

Viscosity $\eta_F$ (mPa/s) Measured with Vibratory Viscometer

The vibratory viscometer used for this measurement of the viscosity $\eta_F$ of hydrophobic compound B was a tuning fork type vibratory viscometer. Specifically, it was tuning fork type vibratory viscometer SV-10 supplied by A&D Company, Limited. Water was fed to a water-circulating jacket and the viscosity $\eta_F$ was measured at 25° C. according to the procedure described in Vibratory Viscometer Instruction Manual.

Molar Volume $V_F$ (cm$^3$/mol)

In the case where fluorine compound B was used as hydrophobic compound B, the molar volume $V_F$ was calculated based on the molar volumes of the groups determined according to Fluorine Reagent 2008 Catalog (supplied by Daikin Chemicals Sales Co., Ltd.).

Number Average Molecular Weight

The number average molecular weight of hydrophobic compound B was determined by gel permeation chromatography (GPC) using tetrahydrofuran as solvent and a monodisperse polystyrene with a known molecular weight as standard substance. The gel permeation chromatograph used was GC-2010 supplied by Shimadzu Corporation. The number average molecular weight $M_n$ is defined as $M_n = \Sigma M_i N_i / \Sigma N_i$ where $N_i$ denotes the number of molecules having a molecular weight of $M_i$.

Viscosity Change $\Delta\eta$

Shear viscosities $\eta_1$ and $\eta_2$ of a coating composition for antireflection layer were measured with a rotary rheometer. The rotary rheometer used was AR1000 supplied by TA Instruments Japan Inc. A cone-and-plate geometry with a diameter of 40 mm and an angle of 2° was used for measurement.

Measurements were made in a steady flow at a measuring temperature 25° C. with the shear rate changed stepwise. Specifically, preliminary shearing (30 seconds) was performed at a shear rate of 100 s$^{-1}$, and subsequently, measurements were made at a total of 16 points spaced at logarithmic intervals (16 points including the four points of 1000 s$^{-1}$, 10 s$^{-1}$, 0.1 s$^{-1}$, and 0.01 s$^{-1}$). From these data, viscosity $\eta_1$ (mPa·s) at a shear rate of 0.1 s$^{-1}$ and viscosity $\eta_2$ (mPa·s) at a shear rate of 10 s$^{-1}$ were determined. Then, the viscosity change $\Delta\eta$ (=$\eta_1-\eta_2$) was calculated as the difference between viscosity $\eta_1$ and viscosity $\eta_2$.

SIMS-Based Ion Strength

The SIMS-based ion strength was measured secondary ion mass spectrometer PHI6300 supplied by PHI in U.S.A. A region of 300 µm×600 µm was scanned under the conditions of a primary ion CS$^+$ energy of 3 keV and a primary ion electric current of 150 nA. For its central 9% area, the antireflection member was analyzed from the surface of the first layer to the support substrate to measure the secondary ion strength (counts).

The sputter rate is necessary to calculate the secondary ion strength in the thickness direction, but the sputter rate differs among different materials. Thus, the thickness of each layer was measured in advance by TEM (transmission electron microscope H-9500 supplied by Hitachi, Ltd.), and the sputter rate was calculated from the time period required for sputtering from the surface of the first layer to the support substrate. Then, a graph of the measuring position (sputter depth) on the horizontal axis and the secondary ion strength prepared, and the secondary ion strength at the through-thickness center position was determined from the graph.

According to this procedure, the SIMS-based ion strength $F_L$ of fluorine atoms at the through-thickness center of the first layer, the SIMS-based ion strength $F_H$ of fluorine atoms at the through-thickness center of the second layer, and the SIMS-based ion strength $O_H$ of oxygen atoms at the through-thickness center of the second layer were calculated.

Scratch Resistance

A piece of steel wool (#0000) was put vertically on surface of a antireflection layer to apply a load of 250 g/cm$^2$, and moved to and fro 10 times over a 1 cm distance. The number of scratches found by visual observation was counted. The specimens were rated according to the following criteria, and those of grade 3 or above were evaluated as acceptable.

Grade 5: 0
Grade 4: 1 or more and less than 5
Grade 3: 5 or more and less than 10
Grade 2: 10 or more and less than 20
Grade 1: 20 or more Abrasion Resistance A piece of while flannel (supplied by Kowa Company, Ltd.) was attached to the end (end area of 1 cm$^2$) of an eraser abrasion resistance tester supplied by Motomitsu Seisakusho Co., Ltd. to apply a load of 500 g, and moved on the surface of an antireflection layer to and fro 5,000 times over a distance of 5 cm. The number of scratches found by visual observation was counted. The specimens were rated according to the following criteria, and those of grade 3 or above were evaluated as acceptable.

Grade 5: 0
Grade 4: 1 to 10
Grade 3: 11 to 20
Grade 2: 21 or more
Grade 4: Test portion of antireflection layer entirely separated Transparency The haze value was measured according to JIS K 7136 (2000) using a haze meter supplied by Nippon Denshoku Industries Co., Ltd. An antireflection member was placed in the equipment so that light would permeate it from the antireflection layer side. The antireflection member was evaluated as acceptable in terms of transparency if it had a haze value of less than 2%.

Chemical Resistance

A 1 mass % NaOH solution was dropped on the surface of an antireflection layer. After 15 min, the surface was wiped with gauze. The conditions of the wiped surface were observed, and the damage to the surface was evaluated by visual inspection.

It was evaluated as A if no marks of droplets were found, and evaluated as C if marks were found. For each specimen, three different portions were evaluated, and the specimen with the largest number of droplet marks was taken for evaluation. A specimen was evaluated as acceptable in terms of chemical resistance if it is ranked as A.

Adhesiveness

A lattice pattern containing 100 squares of 1 mm$^2$ was cut into the surface of an antireflection layer. Under normal conditions (23° C., relative humidity 65%), an adhesive cellophane tape supplied by Nichiban Co., Ltd. was applied to it, and a rubber roller was pressed against it with a load of 19.6 N and moved to and fro three times. The tape was pulled off in the perpendicular direction, and the number of remaining squares was counted for evaluation. A specimen of grade AA or A was evaluated as acceptable in terms of adhesiveness.

100 remaining: AA
80 or more and 99 or less remaining: A
50 or more and 79 or less remaining: B
49 or less remaining: C Weather Resistance An accelerated test machine for ultraviolet ray degradation (Eye-Super UV Tester, SUV-W131, supplied by Iwasaki Electric Co., Ltd.) was used to perform forced ultraviolet ray irradiation test under the following conditions. The adhesiveness of the antireflection layer specimen was evaluation after irradiation.

Ultraviolet Ray Irradiation Conditions

An illuminance of 100 mW/cm$^2$, temperature of 60° C., relative humidity of 50% RH, and irradiation time of 50 hours The adhesiveness was evaluated based on the bonding strength determined according to JIS K5600-5-6 (1999) (cross-cut testing). The evaluation results for adhesiveness were used to rank an antireflection layer in terms of degradation. It was evaluated as acceptable in weather resistance if ranked A or B.

No separation (free from degradation): A
Partly separated (low-degree degradation): B
Totally separated (significant degradation): C.

Antireflection Performance

Spectrophotometer UV-3100 supplied by Shimadzu Corporation was used to measure the reflectance in the wavelength range of 400 nm to 800 nm. A specimen was evaluated as acceptable in terms of antireflection performance if its minimum reflectance (bottom reflectance) was less than 0.8%.

Interference Irregularity

A matte-black spray paint was applied uniformly to the surface of a support substrate uncoated with an antireflection layer. The surface of this specimen provided with an antireflection layer was exposed to light coming obliquely from a three band fluorescent lamp (FL20SS•EX-N/18 supplied by Matsushita Electric Industrial Co., Ltd.). The interference pattern formed was observed visually for evaluation. The specimens were rated according to the following criteria, and those of grade 3 or above were evaluated as acceptable.

Grade 5: No interference pattern and good appearance
Grade 3: Interference detected, but at practically acceptable level
Grade 1: interference detected at practically unacceptable level Tables 1-4 to 1-6 show evaluation results for antireflection members. An antireflection member will serve practically if it is evaluated as acceptable in all evaluation items.

As seen from Table 1-6, all antireflection members prepared in Examples are evaluated as acceptable.

The antireflection member of Example 1-6 was found to be practically acceptable although having a second layer with a thickness smaller than the preferable range and slightly poor in scratch resistance and abrasion resistance.

The antireflection member of Example 1-8 was found to be practically acceptable although having a second layer with a thickness larger than the preferable range and slightly poor in transparency and antireflection performance.

The antireflection member of Example 1-9 was found to be practically acceptable although the number average particle diameter of the particles contained in the second layer was larger than the preferable range and it was slightly poor in abrasion resistance and interference irregularity.

The antireflection member of Example 1-10, which was produced according to a method different from the preferable production method, was found to be practically acceptable although having an ion strength ratio ($F_L/F_H$) of fluorine atoms and a value of b/c out of the preferable range for the invention and slightly poor in scratch resistance, abrasion resistance, and interference irregularity.

All samples of Comparative Examples 1-1 to 1-3 had a b/a ratio of 1.1 or less and they were poor in abrasion resistance, adhesiveness, chemical resistance, and weather resistance. Furthermore, those of Comparative Examples 1-1 and 1-2 had a particularly small B/A ratio as compared with the others and they were poor in interference irregularity.

The sample of Comparative Example 1-4 had a b/a ratio of 1.45 or more and it was poor in antireflection performance.

All samples of Comparative Examples 1-5 to 1-7 failed to form two layers in the antireflection layer and they were poor in antireflection performance and transparency.

TABLE 1-1

| Paint composition for antireflection layer | Low refractive index layer component | High refractive index layer component | Binder material | Viscosity change ($\delta\eta$) |
|---|---|---|---|---|
| 1-1 | 1-a | A-8 | A | 0.5 |
| 1-2 | 1-a | A-15 | A | 0.5 |
| 1-3 | 1-b | B-15 | B | 0.5 |
| 1-4 | 1-b | B-8 | B | 0.5 |
| 1-5 | 1-a | B-8 | B | 0.1 |
| 1-6 | 1-a | A-8 | A | 0.1 |
| 1-7 | 1-a | A-8 | A | 1 |
| 1-8 | 1-a | B-8 | B | 2 |
| 1-9 | 1-a | — | A | 100 |
| 1-10 | — | A-25 | A | 100 |
| 1-11 | — | A-8 | A | 100 |
| 1-13 | 1-b | x | — | 100 |
| 1-14 | 1-c | B-8 | B | 0.5 |
| 1-15 | 1-d | A-8 | A | 0.5 |
| 1-16 | 1-b | A-25 | A | 0.5 |
| 1-17 | 1-a | — | A, C | 100 |

TABLE 1-2

| | | Fluorine compound B | | | | |
|---|---|---|---|---|---|---|
| Paint composition for antireflection layer | Content of hydrophobic compound B (mass %) | Number average molecular weight | Viscosity ($\eta_F$) | Surface tension ($\gamma_F$) | Molar volume ($v_F$) | Fluorine-treated inorganic particles/other inorganic particles (mass ratio) |
| 1-1 | 5.1 | 518 | 20 | 16 | 315 | 1/4.5 |
| 1-2 | 5.1 | 518 | 20 | 16 | 315 | 1/4.5 |
| 1-3 | 5.1 | 518 | 20 | 16 | 315 | 1/4.5 |
| 1-4 | 5.1 | 518 | 20 | 16 | 315 | 1/4.5 |
| 1-5 | 3.8 | 518 | 20 | 16 | 315 | 1/3.4 |

TABLE 1-2-continued

| Paint composition for antireflection layer | Fluorine compound B | | | | | Fluorine-treated inorganic particles/other inorganic particles (mass ratio) |
|---|---|---|---|---|---|---|
| | Content of hydrophobic compound B (mass %) | Number average molecular weight | Viscosity ($\eta_F$) | Surface tension ($\gamma_F$) | Molar volume ($v_F$) | |
| 1-6 | 2.7 | 518 | 20 | 16 | 315 | 1/2.5 |
| 1-7 | 20 | 518 | 20 | 16 | 315 | 1/16.7 |
| 1-8 | 30 | 518 | 20 | 16 | 315 | 1/24 |
| 1-9 | — | — | — | — | — | 1 |
| 1-10 | — | — | — | — | — | — |
| 1-11 | — | — | — | — | — | — |
| 1-13 | — | — | — | — | — | 1/4.5 |
| 1-14 | 5.1 | 518 | 20 | 16 | 315 | 1/4.5 |
| 1-15 | 5.1 | 518 | 20 | 16 | 315 | 1/4.5 |
| 1-16 | 5.1 | 518 | 20 | 16 | 315 | 1/4.5 |
| 1-17 | — | — | — | — | — | 1 |

TABLE 1-3

| | Support substrate | Surface roughness of support substrate (Ra) (*1) | Paint composition for hard coat layer | Paint composition for adhesion improving layer | Paint composition for antireflection layer | Antireflection member production method | Number of coating steps for support substrate | Number of layers formed on support substrate |
|---|---|---|---|---|---|---|---|---|
| Example 1-1 | 1-1 | 8 | | | 1-1 | 1-1 | 1 | 2 |
| Example 1-2 | 1-1 | 8 | | | 1-2 | 1-1 | 1 | 2 |
| Example 1-3 | 1-1 | 8 | | | 1-3 | 1-1 | 1 | 2 |
| Example 1-4 | 1-1 | 8 | | | 1-4 | 1-1 | 1 | 2 |
| Example 1-5 | 1-1 | 8 | | | 1-5 | 1-1 | 1 | 2 |
| Example 1-6 | 1-1 | 8 | | | 1-6 | 1-1 | 1 | 2 |
| Example 1-7 | 1-1 | 8 | | | 1-7 | 1-1 | 1 | 2 |
| Example 1-8 | 1-1 | 8 | | | 1-8 | 1-1 | 1 | 2 |
| Example 1-9 | 1-1 | 8 | | | 1-16 | 1-1 | 1 | 2 |
| Example 1-10 | 1-1 | 8 | | | 1-10/1-17 | 1-3 | 2 | 2 |
| Example 1-11 | 1-1U | 8 | | 1-1 | 1-1 | 1-1 | 1 | 2 |
| Example 1-12 | 1-2U | 15 | | 1-2 | 1-1 | 1-1 | 1 | 2 |
| Example 1-13 | 1-3U | 22 | | 1-3 | 1-1 | 1-1 | 1 | 2 |
| Example 1-14 | 1-4U | 30 | | 1-4 | 1-1 | 1-1 | 1 | 2 |
| Comparative Example 1-1 | 1-1 | 8 | | | 1-10/1-9 | 1-2 | 2 | 2 |
| Comparative Example 1-2 | 1-1 | 8 | | | 1-11/1-9 | 1-2 | 2 | 2 |
| Comparative Example 1-3 | 1-1H | 3 | 1-1 | | 1-13 | 1-1 | 1 | 2 |
| Comparative Example 1-4 | 1-1 | 8 | | | 1-14 | 1-1 | 1 | 2 |
| Comparative Example 1-5 | 1-1 | 8 | | | 1-15 | 1-1 | 1 | 2 |
| Comparative Example 1-6 | 1-5U | 50 | | 1-5 | 1-1 | 1-1 | 1 | 2 |
| Comparative Example 1-7 | 1-2H | 50 | 1-2 | | 1-1 | 1-1 | 1 | 2 |

(*1) surface roughness to be coated with paint composition for antireflection layer

TABLE 1-4

| | Refractive index | | Thickness of each layer | | | Number average particle diameter of particles contained in second layer (nm) |
|---|---|---|---|---|---|---|
| | First layer | Second layer | First layer | Second layer | Hard coat layer | |
| Example 1-1 | 1.38 | 1.68 | 95 | 800 | — | 9.8 |
| Example 1-2 | 1.38 | 1.64 | 95 | 800 | — | 19.2 |

TABLE 1-4-continued

|  | Refractive index | | Thickness of each layer | | Hard coat layer | Number average particle diameter of particles contained in second layer (nm) |
|---|---|---|---|---|---|---|
|  | First layer | Second layer | First layer | Second layer | | |
| Example 1-3 | 1.36 | 1.64 | 95 | 800 | — | 19.2 |
| Example 1-4 | 1.36 | 1.64 | 95 | 800 | — | 9.8 |
| Example 1-5 | 1.38 | 1.68 | 95 | 600 | — | 9.8 |
| Example 1-6 | 1.38 | 1.68 | 95 | 450 | — | 9.8 |
| Example 1-7 | 1.38 | 1.68 | 95 | 3500 | — | 9.8 |
| Example 1-8 | 1.38 | 1.68 | 95 | 4500 | — | 9.8 |
| Example 1-9 | 1.36 | 1.64 | 95 | 800 | — | 27.9 |
| Example 1-10 | 1.36 | 1.64 | 95 | 2000 | — | 9.8 |
| Example 1-11 | 1.38 | 1.68 | 95 | 800 | — | 9.8 |
| Example 1-12 | 1.38 | 1.68 | 95 | 800 | — | 9.8 |
| Example 1-13 | 1.38 | 1.68 | 95 | 800 | — | 9.8 |
| Example 1-14 | 1.38 | 1.68 | 95 | 800 | — | 9.8 |
| Comparative Example 1-1 | 1.36 | 1.64 | 95 | 2000 | — | 31 |
| Comparative Example 1-2 | 1.36 | 1.68 | 95 | 800 | — | 9.8 |
| Comparative Example 1-3 | 1.36 | 1.64 | 95 | 200 | 2000 | 27.9 |
| Comparative Example 1-4 | 1.45 | 1.68 | 95 | 800 | — | 9.8 |
| Comparative Example 1-5 | 1.56 | 1.48 | — | — | — | — |
| Comparative Example 1-6 | 1.54 | 1.5 | — | — | — | — |
| Comparative Example 1-7 | 1.52 | 1.52 | — | — | 2000 | — |

TABLE 1-5

|  | Interface formation | Length ratio | | Relation of $F_H$ and $O_H$ | Ion strength ratio ($F_L/F_H$) |
|---|---|---|---|---|---|
|  | | b/a | b/c | | |
| Example 1-1 | A | 1.27 | 1.23 | $F_H \geq O_H$ | 130 |
| Example 1-2 | A | 1.17 | 1.09 | $F_H \geq O_H$ | 130 |
| Example 1-3 | A | 1.21 | 1.18 | $F_H \geq O_H$ | 130 |
| Example 1-4 | A | 1.35 | 1.25 | $F_H \geq O_H$ | 130 |
| Example 1-5 | A | 1.12 | 1.10 | $F_H \geq O_H$ | 150 |
| Example 1-6 | A | 1.11 | 1.07 | $F_H \geq O_H$ | 150 |
| Example 1-7 | A | 1.35 | 1.24 | $F_H \geq O_H$ | 40 |
| Example 1-8 | A | 1.42 | 1.35 | $F_H \geq O_H$ | 40 |
| Example 1-9 | A | 1.13 | 1.08 | $F_H \geq O_H$ | 130 |
| Example 1-10 | A | 1.11 | 1.05 | $F_H \geq O_H$ | 200 |
| Example 1-11 | A | 1.27 | 1.23 | $F_H \geq O_H$ | 130 |
| Example 1-12 | A | 1.30 | 1.24 | $F_H \geq O_H$ | 130 |
| Example 1-13 | A | 1.36 | 1.25 | $F_H \geq O_H$ | 130 |
| Example 1-14 | A | 1.40 | 1.30 | $F_H \geq O_H$ | 130 |
| Comparative Example 1-1 | A | 1.04 | 1.03 | $F_H < O_H$ | 200 |
| Comparative Example 1-2 | A | 1.03 | 1.02 | $F_H < O_H$ | 200 |
| Comparative Example 1-3 | A | 1.08 | 1.00 | $F_H < O_H$ | 200 |
| Comparative Example 1-4 | A | 1.50 | 1.45 | $F_H \geq O_H$ | 130 |
| Comparative Example 1-5 | C | — | — | $F_H < O_H$ | 1 |
| Comparative Example 1-6 | C | — | — | $F_H < O_H$ | 1 |
| Comparative Example 1-7 | C | — | — | $F_H < O_H$ | 1 |

TABLE 1-6

|  | Scratch resistance | Abrasion resistance | Transparency (haze) (%) | Antireflection performance (%) | Interference irregularity | Adhesiveness | Chemical resistance | Weather resistance |
|---|---|---|---|---|---|---|---|---|
| Example 1-1 | 5 | 5 | 1.30 | 0.2 | 5 | AA | A | A |
| Example 1-2 | 5 | 4 | 1.35 | 0.2 | 3 | A | A | B |
| Example 1-3 | 4 | 4 | 1.30 | 0.2 | 5 | AA | A | A |
| Example 1-4 | 5 | 4 | 1.28 | 0.4 | 5 | AA | A | A |
| Example 1-5 | 4 | 3 | 1.22 | 0.3 | 3 | A | A | B |
| Example 1-6 | 3 | 3 | 1.18 | 0.3 | 3 | A | A | B |
| Example 1-7 | 5 | 5 | 1.70 | 0.5 | 5 | AA | A | A |
| Example 1-8 | 5 | 4 | 1.85 | 0.7 | 5 | AA | A | A |
| Example 1-9 | 4 | 3 | 1.30 | 0.3 | 3 | A | A | B |
| Example 1-10 | 3 | 3 | 1.50 | 0.3 | 3 | A | A | B |
| Example 1-11 | 5 | 5 | 1.30 | 0.2 | 5 | AA | A | A |
| Example 1-12 | 5 | 5 | 1.35 | 0.3 | 5 | AA | A | A |
| Example 1-13 | 5 | 5 | 1.50 | 0.5 | 5 | AA | A | A |
| Example 1-14 | 5 | 5 | 1.95 | 0.7 | 5 | AA | A | A |
| Comparative Example 1-1 | 3 | 2 | 1.35 | 0.3 | 1 | C | C | C |
| Comparative Example 1-2 | 1 | 2 | 1.25 | 0.3 | 1 | C | C | C |
| Comparative Example 1-3 | 3 | 2 | 1.65 | 0.5 | 3 | C | C | C |
| Comparative Example 1-4 | 4 | 4 | 1.95 | 1.5 | 5 | A | A | A |

TABLE 1-6-continued

| | Scratch resistance | Abrasion resistance | Transparency (haze) (%) | Antireflection performance (%) | Interference irregularity | Adhesiveness | Chemical resistance | Weather resistance |
|---|---|---|---|---|---|---|---|---|
| Comparative Example 1-5 | 3 | 3 | 5.20 | 1.2 | 5 | C | C | C |
| Comparative Example 1-6 | 3 | 3 | 5.20 | 2.5 | 5 | C | C | C |
| Comparative Example 1-7 | 4 | 4 | 5.20 | 2.5 | 5 | C | C | C |

Production Example 2

High Refractive Index Layer Component (2-a)

Six parts by mass of ELCOM TO1019TIC, which contains titanium oxide particles, (supplied by JGC Catalysts & Chemicals Co., Ltd., solid content 30 mass %) and 1 part by mass of multifunctional acrylate Kayarad DPHA (supplied by Nippon Kayaku Co., Ltd., solid content 100 mass %) were mixed to provide a high refractive index layer component (2-a) with a solid content of 40 mass %.

High Refractive Index Layer Component (2-b)

Six parts by mass of Opstar TU4005, which contains antimony-containing tin oxide particles, (supplied by JSR Corporation Corporation, solid content 30 mass %) and 1 part by mass of multifunctional acrylate Kayarad DPHA (supplied by Nippon Kayaku Co., Ltd., solid content 100 mass %) were mixed to provide a high refractive index layer component (2-b) with a solid content of 40 mass %.

High Refractive Index Layer Component (2-c)

Six parts by mass of TYZ67-H01, which contains zirconium oxide particles, (supplied by Toyo Ink Co., Ltd., solid content 30 mass %) and 1 part by mass of multifunctional acrylate Kayarad DPHA (supplied by Nippon Kayaku Co., Ltd., solid content 100 mass %) were mixed to provide a high refractive index layer component (2-c) with a solid content of 40 mass %.

High Refractive Index Layer Component (2-d)

Six parts by mass of ELCOM TO1019TIC, which contains titanium oxide particles, (supplied by JGC Catalysts & Chemicals Co., Ltd., solid content 30 mass %) and 1 part by mass of multifunctional acrylate Kayarad DPHA (supplied by Nippon Kayaku Co., Ltd., solid content 100 mass %) were mixed to provide a high refractive index layer component (2-d) with a solid content of 60 mass %.

High Refractive Index Layer Component (2-e)

Six parts by mass of ELCOM TO1019TIC, which contains titanium oxide particles, (supplied by JGC Catalysts & Chemicals Co., Ltd., solid content 30 mass %) and 1 part by mass of multifunctional acrylate Kayarad DPHA (supplied by Nippon Kayaku Co., Ltd., solid content 100 mass %) were mixed to provide a high refractive index layer component (2-e) with a solid content of 3.5 mass %.

High Refractive Index Layer Component (2-f)

Six parts by mass of Opstar TU4005, which contains antimony-containing tin oxide particles, (supplied by JSR Corporation Corporation, solid content 30 mass %) and 1 part by mass of multifunctional acrylate Kayarad DPHA (supplied by Nippon Kayaku Co., Ltd., solid content 100 mass %) were mixed to provide a high refractive index layer component (2-f) with a solid content of 40 mass %.

Low Refractive Index Layer Component (2-a)

First, 15 g of hollow silica Thrulya 4110 (supplied by JGC Catalysts & Chemicals Co., Ltd., solid content 20 mass %) was mixed with 1.37 g of methacryloyloxypropyl trimethoxysilane and 0.17 g of a 10 mass % aqueous solution of formic acid and stirred at 70° C. for 1 hour. Then, 1.38 g of $H_2C=CH-COO-CH_2-(CF_2)_8F$ and 0.057 g of 2,2-azo-bis-isobutyronitrile were added and stirred while being heated at 90° C. for 60 minutes. Subsequently, it was diluted by adding isopropyl alcohol to provide a low refractive index layer component (2-a) with a solid content of 14 mass %.

Low Refractive Index Layer Component (2-b)

First, 15 g of hollow silica Thrulya 4110 (supplied by JGC Catalysts & Chemicals Co., Ltd., solid content 20 mass %) was mixed with 1.37 g of methacryloyloxypropyl trimethoxysilane and 0.17 g of a 10 mass % aqueous solution of formic acid and stirred at 70° C. for 1 hour. Subsequently, it was diluted by adding isopropyl alcohol to provide a low refractive index layer component (2-b) with a solid content of 14 mass %.

Low Refractive Index Layer Component (2-c)

Isopropyl alcohol was added to dilute 15 g of hollow silica Thrulya 4110 (supplied by JGC Catalysts & Chemicals Co., Ltd., solid content 20 mass %) to provide a low refractive index layer component (2-c) with a solid content of 14 mass %.

Low Refractive Index Layer Component (2-d)

First, 15 g of hollow silica Thrulya 4110 (supplied by JGC Catalysts & Chemicals Co., Ltd., solid content 20 mass %) was mixed with 1.37 g of methacryloyloxypropyl trimethoxysilane and 0.17 g of a 10 mass % aqueous solution of formic acid and stirred at 70° C. for 1 hour. Then, 1.38 g of $H_2C=CH-COO-CH_2-(CF_2)_8F$ and 0.057 g of 2,2-azo-bis-isobutyronitrile were added and stirred while being heated at 90° C. for 60 minutes. Subsequently, it was diluted by adding isopropyl alcohol to provide a low refractive index layer component (2-d) with a solid content of 3.5 mass %.

Coating Composition 2-1 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, $H_2C=CH-COO-CH_2-(CF_2)_8F$, used as fluorine compound B, was added to account for 30 mass % to provide a coating composition 2-1 for antireflection layer.

Coating Composition 2-2 for Antireflection Layer

Low refractive index layer component (2-a) and high refractive index layer component (2-c) were mixed at a mass ratio of 1:7 to prepare a solution, and 3 parts by mass of 2-hydroxy-2-methyl-1-phenyl-propane-1-one was added to 100 parts by mass of the solution. Furthermore, $H_2C=CH-COO-CH_2-(CF_2)_8F$, used as fluorine compound B, was added to account for 10 mass % to provide a coating composition 2-2 for antireflection layer.

Coating Composition 2-3 for Antireflection Layer

Low refractive index layer component (2-a) and high refractive index layer component (2-b) were mixed at a mass ratio of 1:7 to prepare a solution, and 3 parts by mass of 2-hydroxy-2-methyl-1-phenyl-propane-1-one was added to 100 parts by mass of the solution. Furthermore, $H_2C=CH—COO—CH_2—(CF_2)_8F$, used as fluorine compound B, was added to account for 30 mass % to provide a coating composition 2-3 for antireflection layer.

Coating Composition 2-4 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, $H_2C=CH—COO—CH_2—(CF_2)_8F$, used as fluorine compound B, was added to account for 40 mass % to provide a coating composition 2-4 for antireflection layer.

Coating Composition 2-5 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, $H_2C=CH—COO—CH_2—(CF_2)_6F$, used as fluorine compound B, was added to account for 30 mass % to provide a coating composition 2-5 for antireflection layer.

Coating Composition 2-6 for Antireflection Layer

Low refractive index layer component (2-a) and high refractive index layer component (2-a) were mixed at a mass ratio of 1:7, and 3 parts by mass of 2-hydroxy-2-methyl-1-phenyl-propane-1-one was added. Furthermore, $H_2C=CH—COO—CH_2—(CF_2)_6F$, used as fluorine compound B, was added to account for 20 mass % to provide a coating composition 2-6 for antireflection layer.

Coating Composition 2-7 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, $H_2C=CH—COO—CH_2—(CF_2)_4F$, used as fluorine compound B, was added to account for 30 mass % to provide a coating composition 2-7 for antireflection layer.

Coating Composition 2-8 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, $H_2C=CH—COO—CH_2—(CF_2)_4F$, used as fluorine compound B, was added to account for 20 mass % to provide a coating composition 2-8 for antireflection layer.

Coating Composition 2-9 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, $H_2C=CH—COO—CH2CF2CF3$, used as fluorine compound, was added to account for 30 mass % to provide a coating composition 2-9 for antireflection layer.

Coating Composition 2-10 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, $CF_3(CF_2)_7CH_2CH_2Si(OCH_3)_3$, used as fluorine compound B, was added to account for 20 mass % to provide a coating composition 2-10 for antireflection layer.

Coating Composition 2-11 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, $CF_3(CF_2)_5CH_2CH_2Si(OCH_3)_3$, used as fluorine compound B, was added to account for 25 mass % to provide a coating composition 2-11 for antireflection layer.

Coating Composition 2-12 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, nonamer oligomers of $CF_3(CF_2)_7CH_2CH_2Si(OH)_3$, used as fluorine compound B, was added to account for 5 mass % to provide a coating composition 2-12 for antireflection layer.

Coating Composition 2-13 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, heptamer oligomers of $CF_3(CF_2)_7CH_2CH_2Si(OH)_3$, used as fluorine compound B, was added to account for 10 mass % to provide a coating composition 2-13 for antireflection layer.

Coating Composition 2-14 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, hexamer oligomers of $H_2C=CH—COO—CH_2—(CF_2)_8F$, used as fluorine compound B, was added to account for 15 mass % to provide a coating composition 2-14 for antireflection layer.

Coating Composition 2-15 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, trimer oligomers of $CF_3(CF_2)_7CH_2CH_2Si(OH)_3$, used as fluorine compound B, was added to account for 20 mass % to provide a coating composition 2-15 for antireflection layer.

Coating Composition 2-16 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, $HO—CH_2—CF_2CF_3$, used as fluorine compound, was added to account for 20 mass % to provide a coating composition 2-16 for antireflection layer.

Coating Composition 2-17 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, HO—CH$_2$—CF$_3$, used as fluorine compound, was added to account for 20 mass % to provide a coating composition 2-17 for antireflection layer.

Coating Composition 2-18 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, H$_2$C=CH—COO—CH$_2$—CF$_3$, used as the fluorine compound, was added to account for 20 mass % to provide a coating composition 2-18 for antireflection layer.

Coating Composition 2-19 for Antireflection Layer

Low refractive index layer component (2-b) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, H$_2$C=CH—COO—CH$_2$—(CF$_2$)$_8$F, used as fluorine compound B, was added to account for 30 mass % to provide a coating composition 2-19 for antireflection layer.

Coating Composition 2-20 for Antireflection Layer

Low refractive index layer component (2-c) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, H$_2$C=CH—COO—CH$_2$—(CF$_2$)$_8$F, used as fluorine compound B, was added to account for 30 mass % to provide a coating composition 2-20 for antireflection layer.

Coating Composition 2-21 for Antireflection Layer

Low refractive index layer component (2-a) and high refractive index layer component (2-d) were mixed at a mass ratio of 1:7 to prepare a solution, and 3 parts by mass of 2-hydroxy-2-methyl-1-phenyl-propane-1-one was added to 100 parts by mass of the solution. Furthermore, H$_2$C=CH—COO—CH$_2$—(CF$_2$)$_8$F, used as fluorine compound B, was added to account for 30 mass % to provide a coating composition 2-21 for antireflection layer.

Coating Composition 2-22 for Antireflection Layer

Low refractive index layer component (2-d) and high refractive index layer component (2-e) were mixed at a mass ratio of 1:1 to prepare a solution, and 3 parts by mass of 2-hydroxy-2-methyl-1-phenyl-propane-1-one was added to 100 parts by mass of the solution. Furthermore, H$_2$C=CH—COO—CH$_2$—(CF$_2$)$_8$F, used as fluorine compound B, was added to account for 1 mass % to provide a coating composition 2-22 for antireflection layer.

Coating Composition 2-23 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, trimethylolpropane EO modified triacrylate [CH$_2$=CHCO—(OCH$_2$H$_4$)$_n$—OCH$_2$]$_3$—CCH$_2$CH$_3$, which is an acrylate monomer, was added to account for 44 mass % to provide a coating composition 2-23 for antireflection layer.

Coating Composition 2-24 for Antireflection Layer

Except that fluorine compound B is not contained, the same procedure as for coating composition 2-1 for antireflection layer was carried out to provide a coating composition 2-24 for antireflection layer.

Coating Composition 2-25 for Antireflection Layer

Low refractive index layer component (2-d) and high refractive index layer component (2-e) were mixed at a mass ratio of 10:1 to prepare a solution, and 3 parts by mass of 2-hydroxy-2-methyl-1-phenyl-propane-1-one was added to 100 parts by mass of the solution. Furthermore, H$_2$C=CH—COO—CH$_2$—(CF$_2$)$_8$F, used as fluorine compound B, was added to account for 1 mass % to provide a coating composition 2-25 for antireflection layer.

Coating Composition 2-26 for Antireflection Layer

Low refractive index layer component (2-a) and high refractive index layer component (2-f) were mixed at a mass ratio of 1:7 to prepare a solution, and 3 parts by mass of 2-hydroxy-2-methyl-1-phenyl-propane-1-one was added to 100 parts by mass of the solution to provide a coating composition 2-26 for antireflection layer.

Coating Composition 2-27 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, PC-4131 (supplied by DIC Corporation), used as silicone compound B, was added to account for 20 mass % to provide a coating composition 2-27 for antireflection layer.

Coating Composition 2-28 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, n-decyl trimethoxysilane (Z-6210 supplied by Dow Corning Toray Co., Ltd.), used as long chain hydrocarbon compound B, was added to account for 20 mass % to provide a coating composition 2-28 for antireflection layer.

Coating Composition 2-29 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, H$_2$C=CH—COO—CH$_2$—(CF$_2$)$_8$F, used as fluorine compound B, and PC-4131, used as silicone compound A, were added to account respectively for 2.5 mass % and 2.5 mass % to provide a coating composition 2-29 for antireflection layer.

Coating Composition 2-30 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution. Furthermore, H$_2$C=CH—COO—CH$_2$—(CF$_2$)$_8$F, used as fluorine compound B, and n-octyl tritriethoxysilane (Z-6341, supplied by Dow Corning Toray Co., Ltd.), used as long chain hydrocarbon compound B, were added to account respectively for 2.5 mass % and 2.5 mass % to provide a coating composition 2-30 for antireflection layer.

Coating Composition 2-31 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution to provide a coating composition 2-31 for antireflection layer.

Coating Composition 2-32 for Antireflection Layer

Low refractive index layer component (2-a) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution to provide a coating composition 2-32 for antireflection layer.

Coating Composition 2-33 for Antireflection Layer

Low refractive index layer component (2-b) and high refractive index layer component (2-a) were mixed at a mass ratio of 1:7 to prepare a solution, and 3 parts by mass of 2-hydroxy-2-methyl-1-phenyl-propane-1-one was added to 100 parts by mass of the solution to provide a coating composition 2-33 for antireflection layer.

Reference Examples 2-1 to 2-24 and Reference Comparative Examples 2-1 to 2-9

Antireflection Member

U46 (supplied by Toray Advanced Film Co., Ltd.), which consists of a PET film coated with an adhesion improving layer, was used as the support substrate. A coating composition for antireflection layer as described in Tables 2-5 and 2-6 was applied to the adhesion improving layer on the support substrate using a bar coater (#10). After coating and drying at 100° C. for 2 minutes, a high pressure mercury lamp of 160 W/cm (supplied by Eye Graphics Co., Ltd.) was used to apply ultraviolet ray under the conditions of an illuminance of 600 W/cm$^2$, accumulated light quantity of 800 mJ/cm$^2$, and oxygen concentration of 0.1 vol % to provide an antireflection member.

Evaluation of Antireflection Member

Evaluation was conducted in the same way as for Production Example 1.

The antireflection members of Reference Examples 2-1 to 2-24 prepared using a coating composition for antireflection layer with a viscosity change (Δη) in the range of 0.1 mPa·s or more and 10 mPa·s or less had a definite interface formed between two layers with different refractive indices in the antireflection layer and accordingly had high antireflectiveness, scratch resistance, and transparency.

The antireflection member of Reference Comparative Example 2-1 prepared using a coating composition for antireflection layer with a viscosity change (Δη) of less than 0.1 mPa·s was poor in antireflectiveness and transparency, and failed to have a definite interface between the first layer and the second layer.

The antireflection members of Reference Comparative Examples 2-2, 2-3, and 2-6 to 2-9 prepared using a coating composition for antireflection layer with a viscosity change (Δη) of more than 10 mPa·s were poor in antireflectiveness and transparency, and failed to have a definite interface between the first layer and the second layer.

The antireflection members of Reference Comparative Examples 2-4, 2-5, and 2-9 prepared using a coating composition for antireflection layer containing no fluorine-treated inorganic particles were poor in antireflectiveness and transparency, and failed to have a definite interface between the first layer and the second layer.

TABLE 2-1

| Paint composition for antireflection layer | Low refractive index layer component | High refractive index layer component | Viscosity change of paint composition (Δη) (mPa · s) | Presence/absence of hydrophobic compound B |
|---|---|---|---|---|
| 2-1 | 2-a | 2-a | 0.1 | Fluorine compound B |
| 2-2 | 2-a | 2-c | 0.7 | Fluorine compound B |
| 2-3 | 2-a | 2-b | 0.1 | Fluorine compound B |
| 2-4 | 2-a | 2-a | 5 | Fluorine compound B |
| 2-5 | 2-a | 2-a | 1 | Fluorine compound B |
| 2-6 | 2-a | 2-a | 2 | Fluorine compound B |
| 2-7 | 2-a | 2-a | 4 | Fluorine compound B |
| 2-8 | 2-a | 2-a | 7 | Fluorine compound B |
| 2-9 | 2-a | 2-a | 8 | Absence |
| 2-10 | 2-a | 2-a | 9 | Fluorine compound B |
| 2-11 | 2-a | 2-a | 10 | Fluorine compound B |
| 2-12 | 2-a | 2-a | 10 | Fluorine compound B |
| 2-13 | 2-a | 2-a | 9 | Fluorine compound B |
| 2-14 | 2-a | 2-a | 8 | Fluorine compound B |
| 2-15 | 2-a | 2-a | 7 | Fluorine compound B |

TABLE 2-2

| Paint composition for antireflection layer | Low refractive index layer component | High refractive index layer component | Viscosity change of paint composition (Δη) (mPa · s) | Presence/absence of hydrophobic compound B |
|---|---|---|---|---|
| 2-16 | 2-a | 2-a | 0.05 | Absence |
| 2-17 | 2-a | 2-a | 15 | Absence |
| 2-18 | 2-a | 2-a | 100 | Absence |
| 2-19 | 2-b | 2-a | 1 | Fluorine compound B |
| 2-20 | 2-c | 2-a | 1 | Fluorine compound B |
| 2-21 | 2-a | 2-d | 0.3 | Fluorine compound B |
| 2-22 | 2-d | 2-e | 0.2 | Fluorine compound B |
| 2-23 | 2-a | 2-a | 1500 | Absence |
| 2-24 | 2-a | 2-a | 10 | Absence |
| 2-25 | 2-d | 2-e | 0.7 | Fluorine compound B |
| 2-26 | 2-a | 2-f | 10 | Absence |
| 2-27 | 2-a | 2-a | 8 | Silicone compound B |
| 2-28 | 2-a | 2-a | 10 | Long chain hydrocarbon compound B |
| 2-29 | 2-a | 2-a | 0.1 | Silicone compound B/ fluorine compound B |
| 2-30 | 2-a | 2-a | 0.2 | Long chain hydrocarbon compound B/ fluorine compound B |
| 2-31 | 2-a | 2-a | 150 | Absence |
| 2-32 | 2-a | 2-a | 100 | Absence |
| 2-33 | 2-b | 2-a | 2000 | Absence |

TABLE 2-3

| Paint composition for antireflection layer | Fluorine compound B | | | | | Fluorine-treated inorganic particles/other inorganic particles (mass ratio) |
|---|---|---|---|---|---|---|
| | Content of hydrophobic compound B (mass %) | Number average molecular weight | Viscosity ($\eta_F$) | Surface tension ($\gamma_F$) | Molar volume ($V_F$) | |
| 2-1 | 30 | 518 | 20 | 16 | 315 | 1/20 |
| 2-2 | 10 | 518 | 20 | 16 | 315 | 1/20 |
| 2-3 | 30 | 518 | 20 | 16 | 315 | 1/20 |
| 2-4 | 40 | 518 | 20 | 16 | 315 | 1/20 |
| 2-5 | 30 | 418 | 15 | 18 | 269 | 1/20 |
| 2-6 | 20 | 418 | 15 | 18 | 269 | 1/20 |
| 2-7 | 30 | 318 | 5 | 24 | 221 | 1/20 |
| 2-8 | 20 | 318 | 5 | 24 | 221 | 1/20 |
| 2-9 | — | — | — | — | — | — |
| 2-10 | 20 | 568 | 10 | 18 | 350 | 1/20 |
| 2-11 | 25 | 468 | 10 | 18 | 300 | 1/20 |
| 2-12 | 5 | 4500 | 120 | 16 | 1200 | 1/20 |
| 2-13 | 10 | 4000 | 100 | 16 | 1000 | 1/20 |
| 2-14 | 15 | 3100 | 80 | 17 | 800 | 1/20 |
| 2-15 | 20 | 1600 | 40 | 18 | 600 | 1/20 |

TABLE 2-4

| Paint composition for antireflection layer | Fluorine compound B | | | | | Fluorine-treated inorganic particles/other inorganic particles (mass ratio) |
|---|---|---|---|---|---|---|
| | Content of hydrophobic compound B (mass %) | Number average molecular weight | Viscosity ($\eta_F$) | Surface tension ($\gamma_F$) | Molar volume (VF) | |
| 2-16 | — | — | — | — | — | 1/20 |
| 2-17 | — | — | — | — | — | 1/20 |
| 2-18 | — | — | — | — | — | 1/20 |
| 2-19 | 30 | 518 | 20 | 16 | 315 | 1/20 |
| 2-20 | 30 | 518 | 20 | 16 | 315 | 1/20 |
| 2-21 | 30 | 518 | 20 | 16 | 315 | 1/30 |
| 2-22 | 1 | 518 | 20 | 16 | 315 | 1/5 |
| 2-23 | — | — | — | — | — | — |
| 2-24 | — | — | — | — | — | 1/20 |
| 2-25 | 1 | 518 | 20 | 16 | 315 | 2/1 |
| 2-26 | — | — | — | — | — | 1/20 |
| 2-27 | 20 | — | — | — | — | — |
| 2-28 | — | — | — | — | — | — |
| 2-29 | 2.5/2.5 | 518 | 20 | 16 | 315 | 1/20 |
| 2-30 | 2.5/2.5 | 518 | 20 | 16 | 315 | 1/20 |
| 2-31 | — | — | — | — | — | — |
| 2-32 | — | — | — | — | — | — |
| 2-33 | — | — | — | — | — | — |

TABLE 2-5

| | Paint composition for antireflection layer | Viscosity change of paint composition ($\Delta\eta$) (mPa·s) | Refractive index | | Thickness of each layer (nm) | | Number average particle diameter (nm) | |
|---|---|---|---|---|---|---|---|---|
| | | | First layer | Second layer | First layer | Second layer | First layer | Second layer |
| Reference Example 2-1 | 2-1 | 0.1 | 1.36 | 1.68 | 95 | 2000 | 61 | 7 |
| Reference Example 2-2 | 2-2 | 0.7 | 1.36 | 1.66 | 95 | 2000 | 61 | 7 |
| Reference Example 2-3 | 2-3 | 0.1 | 1.36 | 1.65 | 95 | 2000 | 61 | 7 |
| Reference Example 2-4 | 2-4 | 5 | 1.37 | 1.67 | 95 | 2000 | 61 | 7 |
| Reference Example 2-5 | 2-5 | 1 | 1.37 | 1.67 | 95 | 2000 | 61 | 7 |
| Reference Example 2-6 | 2-6 | 2 | 1.37 | 1.67 | 95 | 2000 | 61 | 7 |
| Reference Example 2-7 | 2-7 | 4 | 1.38 | 1.67 | 95 | 2000 | 61 | 7 |
| Reference Example 2-8 | 2-8 | 7 | 1.38 | 1.67 | 95 | 2000 | 61 | 7 |
| Reference Example 2-9 | 2-9 | 8 | 1.38 | 1.67 | 95 | 2000 | 61 | 7 |
| Reference Example 2-10 | 2-10 | 9 | 1.36 | 1.67 | 95 | 2000 | 61 | 7 |

TABLE 2-5-continued

|  | Paint composition for antireflection layer | Viscosity change of paint composition (Δη) (mPa·s) | Refractive index First layer | Refractive index Second layer | Thickness of each layer (nm) First layer | Thickness of each layer (nm) Second layer | Number average particle diameter (nm) First layer | Number average particle diameter (nm) Second layer |
|---|---|---|---|---|---|---|---|---|
| Reference Example 2-11 | 2-11 | 10 | 1.37 | 1.67 | 95 | 2000 | 61 | 7 |
| Reference Example 2-12 | 2-12 | 10 | 1.39 | 1.65 | 95 | 2000 | 61 | 7 |
| Reference Example 2-13 | 2-13 | 9 | 1.38 | 1.67 | 95 | 2000 | 61 | 7 |
| Reference Example 2-14 | 2-14 | 8 | 1.38 | 1.67 | 95 | 2000 | 61 | 7 |
| Reference Example 2-15 | 2-15 | 7 | 1.37 | 1.67 | 95 | 2000 | 61 | 7 |
| Reference Example 2-16 | 2-21 | 0.3 | 1.36 | 1.68 | 95 | 3000 | 61 | 7 |
| Reference Example 2-17 | 2-22 | 0.2 | 1.36 | 1.68 | 95 | 500 | 61 | 7 |
| Reference Example 2-18 | 2-24 | 10 | 1.39 | 1.65 | 95 | 2000 | 61 | 7 |
| Reference Example 2-19 | 2-25 | 0.7 | 1.36 | 1.66 | 95 | 250 | 61 | 7 |
| Reference Example 2-20 | 2-26 | 10 | 1.39 | 1.65 | 95 | 2000 | 61 | 20 |
| Reference Example 2-21 | 2-27 | 8 | 1.38 | 1.64 | 95 | 2000 | 61 | 7 |
| Reference Example 2-22 | 2-28 | 10 | 1.39 | 1.65 | 95 | 2000 | 61 | 7 |
| Reference Example 2-23 | 2-29 | 0.1 | 1.36 | 1.68 | 95 | 2000 | 61 | 7 |
| Reference Example 2-24 | 2-30 | 0.2 | 1.36 | 1.68 | 95 | 2000 | 61 | 7 |

TABLE 2-6

|  | Paint composition for antireflection layer | Viscosity change of paint composition (Δη) (mPa·s) | Refractive index First layer | Refractive index Second layer | Thickness of each layer (nm) First layer | Thickness of each layer (nm) Second layer | Number average particle diameter (nm) First layer | Number average particle diameter (nm) Second layer |
|---|---|---|---|---|---|---|---|---|
| Reference Comparative Example 2-1 | 2-16 | 0.05 | 1.48 | 1.56 | — | — | — | — |
| Reference Comparative Example 2-2 | 2-17 | 15 | 1.5 | 1.54 | — | — | — | — |
| Reference Comparative Example 2-3 | 2-18 | 100 | 1.52 | 1.52 | — | — | — | — |
| Reference Comparative Example 2-4 | 2-19 | 1 | 1.54 | 1.54 | — | — | — | — |
| Reference Comparative Example 2-5 | 2-20 | 1 | 1.48 | 1.54 | — | — | — | — |
| Reference Comparative Example 2-6 | 2-23 | 1500 | 1.52 | 1.52 | — | — | — | — |
| Reference Comparative Example 2-7 | 2-31 | 150 | 1.53 | 1.54 | — | — | — | — |
| Reference Comparative Example 2-8 | 2-32 | 100 | 1.54 | 1.53 | — | — | — | — |
| Reference Comparative Example 2-9 | 2-33 | 2000 | 1.53 | 1.54 | — | — | — | — |

TABLE 2-7

|  | Antireflection performance (%) | Transparency (haze) (%) | Interface formation | Scratch resistance |
|---|---|---|---|---|
| Reference Example 2-1 | 0.2 | 0.6 | A | 5 |
| Reference Example 2-2 | 0.2 | 0.6 | A | 5 |
| Reference Example 2-3 | 0.7 | 0.7 | A | 5 |
| Reference Example 2-4 | 0.4 | 0.6 | A | 5 |
| Reference Example 2-5 | 0.3 | 0.6 | A | 5 |
| Reference Example 2-6 | 0.4 | 0.6 | A | 5 |
| Reference Example 2-7 | 0.5 | 0.6 | A | 5 |
| Reference Example 2-8 | 0.5 | 0.6 | A | 5 |
| Reference Example 2-9 | 0.6 | 0.6 | A | 5 |
| Reference Example 2-10 | 0.2 | 0.5 | A | 5 |
| Reference Example 2-11 | 0.3 | 0.6 | A | 5 |
| Reference Example 2-12 | 0.7 | 0.7 | A | 5 |
| Reference Example 2-13 | 0.6 | 0.6 | A | 5 |
| Reference Example 2-14 | 0.5 | 0.6 | A | 5 |
| Reference Example 2-15 | 0.4 | 0.6 | A | 5 |
| Reference Example 2-16 | 0.3 | 0.6 | A | 5 |
| Reference Example 2-17 | 0.5 | 0.6 | A | 3 |
| Reference Example 2-18 | 0.7 | 0.7 | A | 5 |
| Reference Example 2-19 | 0.2 | 0.5 | A | 3 |
| Reference Example 2-20 | 0.6 | 0.6 | A | 5 |
| Reference Example 2-21 | 0.6 | 0.7 | A | 5 |
| Reference Example 2-22 | 0.7 | 0.7 | A | 5 |
| Reference Example 2-23 | 0.2 | 0.5 | A | 5 |
| Reference Example 2-24 | 0.2 | 0.6 | A | 5 |

TABLE 2-8

|  | Antireflection performance (%) | Transparency (haze) (%) | Interface formation | Scratch resistance |
|---|---|---|---|---|
| Reference Comparative Example 2-1 | 1.5 | 2.2 | C | 3 |
| Reference Comparative Example 2-2 | 2 | 2.3 | C | 3 |
| Reference Comparative Example 2-3 | 2.5 | 2.6 | C | 3 |
| Reference Comparative Example 2-4 | 2.6 | 2.8 | C | 3 |

TABLE 2-8-continued

|  | Anti-reflection performance (%) | Transparency (haze) (%) | Interface formation | Scratch resistance |
|---|---|---|---|---|
| Reference Comparative Example 2-5 | 2.1 | 2.5 | C | 3 |
| Reference Comparative Example 2-6 | 2.5 | 2.8 | C | 3 |
| Reference Comparative Example 2-7 | 2.4 | 2.6 | C | 3 |
| Reference Comparative Example 2-8 | 2.5 | 2.7 | C | 3 |
| Reference Comparative Example 2-9 | 2.3 | 2.8 | C | 3 |

Production Example 3

High Refractive Index Layer Component (3-a)

Six parts by mass of ELCOM TO1019TIC, which contains titanium oxide particles, (supplied by JGC Catalysts & Chemicals Co., Ltd., solid content 30 mass %) and 1 part by mass of multifunctional acrylate Kayarad DPHA (supplied by Nippon Kayaku Co., Ltd., solid content 100 mass %) were mixed to provide a high refractive index layer component (3-a) with a solid content of 40 mass %.

High Refractive Index Layer Component (3-b)

Six parts by mass of Opstar TU4005, which contains antimony-containing tin oxide particles, (supplied by JSR Corporation Corporation, solid content 30 mass %) and 1 part by mass of multifunctional acrylate Kayarad DPHA (supplied by Nippon Kayaku Co., Ltd., solid content 100 mass %) were mixed to provide a high refractive index layer component (3-b) with a solid content of 40 mass %.

High Refractive Index Layer Component (3-c)

Six parts by mass of TYZ67-H01, which contains zirconium oxide particles, (supplied by Toyo Ink Co., Ltd., solid content 30 mass %) and 1 part by mass of multifunctional acrylate Kayarad DPHA (supplied by Nippon Kayaku Co., Ltd., solid content 100 mass %) were mixed to provide a high refractive index layer component (3-c) with a solid content of 40 mass %.

High Refractive Index Layer Component (3-d)

Six parts by mass of ELCOM TO1019TIC, which contains titanium oxide particles, (supplied by JGC Catalysts & Chemicals Co., Ltd., solid content 30 mass %) and 1 part by mass of multifunctional acrylate Kayarad DPHA (supplied by Nippon Kayaku Co., Ltd., solid content 100 mass %) were mixed to provide a high refractive index layer component (3-d) with a solid content of 60 mass %.

High Refractive Index Layer Component (3-e)

Six parts by mass of ELCOM TO1019TIC, which contains titanium oxide particles, (supplied by JGC Catalysts & Chemicals Co., Ltd., solid content 30 mass %) and 1 part by mass of multifunctional acrylate Kayarad DPHA (supplied by Nippon Kayaku Co., Ltd., solid content 100 mass %) were mixed to provide a high refractive index layer component (3-e) with a solid content of 3.5 mass %.

High Refractive Index Layer Component (3-f)

Six parts by mass of ELCOM TO1019TIC, which contains titanium oxide particles, (supplied by JGC Catalysts & Chemicals Co., Ltd., solid content 30 mass %) and 1 part by mass of multifunctional acrylate Kayarad DPHA (supplied by Nippon Kayaku Co., Ltd., solid content 100 mass %) were mixed to provide a high refractive index layer component (3-f) with a solid content of 35 mass %.

Low Refractive Index Layer Component (3-a)

First, 15 g of hollow silica Thrulya 4110 (supplied by JGC Catalysts & Chemicals Co., Ltd., solid content 20 mass %) was mixed with 1.37 g of methacryloyloxypropyl trimethoxysilane and 0.17 g of a 10 mass % aqueous solution of formic acid and stirred at 70° C. for 1 hour. Then, 1.38 g of $H_2C=CH-COO-CH_2-(CF_2)_8F$ and 0.057 g of 2,2-azo-bis-isobutyronitrile were added and stirred while being heated at 90° C. for 60 minutes. Subsequently, it was diluted by adding isopropyl alcohol to provide a low refractive index layer component (3-a) with a solid content of 14 mass %.

Low Refractive Index Layer Component (3-b)

First, 15 g of hollow silica Thrulya 4110 (supplied by JGC Catalysts & Chemicals Co., Ltd., solid content 20 mass %) was mixed with 1.37 g of methacryloyloxypropyl trimethoxysilane and 0.17 g of a 10 mass % aqueous solution of formic acid and stirred at 70° C. for 1 hour. Subsequently, it was diluted by adding isopropyl alcohol to provide a low refractive index layer component (3-b) with a solid content of 14 mass %.

Low Refractive Index Layer Component (3-c)

Isopropyl alcohol was added to dilute 15 g of hollow silica Thrulya 4110 (supplied by JGC Catalysts & Chemicals Co., Ltd., solid content 20 mass %) to provide a low refractive index layer component (3-c) with a solid content of 14 mass %.

Low Refractive Index Layer Component (3-d)

First, 15 g of hollow silica Thrulya 4110 (supplied by JGC Catalysts & Chemicals Co., Ltd., solid content 20 mass %) was mixed with 1.37 g of methacryloyloxypropyl trimethoxysilane and 0.17 g of a 10 mass % aqueous solution of formic acid and stirred at 70° C. for 1 hour. Then, 1.38 g of $H_2C=CH-COO-CH_2-(CF_2)_8F$ and 0.057 g of 2,2-azo-bis-isobutyronitrile were added and stirred while being heated at 90° C. for 60 minutes. Subsequently, it was diluted by adding isopropyl alcohol to provide a low refractive index layer component (3-d) with a solid content of 3.5 mass %.

Coating Composition 3-1 for Antireflection Layer

Low refractive index layer component (3-a) and high refractive index layer component (3-a) were mixed at a mass ratio of 1:7 to prepare a solution, and 3 parts by mass of 2-hydroxy-2-methyl-1-phenyl-propane-1-one was added to 100 parts by mass of the solution. Furthermore, $H_2C=CH-COO-CH_2-(CF_2)_8F$, used as fluorine compound B, was added to account for 30 mass % of the entire coating composition to provide a coating composition 3-1 for antireflection layer.

Coating Composition 3-2 for Antireflection Layer

Low refractive index layer component (3-a) and high refractive index layer component (3-c) were mixed at a mass ratio of 1:7 to prepare a solution, and 3 parts by mass of 2-hydroxy-2-methyl-1-phenyl-propane-1-one was added to 100 parts by mass of the solution. Furthermore, $H_2C=CH-COO-CH_2-(CF_2)_8F$, used as fluorine compound B, was added to account for 10 mass % of the entire coating composition to provide a coating composition 3-2 for antireflection layer.

Coating Composition 3-3 for Antireflection Layer

Low refractive index layer component (3-a) and high refractive index layer component (3-b) were mixed at a mass ratio of 1:7 to prepare a solution, and 3 parts by mass of 2-hydroxy-2-methyl-1-phenyl-propane-1-one was added to 100 parts by mass of the solution. Furthermore, $H_2C=CH-COO-CH_2-(CF_2)_8F$, used as fluorine compound B, was added to account for 30 mass % of the entire coating composition to provide a coating composition 3-3 for antireflection layer.

Coating Composition 3-4 for Antireflection Layer

Low refractive index layer component (3-a) and high refractive index layer component (3-a) were mixed at a mass ratio of 1:7 to prepare a solution, and 3 parts by mass of 2-hydroxy-2-methyl-1-phenyl-propane-1-one was added to 100 parts by mass of the solution. Furthermore, $H_2C=CH—COO—CH_2—(CF_2)_8F$, used as fluorine compound B, was added to account for 40 mass % of the entire coating composition to provide a coating composition 3-4 for antireflection layer.

Coating Composition 3-5 for Antireflection Layer

Low refractive index layer component (3-a) and high refractive index layer component (3-a) were mixed at a mass ratio of 1:7 to prepare a solution, and 3 parts by mass of 2-hydroxy-2-methyl-1-phenyl-propane-1-one was added to 100 parts by mass of the solution. Furthermore, $H_2C=CH—COO—CH_2—(CF_2)_6F$, used as fluorine compound B, was added to account for 50 mass % of the entire coating composition to provide a coating composition 3-5 for antireflection layer.

Coating Composition 3-6 for Antireflection Layer

Low refractive index layer component (3-a) and high refractive index layer component (3-a) were mixed at a mass ratio of 1:7, and 3 parts by mass of 2-hydroxy-2-methyl-1-phenyl-propane-1-one was added. Furthermore, $H_2C=CH—COO—CH_2—(CF_2)_6F$, used as fluorine compound B, was added to account for 20 mass % of the entire coating composition to provide a coating composition 3-6 for antireflection layer.

Coating Composition 3-7 for Antireflection Layer

Low refractive index layer component (3-a) and high refractive index layer component (3-a) were mixed at a mass ratio of 1:7 to prepare a solution, and 3 parts by mass of 2-hydroxy-2-methyl-1-phenyl-propane-1-one was added to 100 parts by mass of the solution. Furthermore, $H_2C=CH—COO—CH_2—(CF_2)_4F$, used as fluorine compound B, was added to account for 30 mass % of the entire coating composition to provide a coating composition 3-7 for antireflection layer.

Coating Composition 3-8 for Antireflection Layer

Low refractive index layer component (3-a) and high refractive index layer component (3-a) were mixed at a mass ratio of 1:7 to prepare a solution, and 3 parts by mass of 2-hydroxy-2-methyl-1-phenyl-propane-1-one was added to 100 parts by mass of the solution. Furthermore, $H_2C=CH—COO—CH_2—(CF_2)_4F$, used as fluorine compound B, was added to account for 20 mass % of the entire coating composition to provide a coating composition 3-8 for antireflection layer.

Coating Composition 3-9 for Antireflection Layer

Low refractive index layer component (3-a) and high refractive index layer component (3-a) were mixed at a mass ratio of 1:7 to prepare a solution, and 3 parts by mass of 2-hydroxy-2-methyl-1-phenyl-propane-1-one was added to 100 parts by mass of the solution. Furthermore, $H_2C=CH—COO—CH_2CF_2CF_3$, used as fluorine compound, was added to account for 40 mass % of the entire coating composition to provide a coating composition for antireflection layer.

Coating Composition 3-10 for Antireflection Layer

Low refractive index layer component (3-a) and high refractive index layer component (3-a) were mixed at a mass ratio of 1:7 to prepare a solution, and 3 parts by mass of 2-hydroxy-2-methyl-1-phenyl-propane-1-one was added to 100 parts by mass of the solution. Furthermore, $CF_3(CF_2)_7CH_2CH_2Si(OCH_3)_3$, used as fluorine compound B, was added to account for 20 mass % of the entire coating composition to provide a coating composition 3-10 for antireflection layer.

Coating Composition 3-11 for Antireflection Layer

Low refractive index layer component (3-a) and high refractive index layer component (3-a) were mixed at a mass ratio of 1:7 to prepare a solution, and 3 parts by mass of 2-hydroxy-2-methyl-1-phenyl-propane-1-one was added to 100 parts by mass of the solution. Furthermore, $CF_3(CF_2)_5CH_2CH_2Si(OCH_3)_3$, used as fluorine compound B, was added to account for 25 mass % of the entire coating composition to provide a coating composition 3-11 for antireflection layer.

Coating Composition 3-12 for Antireflection Layer

Low refractive index layer component (3-a) and high refractive index layer component (3-a) were mixed at a mass ratio of 1:7 to prepare a solution, and 3 parts by mass of 2-hydroxy-2-methyl-1-phenyl-propane-1-one was added to 100 parts by mass of the solution. Furthermore, nonamer oligomers of $CF_3(CF_2)_7CH_2CH_2Si(OH)_3$, used as the fluorine compound, was added to account for 20 mass % of the entire coating composition to provide a coating composition 3-12 for antireflection layer.

Coating Composition 3-13 for Antireflection Layer

Low refractive index layer component (3-a) and high refractive index layer component (3-a) were mixed at a mass ratio of 1:7 to prepare a solution, and 3 parts by mass of 2-hydroxy-2-methyl-1-phenyl-propane-1-one was added to 100 parts by mass of the solution. Furthermore, heptamer oligomers of $CF_3(CF_2)_7CH_2CH_2Si(OH)_3$, used as fluorine compound B, was added to account for 10 mass % of the entire coating composition to provide a coating composition 3-13 for antireflection layer.

Coating Composition 3-14 for Antireflection Layer

Low refractive index layer component (3-a) and high refractive index layer component (3-a) were mixed at a mass ratio of 1:7 to prepare a solution, and 3 parts by mass of 2-hydroxy-2-methyl-1-phenyl-propane-1-one was added to 100 parts by mass of the solution. Furthermore, pentamer oligomers of $CF_3(CF_2)_7CH_2CH_2Si(OH)_3$, used as fluorine compound B, was added to account for 15 mass % of the entire coating composition to provide a coating composition 3-14 for antireflection layer.

Coating Composition 3-15 for Antireflection Layer

Low refractive index layer component (3-a) and high refractive index layer component (3-a) were mixed at a mass ratio of 1:7 to prepare a solution, and 3 parts by mass of 2-hydroxy-2-methyl-1-phenyl-propane-1-one was added to 100 parts by mass of the solution. Furthermore, trimer oligomers of $CF_3(CF_2)_7CH_2CH_2Si(OH)_3$, used as fluorine compound B, was added to account for 20 mass % of the entire coating composition to provide a coating composition 3-15 for antireflection layer.

Coating Composition 3-16 for Antireflection Layer

Low refractive index layer component (3-a) and high refractive index layer component (3-a) were mixed at a mass ratio of 1:7 to prepare a solution, and 3 parts by mass of 2-hydroxy-2-methyl-1-phenyl-propane-1-one was added to 100 parts by mass of the solution. Furthermore, $HO—CH_2—CF_2CF_3$, used as the fluorine compound, was added to account for 20 mass % of the entire coating composition to provide a coating composition 3-16 for antireflection layer.

Coating Composition 3-17 for Antireflection Layer

Low refractive index layer component (3-a) and high refractive index layer component (3-a) were mixed at a mass ratio of 1:7 to prepare a solution, and 3 parts by mass of 2-hydroxy-2-methyl-1-phenyl-propane-1-one was added to 100 parts by mass of the solution. Furthermore, HO—CH$_2$—CF$_3$, used as the fluorine compound, was added to account for 20 mass % of the entire coating composition to provide a coating composition 3-17 for antireflection layer.

Coating Composition 3-18 for Antireflection Layer

Low refractive index layer component (3-a) and high refractive index layer component (3-a) were mixed at a mass ratio of 1:7 to prepare a solution, and 3 parts by mass of 2-hydroxy-2-methyl-1-phenyl-propane-1-one was added to 100 parts by mass of the solution, followed by additionally adding H$_2$C=CH—COO—CH$_2$—CF$_3$ to account for 20 mass % of the entire coating composition, to provide a coating composition 3-18 for antireflection layer.

Coating Composition 3-19 for Antireflection Layer

Low refractive index layer component (3-b) and high refractive index layer component (3-a) were mixed at a mass ratio of 1:7 to prepare a solution, and 3 parts by mass of 2-hydroxy-2-methyl-1-phenyl-propane-1-one was added to 100 parts by mass of the solution. Furthermore, H$_2$C=CH—COO—CH$_2$—(CF$_2$)$_8$F, used as fluorine compound B, was added to account for 30 mass % of the entire coating composition to provide a coating composition 3-19 for antireflection layer.

Coating Composition 3-20 for Antireflection Layer

Low refractive index layer component (3-c) and high refractive index layer component (3-a) were mixed at a mass ratio of 1:7 to prepare a solution, and 3 parts by mass of 2-hydroxy-2-methyl-1-phenyl-propane-1-one was added to 100 parts by mass of the solution. Furthermore, H$_2$C=CH—COO—CH$_2$—(CF$_2$)$_8$F, used as fluorine compound B, was added to account for 30 mass % of the entire coating composition to provide a coating composition 3-20 for antireflection layer.

Coating Composition 3-21 for Antireflection Layer

Low refractive index layer component (3-a) and high refractive index layer component (3-d) were mixed at a mass ratio of 1:7 to prepare a solution, and 3 parts by mass of 2-hydroxy-2-methyl-1-phenyl-propane-1-one was added to 100 parts by mass of the solution. Furthermore, H$_2$C=CH—COO—CH$_2$—(CF$_2$)$_8$F, used as fluorine compound B, was added to account for 30 mass % of the entire coating composition to provide a coating composition 3-21 for antireflection layer.

Coating Composition 3-22 for Antireflection Layer

Low refractive index layer component (3-d) and high refractive index layer component (3-e) were mixed at a mass ratio of 1:1 to prepare a solution, and 3 parts by mass of 2-hydroxy-2-methyl-1-phenyl-propane-1-one was added to 100 parts by mass of the solution. Furthermore, H$_2$C=CH—COO—CH$_2$—(CF$_2$)$_8$F, used as fluorine compound B, was added to account for 5 mass % of the entire coating composition to provide a coating composition 3-22 for antireflection layer.

Coating Composition 3-23 for Antireflection Layer

Except that trimethylolpropane EO modified triacrylate [CH$_2$=CHCO—(OCH$_2$H$_4$) n-OCH$_2$]$_3$—CCH$_2$CH$_3$, used as acrylate monomer, was added to account for 30 mass % of the entire coating composition, instead of H$_2$C=CH—COO—CH$_2$—(CF$_2$)$_8$F used as fluorine compound B, the same procedure as for coating composition 3-1 was carried out to provide a coating composition for antireflection layer.

Coating Composition 3-24 for Antireflection Layer

Except that fluorine compound B is not contained, the same procedure as for coating composition 3-1 for antireflection layer was carried out to provide a coating composition 3-24 for antireflection layer.

Coating Composition 3-25 for Antireflection Layer

Low refractive index layer component (3-d) and high refractive index layer component (3-e) were mixed at a mass ratio of 10:1 to prepare a solution, and 3 parts by mass of 2-hydroxy-2-methyl-1-phenyl-propane-1-one was added to 100 parts by mass of the solution. Furthermore, H$_2$C=CH—COO—CH$_2$—(CF$_2$)$_8$F, used as fluorine compound B, was added to account for 5 mass % of the entire coating composition to provide a coating composition 3-25 for antireflection layer.

Coating Composition 3-26 for Antireflection Layer

Low refractive index layer component (3-a) and high refractive index layer component (3-f) were mixed at a mass ratio of 1:7 to prepare a solution, and 3 parts by mass of 2-hydroxy-2-methyl-1-phenyl-propane-1-one was added to 100 parts by mass of the solution to provide a coating composition 3-26 for antireflection layer.

Coating Composition 3-27 for Antireflection Layer

First, 3 parts by mass of 2-hydroxy-2-methyl-1-phenyl-propane-1-one was add to 100 parts by mass of high refractive index layer component (3-a). Furthermore, H$_2$C=CH—COO—CH$_2$—(CF$_2$)$_8$F, used as fluorine compound B, was added to account for 33 mass % of the high refractive index layer to provide a high refractive index layer component (3-a-2). Low refractive index layer component (3-a) was used as low refractive index layer component.

For descriptive purposes, this combination of high refractive index layer component (3-a-2) and low refractive index component (3-a) is referred to as coating composition 3-27 for antireflection.

Reference Examples 3-1 to 3-18 and Reference Comparative Examples 3-1 to 3-8

Antireflection Member

U46 (supplied by Toray Advanced Film Co., Ltd.), which consists of a PET resin film coated with an adhesion improving paint, was used as the support substrate. A coating composition for antireflection layer as described in Table 3-2 was applied to the surface of the support substrate coated with the adhesion improving paint using a bar coater (#10). After coating and drying at 100° C. for 2 minutes, a high pressure mercury lamp of 160 W/cm (supplied by Eye Graphics Co., Ltd.) was used to apply ultraviolet ray under the conditions of an illuminance of 600 W/cm$^2$, accumulated light quantity of 800 mJ/cm$^2$, and oxygen concentration of 0.1 vol % to provide an antireflection member. This method for preparing an antireflection member is referred as production method 3-1.

Reference Example 3-19

Antireflection Member

U46 (supplied by Toray Advanced Film Co., Ltd.), which consists of a PET resin film coated with an adhesion improving paint, was used as the support substrate. High refractive index paint (3-a-2) was applied using a bar coater (#4) to the surface of the support substrate coated with the adhesion improving paint. After coating and drying at 100° C. for 1 minute, a high pressure mercury lamp of 160 W/cm (supplied by Eye Graphics Co., Ltd.) was used to apply ultraviolet ray under the conditions of an illuminance of 600 W/cm$^2$, accumulated light quantity of 800 mJ/cm$^2$, and oxygen concentration of 0.1 vol %. Low refractive index paint (3-a) was applied using a bar coater (#6) to the cure surface of high refractive index paint (3-a-2). After coating and drying at 100° C. for 1 minute, a high pressure mercury lamp of 160 W/cm (supplied by Eye Graphics Co., Ltd.) was used to apply ultraviolet ray under the conditions of an illuminance of 600 W/cm$^2$, accumulated light quantity of 800 mJ/cm$^2$, and oxygen concentration of 0.1 vol % to provide an antireflection member. This method for preparing an antireflection member is referred as production method 3-2.

The antireflection members of Reference Examples 3-1 to 3-19, which has an ion strength ratio $F_L/F_H$ of 2 or more and 150 or less, had a definite interface formed between two layers with different refractive indices in the antireflection layer and accordingly had high antireflectiveness, weather resistance, adhesiveness, chemical resistance, transparency, and antireflectiveness.

The antireflection members of Reference Comparative Examples 3-1 to 3-6, which have an ion strength ratio $F_L/F_H$ of less than 2, were poor in antireflectiveness, transparency, adhesiveness, weather resistance, and chemical resistance, and failed to have a definite interface between the two layers.

The antireflection members of Reference Comparative Examples 3-7 to 3-8, which have an ion strength ratio $F_L/F_H$ of more than 150, were poor in antireflectiveness, transparency, adhesiveness, weather resistance, and chemical resistance, and failed to have a definite interface between the two layers.

The antireflection members of Reference Comparative Examples 3-6 to 3-8, which contain no components originating from aqueous compound B, were poor in antireflectiveness, transparency, adhesiveness, weather resistance, and chemical resistance, and failed to have a definite interface between the two layers.

TABLE 3-1

| Paint composition for antireflection layer | Low refractive index paint | High refractive index paint | Content of component derived from fluorine compound B (*1) (mass %) | Number average molecular weight of fluorine compound B |
|---|---|---|---|---|
| 3-1 | 3-a | 3-a | 30 | 518 |
| 3-2 | 3-a | 3-c | 10 | 518 |
| 3-3 | 3-a | 3-b | 30 | 518 |
| 3-4 | 3-a | 3-a | 40 | 518 |
| 3-5 | 3-a | 3-a | 50 | 418 |
| 3-6 | 3-a | 3-a | 20 | 418 |
| 3-7 | 3-a | 3-a | 30 | 318 |
| 3-8 | 3-a | 3-a | 20 | 318 |
| 3-9 | 3-a | 3-a | — | — |
| 3-10 | 3-a | 3-a | 20 | 568 |
| 3-11 | 3-a | 3-a | 25 | 468 |
| 3-12 | 3-a | 3-a | — | 4500 |
| 3-13 | 3-a | 3-a | 10 | 4000 |
| 3-14 | 3-a | 3-a | 15 | 3500 |
| 3-15 | 3-a | 3-a | 20 | 1600 |
| 3-16 | 3-a | 3-a | 20 | 150 |
| 3-17 | 3-a | 3-a | 20 | 100 |
| 3-18 | 3-a | 3-a | 20 | 154 |
| 3-19 | 3-b | 3-a | 30 | 518 |
| 3-20 | 3-c | 3-a | 30 | 518 |
| 3-21 | 3-a | 3-d | 30 | 518 |
| 3-22 | 3-d | 3-e | 5 | 518 |
| 3-23 | 3-a | 3-a | — | — |
| 3-24 | 3-a | 3-a | — | — |
| 3-25 | 3-d | 3-e | 5 | 518 |
| 3-26 | 3-a | 3-f | — | — |
| 3-27 | 3-a | 3-a-2 | 30 | 518 |

(*1) content of components derived from fluorine compound B in all components constituting first and second layers (mass %)

TABLE 3-2

| | Paint composition for antireflection layer | Antireflection member production method | Relation of $F_H$ and $O_H$ | Ion strength ratio ($F_L/F_H$) | Content of components derived from fluorine compound B (*1) (mass %) |
|---|---|---|---|---|---|
| Reference Example 3-1 | 3-1 | 3-1 | $F_H \geq O_H$ | 10 | 30 |
| Reference Example 3-2 | 3-2 | 3-1 | $F_H \geq O_H$ | 100 | 10 |
| Reference Example 3-3 | 3-3 | 3-1 | $F_H \geq O_H$ | 10 | 30 |
| Reference Example 3-4 | 3-4 | 3-1 | $F_H \geq O_H$ | 5 | 40 |
| Reference Example 3-5 | 3-5 | 3-1 | $F_H \geq O_H$ | 2 | 50 |
| Reference Example 3-6 | 3-6 | 3-1 | $F_H \geq O_H$ | 30 | 20 |
| Reference Example 3-7 | 3-7 | 3-1 | $F_H \geq O_H$ | 10 | 30 |
| Reference Example 3-8 | 3-8 | 3-1 | $F_H \geq O_H$ | 30 | 20 |
| Reference Example 3-9 | 3-9 | 3-1 | $F_H \geq O_H$ | 10 | — |
| Reference Example 3-10 | 3-10 | 3-1 | $F_H \geq O_H$ | 30 | 20 |
| Reference Example 3-11 | 3-11 | 3-1 | $F_H \geq O_H$ | 20 | 25 |
| Reference Example 3-12 | 3-12 | 3-1 | $F_H \geq O_H$ | 150 | — |
| Reference Example 3-13 | 3-13 | 3-1 | $F_H \geq O_H$ | 100 | 10 |
| Reference Example 3-14 | 3-14 | 3-1 | $F_H \geq O_H$ | 50 | 15 |
| Reference Example 3-15 | 3-15 | 3-1 | $F_H \geq O_H$ | 30 | 20 |
| Reference Example 3-16 | 3-21 | 3-1 | $F_H \geq O_H$ | 30 | 20 |
| Reference Example 3-17 | 3-22 | 3-1 | $F_H \geq O_H$ | 150 | 5 |
| Reference Example 3-18 | 3-25 | 3-1 | $F_H \geq O_H$ | 150 | 5 |
| Reference Example 3-19 | 3-27 | 3-2 | $F_H \geq O_H$ | 10 | 30 |
| Reference Comparative Example 3-1 | 3-16 | 3-1 | $F_H < O_H$ | 1.5 | — |
| Reference Comparative Example 3-2 | 3-17 | 3-1 | $F_H < O_H$ | 1.5 | — |
| Reference Comparative Example 3-3 | 3-18 | 3-1 | $F_H < O_H$ | 1.5 | — |
| Reference Comparative Example 3-4 | 3-19 | 3-1 | $F_H < O_H$ | 1.0 | 30 |
| Reference Comparative Example 3-5 | 3-20 | 3-1 | $F_H < O_H$ | 1.0 | 30 |

TABLE 3-2-continued

|  | Paint composition for antireflection layer | Antireflection member production method | Relation of $F_H$ and $O_H$ | Ion strength ratio ($F_L/F_H$) | Content of components derived from fluorine compound B (*1) (mass %) |
|---|---|---|---|---|---|
| Reference Comparative Example 3-6 | 3-23 | 3-1 | $F_H < O_H$ | 0.5 | — |
| Reference Comparative Example 3-7 | 3-24 | 3-1 | $F_H < O_H$ | 200 | — |
| Reference Comparative Example 3-8 | 3-26 | 3-1 | $F_H < O_H$ | 200 | — |

(*1) content of components derived from fluorine compound B in all components constituting first and second layers (mass %)

TABLE 3-3

|  | Refractive index | | Number average particle diameter (nm) | | Thickness of each layer (nm) | |
|---|---|---|---|---|---|---|
|  | First layer | Second layer | First layer | Second layer | First layer | Second layer |
| Reference Example 3-1 | 1.36 | 1.68 | 61 | 7 | 95 | 2000 |
| Reference Example 3-2 | 1.36 | 1.64 | 61 | 20 | 100 | 2000 |
| Reference Example 3-3 | 1.36 | 1.66 | 61 | 20 | 105 | 3500 |
| Reference Example 3-4 | 1.37 | 1.67 | 61 | 7 | 110 | 2000 |
| Reference Example 3-5 | 1.37 | 1.67 | 61 | 7 | 100 | 2000 |
| Reference Example 3-6 | 1.37 | 1.67 | 61 | 7 | 95 | 2000 |
| Reference Example 3-7 | 1.38 | 1.67 | 61 | 7 | 110 | 2000 |
| Reference Example 3-8 | 1.38 | 1.67 | 61 | 7 | 115 | 2000 |
| Reference Example 3-9 | 1.38 | 1.67 | 61 | 7 | 95 | 2000 |
| Reference Example 3-10 | 1.37 | 1.67 | 61 | 7 | 95 | 2000 |
| Reference Example 3-11 | 1.37 | 1.67 | 61 | 7 | 120 | 2000 |
| Reference Example 3-12 | 1.39 | 1.65 | 61 | 7 | 100 | 2000 |
| Reference Example 3-13 | 1.38 | 1.67 | 61 | 7 | 90 | 2000 |
| Reference Example 3-14 | 1.38 | 1.67 | 61 | 7 | 100 | 2000 |
| Reference Example 3-15 | 1.37 | 1.67 | 61 | 7 | 100 | 2000 |
| Reference Example 3-16 | 1.37 | 1.68 | 61 | 7 | 95 | 3000 |
| Reference Example 3-17 | 1.37 | 1.68 | 61 | 7 | 130 | 500 |
| Reference Example 3-18 | 1.37 | 1.68 | 61 | 7 | 100 | 4000 |
| Reference Example 3-19 | 1.36 | 1.68 | 61 | 7 | 95 | 2000 |
| Reference Comparative Example 3-1 | 1.48 | 1.56 | — | — | — | — |
| Reference Comparative Example 3-2 | 1.5 | 1.54 | — | — | — | — |
| Reference Comparative Example 3-3 | 1.52 | 1.52 | — | — | — | — |
| Reference Comparative Example 3-4 | 1.54 | 1.54 | — | — | — | — |
| Reference Comparative Example 3-5 | 1.48 | 1.54 | — | — | — | — |
| Reference Comparative Example 3-6 | 1.52 | 1.52 | — | — | — | — |
| Reference Comparative Example 3-7 | 1.39 | 1.68 | — | — | — | — |
| Reference Comparative Example 3-8 | 1.39 | 1.68 | — | — | — | — |

TABLE 3-4

|  | Antireflection performance (%) | Transparency (haze) (%) | Interface formation | Chemical resistance | Adhesiveness | Weather resistance | Scratch resistance |
|---|---|---|---|---|---|---|---|
| Reference Example 3-1 | 0.2 | 0.6 | A | A | AA | A | 3 |
| Reference Example 3-2 | 0.2 | 0.6 | A | A | AA | A | 3 |
| Reference Example 3-3 | 0.5 | 0.7 | A | A | AA | A | 4 |
| Reference Example 3-4 | 0.4 | 0.6 | A | A | AA | A | 3 |
| Reference Example 3-5 | 0.3 | 0.6 | A | A | AA | A | 3 |
| Reference Example 3-6 | 0.4 | 0.6 | A | A | AA | A | 3 |
| Reference Example 3-7 | 0.5 | 0.6 | A | A | AA | A | 3 |
| Reference Example 3-8 | 0.5 | 0.6 | A | A | AA | A | 3 |
| Reference Example 3-9 | 0.6 | 0.6 | A | A | AA | A | 3 |
| Reference Example 3-10 | 0.2 | 0.5 | A | A | AA | A | 3 |
| Reference Example 3-11 | 0.3 | 0.6 | A | A | AA | A | 3 |
| Reference Example 3-12 | 0.7 | 0.7 | A | A | AA | A | 3 |
| Reference Example 3-13 | 0.6 | 0.6 | A | A | AA | A | 3 |
| Reference Example 3-14 | 0.5 | 0.6 | A | A | AA | A | 3 |
| Reference Example 3-15 | 0.4 | 0.6 | A | A | AA | A | 3 |

TABLE 3-4-continued

|  | Antireflection performance (%) | Transparency (haze) (%) | Interface formation | Chemical resistance | Adhesiveness | Weather resistance | Scratch resistance |
|---|---|---|---|---|---|---|---|
| Reference Example 3-16 | 0.3 | 0.7 | A | A | AA | A | 4 |
| Reference Example 3-17 | 0.5 | 0.5 | A | A | AA | B | 3 |
| Reference Example 3-18 | 0.2 | 0.8 | A | A | AA | A | 5 |
| Reference Example 3-19 | 0.2 | 0.6 | A | A | AA | A | 3 |
| Reference Comparative Example 3-1 | 1.5 | 2.2 | C | C | C | C | 3 |
| Reference Comparative Example 3-2 | 2.0 | 2.3 | C | C | C | C | 3 |
| Reference Comparative Example 3-3 | 2.5 | 2.6 | C | C | C | C | 3 |
| Reference Comparative Example 3-4 | 2.6 | 2.8 | C | C | C | C | 3 |
| Reference Comparative Example 3-5 | 2.1 | 2.5 | C | C | C | C | 3 |
| Reference Comparative Example 3-6 | 2.5 | 2.8 | C | C | C | C | 3 |
| Reference Comparative Example 3-7 | 0.7 | 2.6 | C | C | C | C | 3 |
| Reference Comparative Example 3-8 | 0.6 | 2.7 | C | C | C | C | 3 |

The invention claimed is:

1. An antireflection member comprising an antireflection layer comprising two adjacent layers with different refractive indices, said antireflection layer formed at least on a first surface of a support substrate, and one of the two adjacent layers with different refractive indices located farther from the support substrate is a first layer, and another of the two adjacent layers is a second layer, wherein
said antireflection layer contains two or more kinds of particles of different constituent elements and one or more kinds of binders, and number average particle diameter of the particles contained in said second layer is 25 nm or less, and
a ratio b/a is more than 1.10 and less than 1.45, where "a" denotes a length of the line segment A1A2 connecting two arbitrarily-selected points A1 and A2 located on an interface between said first layer and said second layer and apart from each other by a linear distance of 500 nm or more, and "b" denotes a length of a boundary line on a cross-section plane, wherein said cross-section plane is perpendicular to said first surface of the support substrate, said line segment A1A2 is in said cross-section plane, and said boundary line is in said interface.

2. The antireflection member of claim 1, wherein thickness of said second layer is 500 nm to 4,000 nm.

3. The antireflection member of claim 1, wherein a ratio b/c is more than 1.05 and less than 1.40, where "b" denotes said length b and "c" denotes length of a line formed by projecting said line segment A1A2 in the direction perpendicular to said first surface of said support substrate onto the surface of said antireflection layer opposite to said support substrate.

4. The antireflection member of claim 1, wherein said first layer and said second layer comprise a component derived from at least one compound selected from the group consisting of compounds having a reactive portion and a fluoroalkyl group with a carbon number of 4 or more, compounds having a reactive portion and a hydrocarbon group with a carbon number of 8 or more, and compounds having a reactive portion and a siloxane group.

5. The antireflection member of claim 4, wherein said compounds having a reactive portion and a fluoroalkyl group with a carbon number of 4 or more have a number average molecular weight of 300 to 4,000.

6. The antireflection member of claim 1, wherein a ratio $F_L/F_H$ is 2 to 150, where $F_L$ denotes ion strength of a fluorine atom determined by secondary ion mass spectrometer at a through-thickness center of said first layer while $F_H$ denotes ion strength of the fluorine atom determined by secondary ion mass spectrometer, having primary ion CS+ energy of 3 keV and a primary ion electric current of 150 nA, at the through-thickness center of said second layer.

7. The antireflection member of claim 6, wherein $F_H \leq O_H$, where $F_H$ denotes said ion strength $F_H$ while $O_H$ denotes ion strength of an oxygen atom determined by secondary ion mass spectrometer, having primary ion CS+ energy of 3 keV and a primary ion electric current of 150 nA, at the through-thickness center of said second layer.

8. A method of producing the antireflection member of claim 1, comprising forming an antireflection layer containing two adjacent layers with different refractive indices at least on the first surface of said support substrate by applying a coating composition in only one coating step.

9. The method of claim 8, wherein the first surface of said support substrate has a surface roughness of 40 nm or less as determined according to JIS-B-0601 (2001 Edition).

10. The antireflection member of claim 2, wherein a ratio b/c is more than 1.05 and less than 1.40, where "b" denotes said length b and "c" denotes length of a line formed by projecting said line segment A1A2 in the direction perpendicular to said first surface of said support substrate onto the surface of said antireflection layer opposite to said support substrate.

11. The antireflection member of claim 2, wherein said first layer and said second layer comprise a component derived from at least one compound selected from the group consisting of compounds having a reactive portion and a fluoroalkyl group with a carbon number of 4 or more, compounds having a reactive portion and a hydrocarbon group with a carbon number of 8 or more, and compounds having a reactive portion and a siloxane group.

12. The antireflection member of claim 3, wherein said first layer and said second layer comprise a component derived from at least one compound selected from the group consisting of compounds having a reactive portion and a fluoroalkyl group with a carbon number of 4 or more, compounds having a reactive portion and a hydrocarbon group with a carbon number of 8 or more, and compounds having a reactive portion and a siloxane group.

13. The antireflection member of claim 2, wherein a ratio $F_L/F_H$ is 2 to 150, where $F_L$ denotes ion strength of a fluorine atom determined by secondary ion mass spectrometer at a through-thickness center of said first layer while $F_H$ denotes ion strength of the fluorine atom determined by secondary ion mass spectrometer, having primary ion CS+ energy of 3 keV and a primary ion electric current of 150 nA, at the through-thickness center of said second layer.

14. The antireflection member of claim 3, wherein a ratio $F_L/F_H$ is 2 to 150, where $F_L$ denotes ion strength of a fluorine atom determined by secondary ion mass spectrometer at a through-thickness center of said first layer while $F_H$ denotes ion strength of the fluorine atom determined by secondary ion mass spectrometer, having primary ion CS+ energy of 3 keV and a primary ion electric current of 150 nA, at the through-thickness center of said second layer.

15. The antireflection member of claim 4, wherein a ratio $F_L/F_H$ is 2 to 150, where $F_L$ denotes ion strength of a fluorine atom determined by secondary ion mass spectrometer at a through-thickness center of said first layer while $F_H$ denotes ion strength of the fluorine atom determined by secondary ion mass spectrometer, having primary ion CS+ energy of 3 keV and a primary ion electric current of 150 nA, at the through-thickness center of said second layer.

16. The antireflection member of claim 1, wherein the difference in refractive index of the two adjacent layers is 0.05 or more.

17. The antireflection member of claim 1, wherein the refractive index of said second layer is from 1.64 to 1.68.

* * * * *